(12) United States Patent
Yamagishi et al.

(10) Patent No.: US 7,860,181 B2
(45) Date of Patent: Dec. 28, 2010

(54) DECODING APPARATUS AND DECODING METHOD

(75) Inventors: Hiroyuki Yamagishi, Tokyo (JP); Keitarou Kondou, Tokyo (JP)

(73) Assignee: Sony Corporation (JP)

( * ) Notice: Subject to any disclaimer, the term of this patent is extended or adjusted under 35 U.S.C. 154(b) by 733 days.

(21) Appl. No.: 11/880,465

(22) Filed: Jul. 20, 2007

(65) Prior Publication Data

US 2008/0056401 A1    Mar. 6, 2008

(30) Foreign Application Priority Data

Jul. 27, 2006    (JP) ............................. P2006-204823

(51) Int. Cl.
*H04L 23/02*    (2006.01)
(52) U.S. Cl. ....................... 375/265; 375/262; 375/341; 375/263; 714/786; 714/795
(58) Field of Classification Search ................. 375/265, 375/262, 263, 341; 714/786, 795
See application file for complete search history.

(56) References Cited

U.S. PATENT DOCUMENTS

| 5,430,744 | A | | 7/1995 | Fettweis et al. |
| 5,944,849 | A | * | 8/1999 | Sonetaka ..................... 714/786 |
| 5,995,562 | A | * | 11/1999 | Koizumi ...................... 375/341 |
| 6,192,084 | B1 | * | 2/2001 | Miyauchi et al. ............. 375/262 |
| 6,748,034 | B2 | * | 6/2004 | Hattori et al. ............... 375/341 |
| 2003/0043939 | A1 | * | 3/2003 | Okumura et al. ............ 375/341 |

FOREIGN PATENT DOCUMENTS

| JP | 05210921 A | 8/1993 |
| JP | 07-183819 A | 7/1995 |

OTHER PUBLICATIONS

L. R. Bahl, et al., "Optimal Decoding of Linear Codes for Minimizing Symbol Error Rate," IEEE Transactions on Information Theory, vol. IT-20, pp. 284-287, Mar. 1974.
P. Robertson, et al., "A Comparison of Optimal and Sub-Optimal MAP Decoding Algorithms Operating in the Log Domain," in Proc. ICC '95, pp. 1009-1013, Jun. 1995.
Office Action from Japanese Application No. 2006-204823, dated Jul. 6, 2010.

* cited by examiner

*Primary Examiner*—Eva Y Puente
(74) *Attorney, Agent, or Firm*—Lerner, David, Littenberg, Krumholz & Mentlik, LLP

(57) ABSTRACT

Disclosed herein is a decoding apparatus for decoding channel input bits from a partial-response channel output in accordance with a trellis obtained by combining a coding constraint and state transitions of a partial response for a case in which the length of a memory required for describing the coding constraint is greater than the length of a channel memory of the partial response. The apparatus may include a first calculation unit configured to carry out a first calculation on first branch information, which may be defined as information on first branches included in three or more branches merging in a state determined in advance, and first path information defined as information on first paths for the first branches; and a second calculation unit configured to carry out a second calculation on a first calculation value obtained as a result of the first calculation.

7 Claims, 21 Drawing Sheets

US 7,860,181 B2

DECODING APPARATUS AND DECODING METHOD

CROSS-REFERENCE TO RELATED APPLICATIONS

This application claims priority from Japanese Patent Application No. JP 2006-204823 filed in the Japanese Patent Office on Jul. 27, 2006, the entire content of which is incorporated herein by reference.

BACKGROUND OF THE INVENTION

1. Field of the Invention

The present invention relates to a decoding apparatus and a decoding method. More particularly, the present invention relates to a decoding apparatus capable of implementing a high decoding speed in a process to decode channel input bits from a partial-response channel output in accordance with a trellis obtained by combining a coding constraint and state transitions of a partial response for a case in which the length of a memory required for describing the coding constraint is greater than the length of a channel memory of the partial response, and relates to a decoding method adopted by the decoding apparatus.

2. Description of the Related Art

In a recording/reproduction apparatus for recording data into a recording medium such as a magnetic disk or an optical disk and reproducing data from the recording medium, a detection method equalized to a partial response is widely used. If a partial response matching the transfer characteristic of the recording/reproduction apparatus is used, the recording/reproduction apparatus is capable of suppressing noise emphases. In addition, by adoption of typically a Viterbi algorithm making use of a trellis representing state transitions of a partial response, the recording/reproduction apparatus is capable of easily carrying out a maximum likelihood decoding process on a string of channel input bits.

For example, a partial response represented by a transfer characteristic of $H(D)=1-D^2$ is referred to as a PR4 (Partial Response Class 4), which is often utilized in a magnetic recording/reproduction apparatus. In this case, notation D denotes an operator representing a delay with a time length T corresponding 1 channel bit. Since the channel memory length is 2, the PR4 can be described in terms of state transitions having a state count of 4 ($=2^2$).

FIG. 1 is a diagram showing the state transitions of the PR4.

Each circle shown in FIG. 1 denotes a state. Notation $S_{ij}$ inside every circle is the name of the state represented by the circle. In the following description, the phrase 'state $S_{ij}$' is a technical term used for describing a state the name of which is $S_{ij}$. The suffixes i and j of state $S_{ij}$ represent values stored in a memory as the values of channel bits. That is to say, state $S_{ij}$ is a state in which the channel bit immediately preceding (and causing) a transition to state $S_{ij}$ is j and the channel bit immediately preceding the channel bit (j) immediately preceding (and causing) the transition to state $S_{ij}$ is i. In other words, $S_{ij}$ used as the state name of state $S_{ij}$ has suffixes (that is, i and j) appended to the character S in an order starting with a value (that is, i) stored least recently in the memory as the value of a channel bit and ending with a value (that is, j) stored just before the transition to state $S_{ij}$ in the memory as the value of a channel bit.

Each arrow shown in FIG. 1 as an arrow originating from a specific one of two states $S_{ij}$ and pointing to the other one of the two states $S_{ij}$ has a label x/y. The arrow represents a transition made from the specific state $S_{ij}$ to the other state $S_{ij}$ in accordance with the channel-bit input x of the label x/y. It is to be noted that notation y in the label x/y denotes an expected output value of the PR4. In the following description, an expected output value of the PR4 is referred to simply as an output expected value.

As shown in FIG. 1, if the channel-bit input x of state $S_{00}$ in the PR4 is 0, a transition from state $S_{00}$ to state $S_{00}$ itself is made. For this transition, the output expected value is 0. If the channel-bit input x of state $S_{00}$ is 1, on the other hand, a transition from state S00 to state S01 is made. For this transition, the output expected value is 1.

If the channel-bit input x of state $S_{01}$ is 0, a transition from state $S_{01}$ to state $S_{10}$ is made. For this transition, the output expected value is 0. If the channel-bit input x of state S01 is 1, on the other hand, a transition from state $S_{01}$ to state $S_{11}$ is made. For this transition, the output expected value is 1.

If the channel-bit input x of state $S_{10}$ is 1, a transition from state $S_{10}$ to state $S_{01}$ is made. For this transition, the output expected value is 0. If the channel-bit input x of state $S_{10}$ is 0, on the other hand, a transition from state $S_{10}$ to state $S_{00}$ is made. For this transition, the output expected value is −1.

If the channel-bit input x of state S11 is 0, a transition from state $S_{11}$ to state $S_{10}$ is made. For this transition, the output expected value is −1. If the channel-bit input x of state $S_{00}$ is 1, on the other hand, a transition from state $S_{11}$ to state $S_{11}$ itself is made. For this transition, the output expected value is 0.

FIG. 2 is a trellis diagram showing a trellis for a channel memory length of 2.

It is to be noted that, in the trellis diagram of FIG. 2, the state name $S_{ij}$ is not enclosed in a circle representing state $S_{ij}$. Instead, at the left end of each row of the trellis, a state name $S_{ij}$ is described as the name of the same states each represented by a blank circle on the same row. That is to say, on every row of the trellis, all circles laid out in the horizontal direction have the state name $S_{ij}$ shown at the left end of the row. In FIG. 2, a label is omitted from each arrow representing a branch or a state transition. FIGS. 5, 6, 12, 15, 20 and 21 to be described later are shown in the same way as FIG. 2.

In the state transition shown in FIG. 2, state $S_{00}$ transits to state $S_{00}$ itself or state $S_{01}$ in accordance with the channel bit input. By the same token, state $S_{10}$ transits to state $S_{00}$ or state $S_{01}$ in accordance with the channel bit input. In the same way, state $S_{01}$ transits to state $S_{10}$ or state $S_{11}$ in accordance with the channel bit input. Likewise, state $S_{11}$ transits to state $S_{11}$ itself or state $S_{10}$ in accordance with the channel bit input.

Next, a reproduced-signal decoding method equalized to a partial response channel is explained. In accordance with a trellis, it is possible to carry out a maximum likelihood decoding process or a MAP (Maximum A Posteriori Probability) decoding process of a string of channel input bits for each bit on a reproduced signal. As a decoder for carrying out a maximum likelihood decoding process of a string of channel input bits, a Viterbi decoder is often used.

FIG. 3 is a block diagram showing the configuration of the Viterbi decoder 10.

As shown in FIG. 3, the Viterbi decoder 10 includes a BMU (Branch Metric Unit) 11, an ACSU (Add-Compare-Select Unit) 12 and an SMU (Survivor Memory Unit) 13.

The BMU 11 receives a reproduced signal of a certain time instant. On the basis of the reproduced signal, the BMU 11 finds the probability that a state transition occurs in a trellis. This probability is referred to as a branch metric or branch information (which is information on a branch). The BMU 11 supplies the branch metrics to the ACSU 12.

The ACSU 12 is a unit for selecting a most probable path leading to a state of the next time among paths leading to states of the next time and updating a path metric or path information (which is information on paths). The ACSU 12 selects the most probable path on the basis of the path metric updated in the immediately preceding path selection processing as indicated by a feedback arrow on the ACSU 12 and a branch metric received from the BMU 11. The path metric is information on the probability of each of the paths leading to states of the next time. The ACSU 12 supplies information identifying the selected most probable path to the SMU 13.

On the basis of information received from the ACSU 12 as the information identifying the most probable path, the SMU 13 accumulates inputs to a trellis corresponding to a most probable path in each state and outputs an input to a past trellis existing on a path surviving at the present time as a decoding result.

As described above, in the Viterbi decoder 10, the ACSU 12 feeds back a path metric updated in the present path selection processing to be used in the next path selection processing. Thus, the effort to increase the speed of the decoding process is limited.

FIG. 4 is a block diagram showing the configuration of a circuit 30 employed in the ACSU 12 as a circuit for updating the path metric of state s1.

It is to be noted that, in the circuit 30 shown in FIG. 4, branches merging in state s1 are branches from four states, i.e. states s1 to s4.

The circuit 30 shown in FIG. 4 includes four memories 31-1 to 31-4, four adders 32-1 to 32-4, a comparator 33 and a selector 34. It is to be noted that FIG. 4 does not show information to be supplied to the SMU 13 as the information identifying the most probable path. The information identifying the most probable path is information used for selecting one of the branches. The omission of the information identifying the most probable path applies to FIGS. 7 to 11, 13, 16, 18, 19 and 22 to 25, which will be explained later.

The memories 31-1 to 31-4 are each typically a flip-flop circuit. The memories 31-1 to 31-4 are used for storing respectively path metrics $PM_{s1,k-1}$, $PM_{s2,k-1}$, $PM_{s3,k-1}$, and $PM_{s4,k-1}$ of states s1, s2, s3 and s4 at a time k−1. The memories 31-1 to 31-4 supply the path metrics $PM_{s1,k-1}$, $PM_{s2,k-1}$, $PM_{s3,k-1}$, and $PM_{s4,k-1}$ stored therein to the adders 32-1 to 32-4 respectively.

The adders 32-1 to 32-4 add the path metrics $PMs_{1,k-1}$, $PM_{s2,k-1}$, $PM_{s3,k-1}$ and $PM_{s4,k-1}$ received from the memories 31-1 to 31-4 to respectively to branch metrics $BM_{1,k}$, $BM_{2,k}$, $BM_{3,k}$ and $BM_{4,k}$ of branches merging in state s1 received from the BMU 11 to result in sums. The adders 32-1 to 32-4 supply the sums to the comparator 33 and the selector 34 as path metrics.

The comparator 33 compares the path metrics received from the adders 32-1 to 32-4 with each other and supplies information identifying the path metric of a most probable path to the selector 34. For example, the comparator 33 takes the largest one among the past metrics as the path metric of a most probable path and supplies the information identifying the path metric of the most probable path to the selector 34.

On the basis of information received from the comparator 33 as the information identifying the path metric of a most probable path, the selector 34 selects the path metric of a most probable path as the path metric $PM_{s1,k}$ of state s1 at the time k and outputs the path metric $PM_{s1,k}$ to the SMU 13. The selector 34 also feeds back the path metric $PM_{s1,k}$ to be used in the next processing as the path metric $PM_{s1,k-1}$ to the memory 31-1 to be stored therein. That is to say, the path metric $PM_{s1,k-1}$ stored in the memory 31-1 as a path metric for the time k−1 is updated by being replaced with the path metric $PM_{s1,k}$ output by the selector 34 as a path metric for the time k.

Other circuits for states s2 to s4 can be designed into the same configuration as the circuit 30 for state s1. It is to be noted that the memories 31-1 to 31-4 can be shared by the other circuits. That is to say, the ACSU 12 has circuits designed for states s1 to s4 as circuits each having the same configuration as the circuit 30 but the ACSU 12 includes only one set of memories 31-1 to 31-4. In other words, sets of memories 31-1 to 31-4 for states s2 to s4 can be eliminated. The ACSU 12 carries out the addition, comparison and selection processes for every time instant from time to time, updating the path metrics.

As described above, the path metric of the time k is used for updating the path metric of the time k+1. Thus, the processing of the ACSU 12 needs to be completed in a time unit.

As a technique to make the processing of the ACSU 12 simple, there has been proposed a technique to change the order to add a branch metric as described in documents such as Japanese Patent Laid-open No. Hei 7-183819.

Next, a process to code channel bits is explained as follows.

In many cases, a string of channel bits to be recorded is subjected to a coding process suitable for the recording/reproduction system and, thus, a recorded string of channel bits is a string that has been subjected to the coding process prior to the recording process. In the case of an RLL (Run-Length Limited) coding process, for example, the number of consecutive bits having the same value is limited by a minimum number, a maximum number or both. A (d, k)-RLL code is a code including a string of 0 code bits between two 1 code bits. The length of the string is limited by a maximum k and a minimum d. If a (d, k)-RLL code is recorded by adoption of an NRZI (Non Return to Zero Invert) method into a recording medium, the number of consecutive channel bits having the same value has a minimum of (d+1) and a maximum of (k+1).

In the case of a 17 PP (Parity Preserve) code used in a Blu-ray disc, for example, the minimum bit count d is limited to 1 whereas the maximum bit count k is limited to 7. With the minimum bit count d limited to 1, the interval of the channel-bit polarity inversion is at least equal to a period of 2 T. In addition, in the case of the 17PP code, the number of consecutive minimum-interval polarity conversions is limited to a maximum value of 6. In the following description, the number of consecutive minimum-interval polarity conversions is referred to as a consecutive minimum-interval polarity conversion count r. In addition, in the case of an MTR (Maximum Transition Run) coding process, the number of consecutive polarity conversions is limited.

If combined with state transitions of a partial response, the channel-bit coding restrictions like the ones described above is capable of preventing a pattern prohibited by the coding restrictions from being obtained as a result of decoding. In addition, in some cases, the Euclid distance in the trellis is increased and the error-rate characteristic is improved.

FIG. 5 is a trellis diagram for coding restrictions combined with state transitions of a partial response for a channel memory length of 2 as coding restrictions for a process to record an RLL code with the minimum bit count d limited to 1 by adoption of the NRZI method.

The trellis diagram of FIG. 5 is a trellis diagram for the minimum bit count d limited to 1. Thus, the trellis shown in FIG. 5 is obtained by eliminating a branch representing a transition from state $S_{10}$ to $S_{01}$ and a branch representing a transition from state $S_{01}$ to $S_{10}$ from the trellis shown in FIG. 2.

FIG. 6 is a trellis diagram for coding restrictions combined with state transitions of a partial response for a channel memory length of 2 as coding restrictions for a process to record an RLL code with the maximum bit count k limited to 2 by adoption of the NRZI method.

In the trellis shown in FIG. 6, in order to incorporate the coding restriction limiting the maximum bit count k to 2 into the state transitions, state $S_{00}$ in the trellis shown in FIG. 2 as a trellis for a channel memory length of 2 is split into states $S_{000}$ and $S_{100}$ whereas state $S_{11}$ in the same trellis is split into states $S_{011}$ and $S_{111}$. That is to say, in the trellis shown in FIG. 6, the number of states is increased to 6.

In addition, in the trellis shown in FIG. 6, the maximum bit count k is limited to 2. Thus, in the trellis shown in FIG. 6, there is no branch representing a transition from state $S_{000}$ caused by the 0 channel bit entering consecutively three times in the past to same state $S_{000}$ due to the 0 channel bit entering again. By the same token, in the trellis shown in FIG. 6, there is no branch representing a transition from state $S_{111}$ caused by the 1 channel bit entering consecutively three times in the past to same state $S_{111}$ due to the 1 channel bit entering again.

FIG. 7 is a block diagram showing a typical configuration of an ACSU 50 employed in the conventional Viterbi decoder for carrying out a decoding process for each time instant in accordance with the trellis shown in FIG. 6.

To begin with, the following description explains a technique adopted by the ACSU 50 with a configuration shown in FIG. 7 to update the path metric of each state S.

In a partial response with a channel memory length of 2, there are a maximum of eight output expected values for channel-bit strings of 000, 001, 010, 011, 100, 101, 110 and 111. The BMU finds branch metrics $BM_{0,k}$ to $BM_{7,k}$ from the output expected values and a signal reproduced at a transition from the time (k−1) to the time k.

The path metric of every state S is updated by making use of the branch metrics $BM_{0,k}$ to $BM_{7,k}$ in accordance with path-metric updating equations expressed by Eqs. (1) as follows:

$$PM_{S000,k} = PM_{S100,k-1} + BM_{0,k}$$

$$PM_{S100,k} = PM_{S10,k-1} + BM_{4,k}$$

$$PM_{S10,k} = \max(PM_{S01,k-1} + BM_{2,k}, PM_{S011,k-1} + BM_{6,k}, PM_{S111,k-1} + BM_{6,k})$$

$$PM_{S01,k} = \max(PM_{S10,k-1} + BM_{5,k}, PM_{S100,k-1} + BM_{1,k}, PM_{S000,k-1} + BM_{1,k})$$

$$PM_{S011,k} = PM_{S01,k-1} + BM_{3,k}$$

$$PM_{S111,k} = PM_{S011,k-1} + BM_{7,k} \quad (1)$$

It is to be noted that, in the path-metric updating equations expressed by Eqs. (1), notations $PM_{S000,k}$, $PM_{S100,k}$, $PM_{S10,k}$, $PM_{S01,k}$, $PM_{S011,k}$ and $PM_{S111,k}$ denote respectively the path metrics of states $S_{000}$, $S_{100}$, $S_{10}$, $S_{01}$, $S_{011}$, and $S_{111}$ of the time k whereas notations $PM_{S000,k-1}$, $PM_{S100,k-1}$, $PM_{S10,k-1}$, $PM_{S01,k-1}$, $PM_{S011,k-1}$ and $PM_{S111,k-1}$ denote respectively the path metrics of states $S_{000}$, $S_{100}$, $S_{10}$, $S_{01}$, $S_{011}$ and $S_{111}$ of the time k−1.

The following description explains the configuration of the ACSU 50 for updating the path metrics in accordance with the path-metric updating equations expressed by Eqs. (1).

The ACSU 50 with a configuration shown in FIG. 7 employs memories 51-1 to 51-6, adders 52-1 to 52-10 as well as max circuits 53-1 and 53-2.

The memories 51-1 to 51-6 are memories used for storing respectively the path metrics $PM_{S000,k-1}$, $PM_{S100,k-1}$, $PM_{S10,k-1}$, $PM_{S01,k-1}$, $PM_{S011,k-1}$ and $PM_{S111,k-1}$ of states $S_{000,k-1}$ $S_{100,k-1}$, $S_{10,k-1}$, $S_{01,k-1}$, $S_{011,k-1}$ and $S_{111,k-1}$ of the time k−1. The memory 51-1 supplies the path metric $PM_{S000,k-1}$ stored therein to the adder 52-1 whereas the memory 51-2 supplies the path metric $PM_{S100,k-1}$ stored therein to the adders 52-2 and 52-3.

In addition, the memory 51-3 supplies the path metric $PM_{S10,k-1}$ stored therein to the adders 52-4 and 52-5 whereas the memory 51-4 supplies the path metric $PM_{S01,k-1}$ stored therein to the adders 52-6 and 52-7. In addition, the memory 51-5 supplies the path metric $PM_{S011,k-1}$ stored therein to the adders 52-8 and 52-9 whereas the memory 51-6 supplies the path metric $PM_{S111,k-1}$ stored therein to the adder 52-10.

The adder 52-1 adds the path metric $PM_{S000,k-1}$ received from the memory 51-1 to the branch metric $BM_{1,k}$ received from the BMU and supplies the result of the addition to the max circuit 53-1.

The adder 52-2 adds the path metric $PM_{S100,k-1}$ received from the memory 51-2 to the branch metric $BM_{0,k}$ received from the BMU to produce a path metric $PM_{S000,k}$ as a result of the addition. That is to say, the adder 52-2 computes the path metric $PM_{S000,k}$ in accordance with the first equation from the top of Eqs. (1). The path metric $PM_{S000,k}$ is fed back to the memory 51-1 and stored therein as the path metric $PM_{S000,k-1}$.

The adder 52-3 adds the path metric $PM_{S100,k-1}$ received from the memory 51-2 to the branch metric $BM_{1,k}$ received from the BMU and supplies the result of the addition to the max circuit 53-1.

The adder 52-4 adds the path metric $PM_{S10,k-1}$ received from the memory 51-3 to the branch metric $BM_{4,k}$ received from the BMU to produce a path metric $PM_{S100,k}$ as a result of the addition. That is to say, the adder 52-4 computes the path metric $PM_{S100,k}$ in accordance with the second equation from the top of Eqs. (1). The path metric $PM_{S100,k}$ is fed back to the memory 51-2 to be stored therein as the path metric $PM_{S100,k-1}$.

The adder 52-5 adds the path metric $PM_{S10,k-1}$ received from the memory 51-3 to the branch metric $BM_{5,k}$ received from the BMU and supplies the result of the addition to the max circuit 53-1.

The adder 52-6 adds the path metric $PM_{S01,k-1}$ received from the memory 51-4 to the branch metric $BM_{2,k}$ received from the BMU and supplies the result of the addition to the max circuit 53-2.

The adder 52-7 adds the path metric $PM_{S01,k-1}$ received from the memory 51-4 to the branch metric $BM_{3,k}$ received from the BMU to produce a path metric $PM_{S011,k}$ as a result of the addition. That is to say, the adder 52-7 computes the path metric $PM_{S011,k}$ in accordance with the fifth equation from the top of Eqs. (1). The path metric $PM_{S011,k}$ is fed back to the memory 51-5 to be stored therein as the path metric $PM_{S011,k-1}$.

The adder 52-8 adds the path metric $PM_{S011,k-1}$ received from the memory 51-5 to the branch metric $BM_{6,k}$ received from the BMU and supplies the result of the addition to the max circuit 53-2.

The adder 52-9 adds the path metric $PM_{S011,k-1}$ received from the memory 51-5 to the branch metric $BM_{7,k}$ received from the BMU to produce a path metric $PM_{S111,k}$ as a result of the addition. That is to say, the adder 52-9 computes the path metric $PM_{S111,k}$ in accordance with the sixth equation from the top of Eqs. (1). The path metric $PM_{S111,k}$ is fed back to the memory 51-6 and stored therein as the path metric $PM_{S111,k-1}$.

The adder 52-10 adds the path metric $PM_{S111,k-1}$ received from the memory 51-6 to the branch metric $BM_{6,k}$ received from the BMU and supplies the result of the addition to the max circuit 53-2.

The max circuit 53-1 selects the largest value among the addition results received from the adders 52-1, 52-3 and 52-5 and takes the selected value as the path metric $PM_{S01,k}$. That is to say, the max circuit 53-1 computes the path metric $PM_{S01,k}$ in accordance with fourth equation from the top of Eqs. (1) and feeds back the path metric $PM_{S01,k}$ to the memory 51-4 as the path metric $PM_{S01,k-1}$.

By the same token, the max circuit 53-2 selects the largest value among the addition results received from the adders 52-6, 52-8 and 52-10 and takes the selected value as the path metric $PM_{S01,k}$. That is to say, the max circuit 53-2 computes the path metric $PM_{S01,k}$ in accordance with third equation from the top of Eqs. (1) and feeds back the path metric PMs10-$k$ to the memory 51-3 as the path metric $PM_{S01,k-1}$.

As described above, in the ACSU 50, the max circuits 53-1 and 53-2 each need to select the largest value among the addition results received from adders. This is because the number of branches merging in the same state S is three or larger and, thus, the length of a memory for describing coding restrictions is greater than the length of a channel memory for the partial response.

As described above, if the number of branches merging in a state S increases, the number of addition results each serving as a candidate to be selected as a maximum value also increases as well. Thus, it takes long time to select one of such candidates. As a result, the processing speed of the ACSU undesirably decreases.

FIG. 8 is a block diagram showing a typical configuration of an ACSU 60 employed in the conventional Viterbi decoder for carrying out a decoding process for every two time instants in accordance with the trellis shown in FIG. 6.

To begin with, the following description explains a technique adopted by the ACSU 60 with a configuration shown in FIG. 8 to update the path metric of each state S.

In a partial response with a channel memory length of 2, there are a maximum of eight output expected values for channel-bit strings of 000, 001, 010, 011, 100, 101, 110 and 111. In the case of the configuration shown in FIG. 8, the BMU finds branch metrics $BM_{0,k-1}$, $BM_{1,k-1}$, $BM_{2,k-1}$, $BM_{3,k-1}$, $BM_{4,k-1}$, $BM_{5,k-1}$, $BM_{6,k-1}$ and $BM_{7,k-1}$ from branch metrics $BM_{0,k}$, $BM_{1,k}$, $BM_{2,k}$, $BM_{3,k}$, $BM_{4,k}$, $BM_{5,k}$, $BM_{6,k}$ and $BM_{7,k}$, the output expected values as well as a signal reproduced at a transition from the time (k−2) to the time (k−1).

The path metric of every state S is updated for every two time instants by making use of the branch metrics $BM_{0,k-1}$, $BM_{1,k-1}$, $BM_{2,k-1}$, $BM_{3,k-1}$, $BM_{4,k-1}$, $BM_{5,k-1}$, $BM_{6,k-1}$ and $BM_{7,k-1}$ as well as the branch metrics $BM_{0,k}$, $BM_{1,k}$, $BM_{2,k}$, $BM_{3,k}$, $BM_{4,k}$, $BM_{5,k}$, $BM_{6,k}$ and $BM_{7,k}$ in accordance with the path-metric updating equations expressed by Eqs. (2) as follows:

$$PM_{S000,k}=PM_{S10,k-2}+BM_{4,k-1}+BM_{0,k}$$

$$PM_{S100,k}=\max(PM_{S01,k-2}+BM_{2,k-1}+BM_{4,k},$$
$$PM_{S011,k-2}+BM_{6,k-1}+BM_{4,k},PM_{S111,k-2}+$$
$$BM_{6,k-1}+BM_{4,k})$$

$$PM_{S10,k}=\max(PM_{S10,k-2}+BM_{5,k-1}+BM_{2,k},PM_{S100,k-2}+$$
$$BM_{1,k-1}+BM_{2,k},PM_{S000,k-2}+BM_{1,k-1}+BM_{2,k},$$
$$PM_{S01,k-2}+BM_{3,k-1}+BM_{6,k},PM_{S011,k-2}+BM_{7,k-1}+$$
$$BM_{6,k})$$

$$PM_{S01,k}=\max(PM_{S01,k-2}+BM_{2,k-1}+BM_{5,k},PM_{S011,k-2}+$$
$$BM_{6,k-1}+BM_{5,k},PM_{S111,k-2}+BM_{6,k-1}+BM_{5,k},$$
$$PM_{S10,k-2}+BM_{4,k-1}+BM_{1,k},PM_{S100,k-2}+BM_{0,k-1}+$$
$$BM_{1,k})$$

$$PM_{S011,k}=\max(PM_{S10,k-2}+BM_{5,k-1}+BM_{3,k},$$
$$PM_{S100,k-2}+BM_{1,k-1}+BM_{3,k},PM_{S000,k-2}+$$
$$BM_{1,k-1}+BM_{3,k})$$

$$PM_{S111,k}=PM_{S01,k-2}+BM_{3,k-1}+BM_{7,k} \quad (2)$$

The following description explains the configuration of the ACSU 60 for updating the path metrics in accordance with the path-metric updating equations expressed by Eqs. (2).

The ACSU 60 with a configuration shown in FIG. 8 employs memories 61-1 to 61-6, adders 62-1 to 62-18 and max circuits 63-1 to 63-4.

In the same way as the ACSU 50 shown in FIG. 7, in the ACSU 60 shown in FIG. 8, the adders 62-1 to 62-18 add path metrics $PM_{s,k}$ to branch metrics BM whereas the max circuits 63-1 to 63-4 select maximum values and feed back the selected maximum values to the memories 61-1 to 61-6.

To put it concretely, the adder 62-6 carries out a path-metric updating process based on the first equation from the top of Eqs. (2). The adders 62-10, 62-14 and 62-17 as well as the max circuit 63-1 carry out path-metric updating processes based on the second equation from the top of Eqs. (2). The adders 62-1, 62-3, 62-7, 62-11 and 62-15 as well as the max circuit 63-2 carry out path-metric updating processes based on the third equation from the top of Eqs. (2).

The adders 62-4, 62-8, 62-12, 62-16 and 62-18 as well as the max circuit 63-3 carry out path-metric updating processes based on the fourth equation from the top of Eqs. (2). The adders 62-2, 62-5 and 62-9 as well as the max circuit 63-4 carry out path-metric updating processes based on the fifth equation from the top of Eqs. (2). The adder 62-13 carries out a path-metric updating process based on the sixth equation from the top of Eqs. (2).

As described above, the max circuits 63-2 and 63-3 employed in the ACSU 60 each need to select the largest value among five addition results received from adders. Thus, also in the case of the ACSU 60, it takes long time to select the largest value.

In addition, besides the Viterbi algorithm, the decoding algorithms according to a trellis include a MAP algorithm, a Log-Map algorithm and a Max-Log-MAP algorithm. The MAP algorithm is also known as a BCJR (Bahl, Cocke, Jelineck and Raviv) algorithm. The Log-Map algorithm is an algorithm implementing the MAP algorithm in a logarithmic region. The Max-Log-Map algorithm is an approximation of the Log-Map algorithm. These other algorithms also have the problem that, the larger the number of branches merging in a state, the more complicated the processing. For more information on this, the reader is suggested to refer to non-patent reference 1 (L. R. Bahl, J. Cocke, F. Jelineck and J. Raviv, "Optimal Decoding of Linear Codes for Minimizing Symbol Error Rate," IEEE Transaction on Information Theory, vol. IT-20, pp. 284-287, March 1974) and non-patent reference 2 (P. Robertson, E. Villebrum and P. Hoeber, "A Comparison of Optimal and Sub-Optimal MAP Decoding Algorithms Operating in the Log Domain," in Proc. ICC '95, pp. 1009-1013, June 1995).

FIG. 9 is a diagram showing a typical configuration of a circuit 70 employed in the conventional decoder, which is used for carrying out a decoding process for every time instant by adoption of the BCJR algorithm, as a circuit for updating the probability of each state S in accordance with the trellis shown in FIG. 6.

First of all, the following description explains equations for updating the probability of each state S by adoption of the BCJR algorithm.

In accordance with the BCJR algorithm, the probability $\alpha_{s,k}$ of state S after a transition at a time k is updated in accordance with probability updating equations expressed by Eqs. (3) on the basis of the probability $\alpha'_{s',k-1}$ of state S' preceding the transition at a time (k−1) and a transition probability γ of the branch. In the probability updating equations expressed by Eqs. (3), the probability $\alpha_{s,k}$ of state S after a transition at a time k is the path information cited earlier. The transition is a transition tracing the trellis in the positive direction of the trellis. On the other hand, the transition probability γ of the branch is the branch information mentioned before:

$$\alpha_{S000,k} = \alpha_{S100,k-1} \times \gamma_{0,k}$$

$$\alpha_{S100,k} = \alpha_{S10,k-1} \times \gamma_{4,k}$$

$$\alpha_{S10,k} = \alpha_{S01,k-1} \times \gamma_{2,k} + \alpha_{S011,k-1} \times \gamma_{6,k} + \alpha_{S111,k-1} \times \gamma_{6,k}$$

$$\alpha_{S01,k} = \alpha_{S10,k-1} \times \gamma_{5,k} + \alpha_{S100,k-1} \times \gamma_{1,k} + \alpha_{S000,k-1} \times \gamma_{1,k}$$

$$\alpha_{S011,k} = \alpha_{S01,k-1} \times \gamma_{3,k}$$

$$\alpha_{S111,k} = \alpha_{S011,k-1} \times \gamma_{7,k} \quad (3)$$

It is to be noted that the transition probabilities $\gamma_{0,k}$ to $\gamma_{7,k}$ are expressed by probability updating equations represented by Eqs. (4) as follows:

$$\gamma_{0,k} = \gamma_k(S_{100}, S_{000})$$

$$\gamma_{1,k} = \gamma_k(S_{100}, S_{01}) = \gamma_k(S_{000}, S_{01})$$

$$\gamma_{2,k} = \gamma_k(S_{01}, S_{10})$$

$$\gamma_{3,k} = \gamma_k(S_{01}, S_{011})$$

$$\gamma_{4,k} = \gamma_k(S_{10}, S_{100})$$

$$\gamma_{5,k} = \gamma_k(S_{10}, S_{01})$$

$$\gamma_{6,k} = \gamma_k(S_{011}, S_{10}) = \gamma_k(S_{111}, S_{10})$$

$$\gamma_{7,k} = \gamma_k(S_{011}, S_{111}) \quad (4)$$

It is to be noted that notation $\gamma_k(S', S)$ used in the probability updating equations represented by Eqs. (4) denotes the transition probability of a branch resulting in a transition from state S' to state S at a time k.

Eqs. (3) used as the basis to carry out the process to update the probability $\alpha_{S,k}$ by adoption of the BCJR algorithm are obtained from Eqs. (2) used as the basis to carry out the process to update the path metric $PM_{S,k}$ by adoption of the Viterbi algorithm by:

replacing the path metric $PM_{S,k}$ with the probability $\alpha_{S,k}$;
replacing the branch metric BM with the transition probability γ;
replacing selection of a maximum value with addition; and
replacing addition of the path metric $PM_{S,k}$ to the branch metric BM with multiplication of the probability $\alpha_{S,k}$ by the transition probability γ.

Thus, the circuit 70 shown in FIG. 9 has a configuration obtained from the configuration of the ACSU 50 shown in FIG. 7 by:
replacing the memories 51-1 to 51-6 of the configuration of the ACSU 50 with memories 71-1 to 71-6;
replacing the adders 52-1 to 52-10 of the configuration of the ACSU 50 with multipliers 72-1 to 72-10; and
replacing the max circuits 53-1 and 53-2 of the configuration of the ACSU 50 with sum circuits 73-1 and 73-2.

That is to say, the circuit 70 shown in FIG. 9 includes the memories 71-1 to 71-6, the multipliers 72-1 to 72-10 as well as the sum circuits 73-1 and 73-2.

The multipliers 72-1 to 72-10 receive probabilities $\alpha_{S,k-1}$ from the memories 71-1 to 71-6 and the transition probabilities γ from an external source. The multipliers 72-1 to 72-10 each multiply the probability $\alpha_{S,k}$ by the transition probability γ and output a product obtained as a result of the multiplication. Some of the products are fed back to the memories 71-1, 71-2, 71-5 and 71-6 to be stored therein as the probability $\alpha_{S,k-1}$. Instead of being fed back to the memories 71-1, 71-2, 71-5 and 71-6, the remaining products are supplied to the sum circuits 73-1 and 73-2. The sum circuits 73-1 and 73-2 each compute a sum of all input products to produce the probability $\alpha_{S,k}$. The probability $\alpha_{S,k}$ is fed back to the memory 71-3 or 71-4 to be stored therein as the probability $\alpha_{S,k-1}$.

To put it concretely, the multiplier 72-2 carries out a process according to the first equation from the top of Eqs. (3). The multiplier 72-4 carries out a process according to the second equation from the top of Eqs. (3). The multipliers 72-6, 72-8 and 72-10 each carry out a process according to the third equation from the top of Eqs. (3) in order to produce products, which are then supplied to the sum circuit 73-2.

The multipliers 72-1, 72-3 and 72-5 each carry out a process according to the fourth equation from the top of Eqs. (3) in order to produce products, which are then supplied to the sum circuit 73-1. The multiplier 72-7 carries out a process according to the fifth equation from the top of Eqs. (3). The multiplier 72-9 carries out a process according to the sixth equation from the top of Eqs. (3).

As described above, the sum circuits 73-1 and 73-2 of the circuit 70 each need to compute the sum of three products so that it takes long time to sum up the products in comparison with a circuit for computing the sum of only two products. As a result, the time it takes to carry out the decoding process itself also increases as well.

FIG. 10 is a diagram showing a typical configuration of a circuit 80 employed in the conventional decoder, which is used for carrying out a decoding process for every time instant by adoption of the Log-MAP algorithm, as a circuit for updating the degree of likelihood of each state S in accordance with the trellis shown in FIG. 6.

First of all, the following description explains equations for updating the degree of likelihood of each state S by adoption of the Log-MAP algorithm.

In accordance with the Log-MAP algorithm, the likelihood $\alpha_{S,k}$ of state S after a transition at a time k is updated in accordance with likelihood updating equations expressed by Eqs. (5) on the basis of the probability $\alpha_{s',k-1}$ of state S' preceding the transition at a time (k−1) and a transition likelihood γ of the branch. In the likelihood updating equations expressed by Eqs. (5), the probability $\alpha_{S,k}$ of state S after a transition at a time k is the path information cited earlier. The transition is a transition tracing the trellis in the positive direction of the trellis. On the other hand, the transition probability γ of the branch is the branch information mentioned before.

$$\alpha_{S000,k} = \ln(\exp(\alpha_{S100,k-1} + \gamma_{0,k}))$$

$$\alpha_{S100,k} = \ln(\exp(\alpha_{S10,k-1} + \gamma_{4,k}))$$

$$\alpha_{S10,k} = \ln(\exp(\alpha_{S01,k-1} + \gamma_{2,k}) + \exp(\alpha_{S011,k-1} + \gamma_{6,k}) + \exp(\alpha_{S111,k-1} + \gamma_{6,k}))$$

$$\alpha_{S01,k}=\ln(\exp(\alpha_{S10,k-1}+\gamma_{5,k})+\exp(\alpha_{S100,k-1}+\gamma_{1,k})+\exp(\alpha_{S000,k-1}+\gamma_{1,k}))$$

$$\alpha_{S011,k}=\ln(\exp(\alpha_{S01,k-1}+\gamma_{3,k}))$$

$$\alpha_{S111,k}=\ln(\exp(\alpha_{S011,k-1}+\gamma_{7,k})) \quad (5)$$

It is to be noted that the likelihood values $\gamma_{0,k}$ to $\gamma_{7,k}$ used in Eqs. (5) are expressed by Eqs. (4). In this case, however, notation $\gamma k$ (S', S) used in Eqs. (4) denotes the degree of likelihood of a branch resulting in a transition from state S' to state S at a time k.

In the expressions on the right side of some equations of Eqs. (5), it is necessary to compute the value of a logarithmic function of a sum of 3 or more exponential-function values. In this case, the likelihood $\alpha_{S,k}$ is updated by repeatedly carrying out a computation according to a likelihood updating equation expressed by Eq. (6) given below. By the way, the computation according to Eq. (6) is referred to as Log-Sum processing:

$$\ln(\exp(A)+\exp(B))=\max(A,B)+\ln(1+\exp(-|B-A|)) \quad (6)$$

Eqs. (5) used as the basis to carry out the process to update the likelihood $\alpha_{S,k}$ by adoption of the Log-MAP algorithm is obtained from Eqs. (2) used as the basis to carry out the process to update the path metric $PM_{S,k}$ by adoption of the Viterbi algorithm by:

replacing the path metric $PM_{S,k}$ with the likelihood $\alpha_{S,k}$;

replacing the branch metric BM with the likelihood $\gamma$;

replacing selection of a maximum value with the Log-Sum processing described above; and replacing addition of the path metric $PM_{S,k}$ to the branch metric BM with addition of the likelihood $\alpha_{S,k}$ to the likelihood $\gamma$.

Thus, the circuit 80 shown in FIG. 10 has a configuration obtained from the configuration of the ACSU 50 shown in FIG. 7 by:

replacing the memories 51-1 to 51-6 of the configuration of the ACSU 50 with memories 81-1 to 81-6;

replacing the adders 52-1 to 52-10 of the configuration of the ACSU 50 with multipliers 82-1 to 82-10; and replacing the max circuits 53-1 and 53-2 of the configuration of the ACSU 50 with long-sum circuits 83-1 and 83-2.

That is to say, the circuit 80 shown in FIG. 10 includes the memories 81-1 to 81-6, the adders 82-1 to 82-10 as well as the log-sum circuits 83-1 and 83-2.

The adders 82-1 to 82-10 receive likelihood values $\alpha_{S,k-1}$ from the memories 81-1 to 81-6 and the likelihood values $\gamma$ from an external source. The adders 82-1 to 82-10 each add the likelihood $\alpha_{S,k}$ to the likelihood $\gamma$ and output a sum obtained as a result of the addition. Some of the sums are fed back to the memories 81-1, 81-2, 81-5 and 81-6 to be stored therein as the likelihood $\alpha_{S,k-1}$. Instead of being fed back to the memories 81-1, 81-2, 81-5 and 81-6, the remaining sums are supplied to the log-sum circuits 83-1 and 83-2. The log-sum circuits 83-1 and 83-2 each carry out the log-sum processing on all input sums in accordance with Eq. (6) given earlier to produce the likelihood $\alpha_{S,k}$. The likelihood $\alpha_{S,k}$ is fed back to the memory 81-3 or 81-4 to be stored therein as the likelihood $\alpha_{S,k-1}$.

To put it concretely, the adder 82-2 carries out a process according to the first equation from the top of Eqs. (5). The adder 82-4 carries out a process according to the second equation from the top of Eqs. (5). The adders 82-6, 82-8 and 82-10 each carry out a process according to the third equation from the top of Eqs. (5) in order to produce products, which are then supplied to the log-sum circuit 83-2.

The adders 82-1, 82-3 and 82-5 each carry out a process according to the fourth equation from the top of Eqs. (5) in order to produce products, which are then supplied to the log-sum circuit 83-1. The adder 82-7 carries out a process according to the fifth equation from the top of Eqs. (5). The adder 82-9 carries out a process according to the sixth equation from the top of Eqs. (5).

As described above, the log-sum circuits 83-1 and 83-2 employed in the circuit 80 each need to carry out log-sum processing on three inputs so that it takes long time to complete the processing in comparison with a circuit for carrying out log-sum processing on only two inputs. As a result, the time it takes to carry out the decoding process itself also increases as well.

FIG. 11 is a diagram showing a typical configuration of a circuit 90 employed in the conventional decoder, which is used for carrying out a decoding process for every time instant by adoption of the Max-Log-MAP algorithm, as a circuit for updating the degree of likelihood of each state S according to the trellis shown in FIG. 6.

First of all, the following description explains equations for updating the degree of likelihood of each state S by adoption of the Max-Log-MAP algorithm.

In accordance with the Max-Log-MAP algorithm, the likelihood $\alpha_{S,k}$ of state S after a transition at a time k is updated in accordance with likelihood updating equations expressed by Eqs. (7) given below on the basis of the probability $\alpha_{s',k-1}$ of state S' preceding the transition at a time (k−1) and a transition likelihood $\gamma$ of the branch. In the likelihood updating equations expressed by Eqs. (7), the probability $\alpha_{S,k}$ of state S after a transition at a time k is the path information cited earlier. The transition is a transition tracing the trellis in the positive direction of the trellis. On the other hand, the transition probability $\gamma$ of the branch is the branch information mentioned before. The likelihood updating equations expressed by Eqs. (7) are obtained from Eqs. (5) by replacing the log-sum processing of Eqs. (5) with processing to select a maximum value as follows:

$$\alpha_{S000,k}=\ln(\exp(\alpha_{S100,k-1}+\gamma_{0,k}))$$

$$\alpha_{S100,k}=\ln(\exp(\alpha_{S10,k-1}+\gamma_{4,k}))$$

$$\alpha_{S10,k}=\max(\ln(\exp(\alpha_{S01,k-1}+\gamma_{2,k})),\ln(\exp(\alpha_{S011,k-1}+\gamma_{6,k})),\ln(\exp(\alpha_{S111,k-1}+\gamma_{6,k})))$$

$$\alpha_{S01,k}=\max(\ln(\exp(\alpha_{S10,k-1}+\gamma_{5,k})),\ln(\exp(\alpha_{S100,k-1}+\gamma_{1,k})),\ln(\exp(\alpha_{S000,k-1}+\gamma_{1,k})))$$

$$\alpha_{S011,k}=\ln(\exp(\alpha_{S01,k-1}+\gamma_{3,k}))$$

$$\alpha_{S111,k}=\ln(\exp(\alpha_{S011,k-1}+\gamma_{7,k})) \quad (7)$$

Eqs. (7) used as the basis to carry out the process to update the likelihood $\alpha_{S,k}$ by adoption of the Max-Log-MAP algorithm is obtained from Eqs. (2) used as the basis to carry out the process to update the path metric $PM_{S,k}$ by adoption of the Viterbi algorithm by:

replacing the path metric $PM_{S,k}$ with the likelihood $\alpha_{S,k}$;

replacing the branch metric BM with the likelihood $\gamma$; and replacing addition of the path metric $PM_{S,k}$ to the branch metric BM with addition of the likelihood $\alpha_{S,k}$ to the likelihood $\gamma$.

Thus, the circuit 90 shown in FIG. 11 has a configuration obtained from the configuration of the ACSU 50 shown in FIG. 7 by:

replacing the memories 51-1 to 51-6 of the configuration of the ACSU 50 with memories 91-1 to 91-6;

replacing the adders 52-1 to 52-10 of the configuration of the ACSU 50 with multipliers 92-1 to 92-10; and replacing the max circuits 53-1 and 53-2 of the configuration of the ACSU 50 with max circuits 93-1 and 93-2.

That is to say, the circuit 90 shown in FIG. 11 includes the memories 91-1 to 91-6, the adders 92-1 to 92-10 as well as the max circuits 93-1 and 93-2.

The adders 92-1 to 92-10 receive likelihood values $\alpha_{S,k-1}$ from the memories 91-1 to 91-6 and the likelihood values $\gamma$ from an external source. The adders 92-1 to 92-10 each add the likelihood $\alpha_{S,k}$ to the likelihood $\gamma$ and output a sum obtained as a result of the addition. Some of the sums are fed back to the memories 91-1, 91-2, 91-5 and 91-6 to be stored therein as the likelihood $\alpha_{S,k-1}$. Instead of being fed back to the memories 91-1, 91-2, 91-5 and 91-6, the remaining sums are supplied to the max circuits 93-1 and 93-2. The max circuits 93-1 and 93-2 each select the largest value among all input sums in order to produce the likelihood $\alpha_{S,k}$. The likelihood $\alpha_{S,k}$ is fed back to the memory 91-3 or 91-4 to be stored therein as the likelihood $\alpha_{S,k-1}$.

To put it concretely, the adder 92-2 carries out a process according to the first equation from the top of Eqs. (7). The adder 92-4 carries out a process according to the second equation from the top of Eqs. (7). The adders 92-6, 92-8 and 92-10 each carry out a process according to the third equation from the top of Eqs. (7) in order to produce products, which are then supplied to the max circuit 93-2.

The adders 92-1, 92-3 and 92-5 each carry out a process according to the fourth equation from the top of Eqs. (7) in order to produce products, which are then supplied to the max circuit 93-1. The adder 92-7 carries out a process according to the fifth equation from the top of Eqs. (7). The adder 92-9 carries out a process according to the sixth equation from the top of Eqs. (7).

As described above, the max circuits 93-1 and 93-2 of the circuit 90 each need to select a largest value among three input sums so that it takes long time to complete the processing in comparison with a circuit for selecting a largest value among only two sums. As a result, the time it takes to carry out the decoding process itself also increases as well.

SUMMARY OF THE INVENTION

As described above, if the length of a memory for describing a coding constraint is greater than the length a channel memory of a partial response, the maximum value of the number of branches merging in a state S becomes at least equal to 3. Thus, it takes long time to complete a decoding process in comparison with a case in which the maximum value of the number of such branches is 2.

Addressing the problems described above, inventors of the present invention innovated a decoding apparatus and a decoding method, which may be capable of implementing a high decoding speed in a process to decode channel input bits from a partial-response channel output in accordance with a trellis obtained by combining a coding constraint and state transitions of a partial response for a case in which the length of a memory required for describing the coding constraint is greater than the length of a channel memory of the partial response.

In accordance with an embodiment of the present invention, there is provided a decoding apparatus for decoding channel input bits from a partial-response channel output in accordance with a trellis obtained by combining a coding constraint and state transitions of a partial response for a case in which the length of a memory required for describing the coding constraint is greater than the length of a channel memory of the partial response. The decoding apparatus may include a first calculation unit configured to carry out a first calculation on first branch information, which may be defined as information on first branches included in three or more branches merging in a state determined in advance, and first path information defined as information on first paths for the first branches; and a second calculation unit configured to carry out a second calculation on a first calculation value obtained as a result of the first calculation.

It is possible to provide the decoding apparatus with a configuration which may further include a third calculation unit configured to carry out the second calculation on second path information defined as information on second paths for second branches included in the three or more branches merging in the state determined in advance as branches having the same branch information. In this configuration: the first branch information may include second branch information, which is defined as information on the second branches, and third branch information defined as information on third branches included in the branches merging in the state determined in advance as branches other than the second branches; and the first path information may include a third calculation value obtained as a result of the second calculation carried out by the third calculation unit and third path information defined as information on third paths for the third branches. Further in the above configuration: the first calculation unit may carry out the first calculation on the first branch information and the third calculation value as well as the third branch information and the third path information; and the third calculation unit may be capable of carrying out the second calculation prior to a predetermined time of processing carried out by the first and a second calculation units.

It is possible to provide the decoding apparatus with a configuration which may include first branches defined as branches merging in each of states obtained as a result of splitting a predetermined state in which three or more branches merge as described above. Thus, the number of aforementioned first branches merging in each of the states obtained as a result of splitting the predetermined state may be smaller than the number of branches merging in the predetermined state.

The decoding apparatus may be capable of decoding channel input bits by adoption of the Viterbi algorithm, the BCJR (Bahl, Cocke, Jelineck and Raviv) algorithm, the Log-MAP (Maximum A Posteriori Probability) algorithm or the Max-Log-MAP algorithm. In this case, however, the processing to decode channel input bits may not only be a process to output hard decision information of channel input bits but also a process to output soft decision information such as the posteriori probability and the likelihood.

It is possible to provide a configuration in which the decoding apparatus is capable of decoding channel input bits for every time instant and the first calculation unit is capable of carrying out the first calculation at a time instant immediately preceding calculations carried out by the second to fourth calculation units.

It is possible to provide a configuration in which the decoding apparatus is capable of decoding channel input bits for every plurality of time instants and the first calculation unit is capable of carrying out the first calculation at a time instant preceding calculations carried out by the second to fourth calculation units by a plurality of time instants.

In accordance with another embodiment of the present invention, there is provided a decoding method to be adopted in a decoding apparatus for decoding channel input bits from a partial-response channel output in accordance with a trellis obtained by combining a coding constraint and state transitions of a partial response for a case in which the length of a memory required for describing the coding constraint is greater than the length of a channel memory of the partial response. The decoding method may include a first calculation step of carrying out a first calculation on first branch information, which may be defined as information on first branches included in 3 or more branches merging in a state determined in advance, and first path information defined as information on first paths for the first branches; and a second calculation step of carrying out a second calculation on a first calculation value obtained as a result of the first calculation.

As described above, in accordance with the decoding method according to the other embodiment of the present invention: a first calculation may be carried out on first branch information, which may be defined as information on first branches included in three or more branches merging in a state determined in advance, and first path information defined as information on first paths for the first branches; and a second calculation may be carried out on a first calculation values obtained as a result of the first calculation.

In accordance with the embodiments of the present invention, in a process of decoding channel input bits from a partial-response channel output in accordance with a trellis obtained by combining a coding constraint and state transitions of a partial response for a case in which the length of a memory required for describing the coding constraint is greater than the length of a channel memory of the partial response, the speed of the decoding process can be increased.

BRIEF DESCRIPTION OF THE DRAWINGS

These and other features of the present invention will become clear from the following description of the preferred embodiments given with reference to the accompanying diagrams, in which.

DETAILED DESCRIPTION

Figure 1:
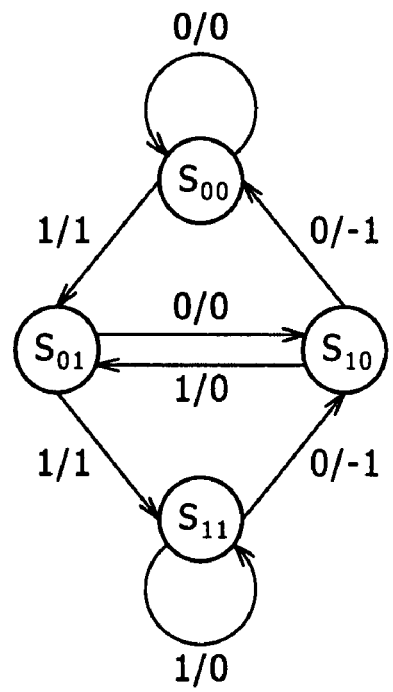
FIG. 1 is a diagram showing the state transitions of the PR4.
Figure 2:
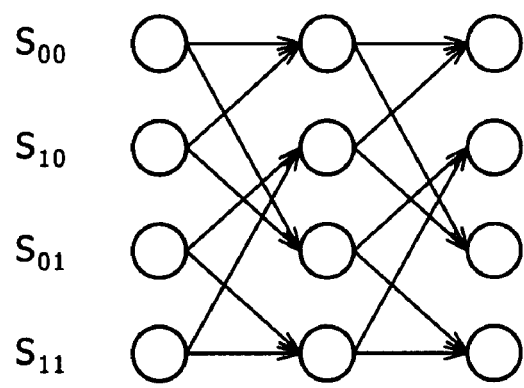
FIG. 2 is a trellis diagram showing a trellis for a channel memory length of 2.
Figure 3:
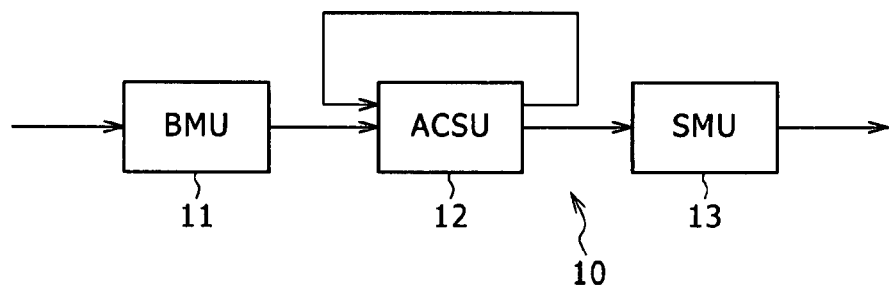
FIG. 3 is a block diagram showing the configuration of a Viterbi decoder.
Figure 4:
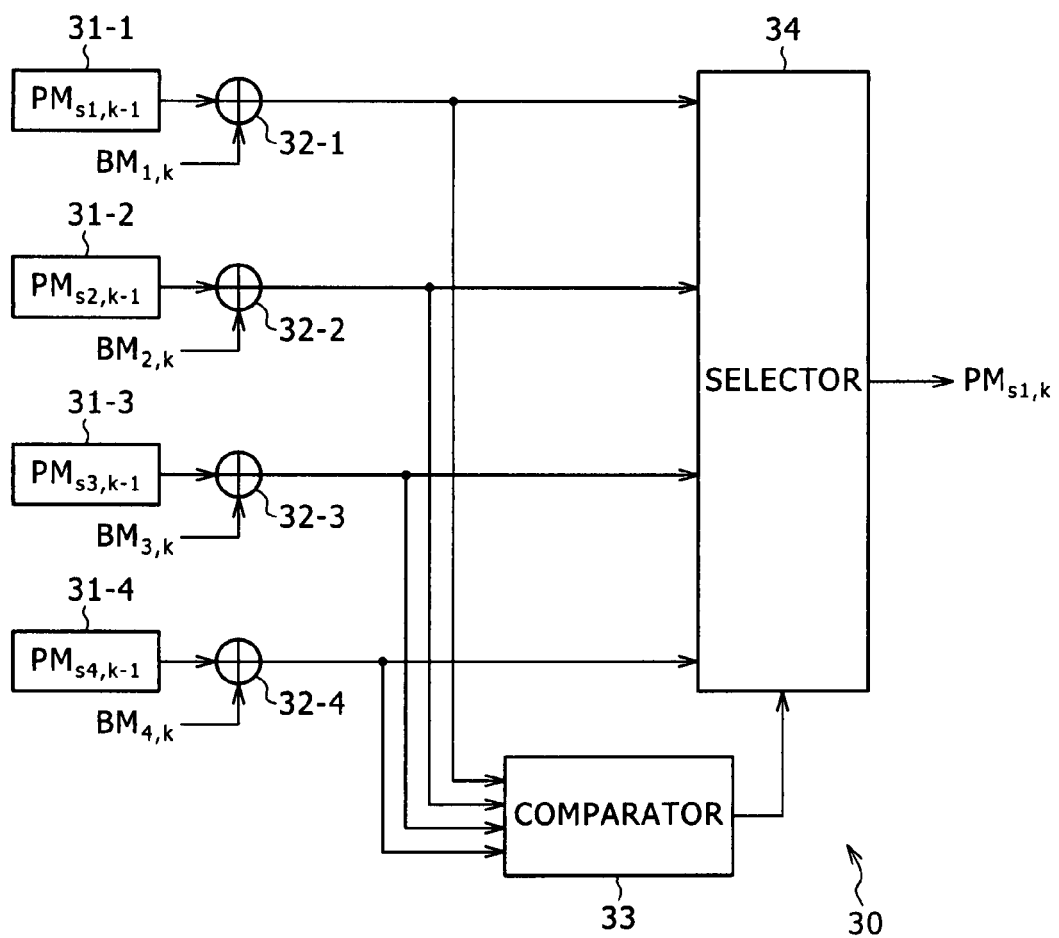
FIG. 4 is a block diagram showing a typical configuration of a circuit for updating the path metric of state s1.
Figure 5:
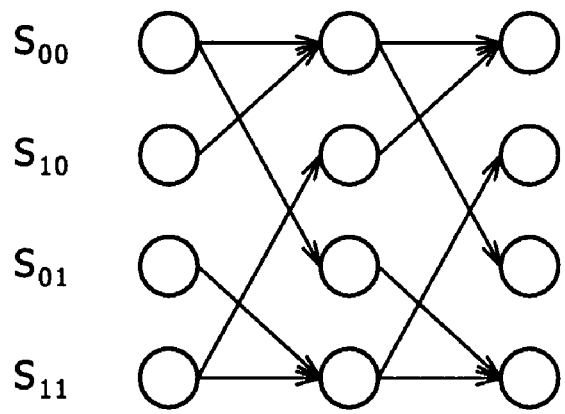
FIG. 5 is another trellis diagram.

Next, embodiments of the present invention are explained by referring to diagrams. Before preferred embodiments of the present invention are explained, relations between disclosed inventions and the embodiments are explained in the following comparative description. It is to be noted that the comparative description merely confirms the embodiments supporting the present invention are described in the specification and the diagrams. Thus, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention. In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

In accordance with an embodiment of the present invention, there is provided a decoding apparatus for decoding channel input bits from a partial-response channel output in accordance with a trellis obtained by combining a coding constraint and state transitions of a partial response for a case in which the length of a memory required for describing the coding constraint is greater than the length of a channel memory of the partial response. The decoding apparatus includes:

a first calculation unit (such as adders 136-1 and 136-2 shown in FIG. 18) configured to carry out a first calculation (such as an addition) on first branch information (such as branch metrics), which is defined as information on first branches included in three or more branches merging in a state determined in advance, and first path information (such as path metrics) defined as information on first paths for the first branches; and a second calculation unit (such as a comparator 137 and a selector 138 shown in FIG. 18) configured to carry out a second calculation (such as a selection of a maximum value) on a first calculation value obtained as a result of the first calculation.

It is possible to provide the decoding apparatus with a configuration further including a third calculation unit (such as a comparator 133 and a selector 134 shown in FIG. 18) configured to carry out the second calculation on second path information defined as information on second paths for second branches included in the three or more branches merging in the state determined in advance as branches having the same branch information. In this configuration:

the first branch information includes second branch information, which is defined as information on the second branches, and third branch information defined as information on third branches included in the branches merging in the state determined in advance as branches other than the second branches;

the first path information includes a third calculation value obtained as a result of the second calculation carried out by the third calculation unit and third path information defined as information on third paths for the third branches;

the first calculation unit carries out the first calculation on the first branch information and the third calculation value as well as the third branch information and the third path information; and the third calculation unit is capable of carrying out the second calculation prior to a predetermined time of processing carried out by the first and a second calculation units.

In accordance with another embodiment of the present invention, there is provided a decoding method to be adopted in a decoding apparatus for decoding channel input bits from a partial-response channel output in accordance with a trellis obtained by combining a coding constraint and state transitions of a partial response for a case in which the length of a memory required for describing the coding constraint is greater than the length of a channel memory of the partial response. The decoding method includes:

a first calculation step (such as a step S1 of a flowchart shown in FIG. 14) of carrying out a first calculation (such as an addition) on first branch information (such as branch metrics), which is defined as information on first branches included in three or more branches merging in a state determined in advance, and first path information (such as path metrics) defined as information on first paths for the first branches; and a second calculation step (such as a step S2 of the flowchart shown in FIG. 14) of carrying out a second calculation (such as a selection of a maximum value) on a first calculation values obtained as a result of the first calculation.

Concrete embodiments of the present invention are explained in detail by referring to diagrams as follows.

Figure 12:
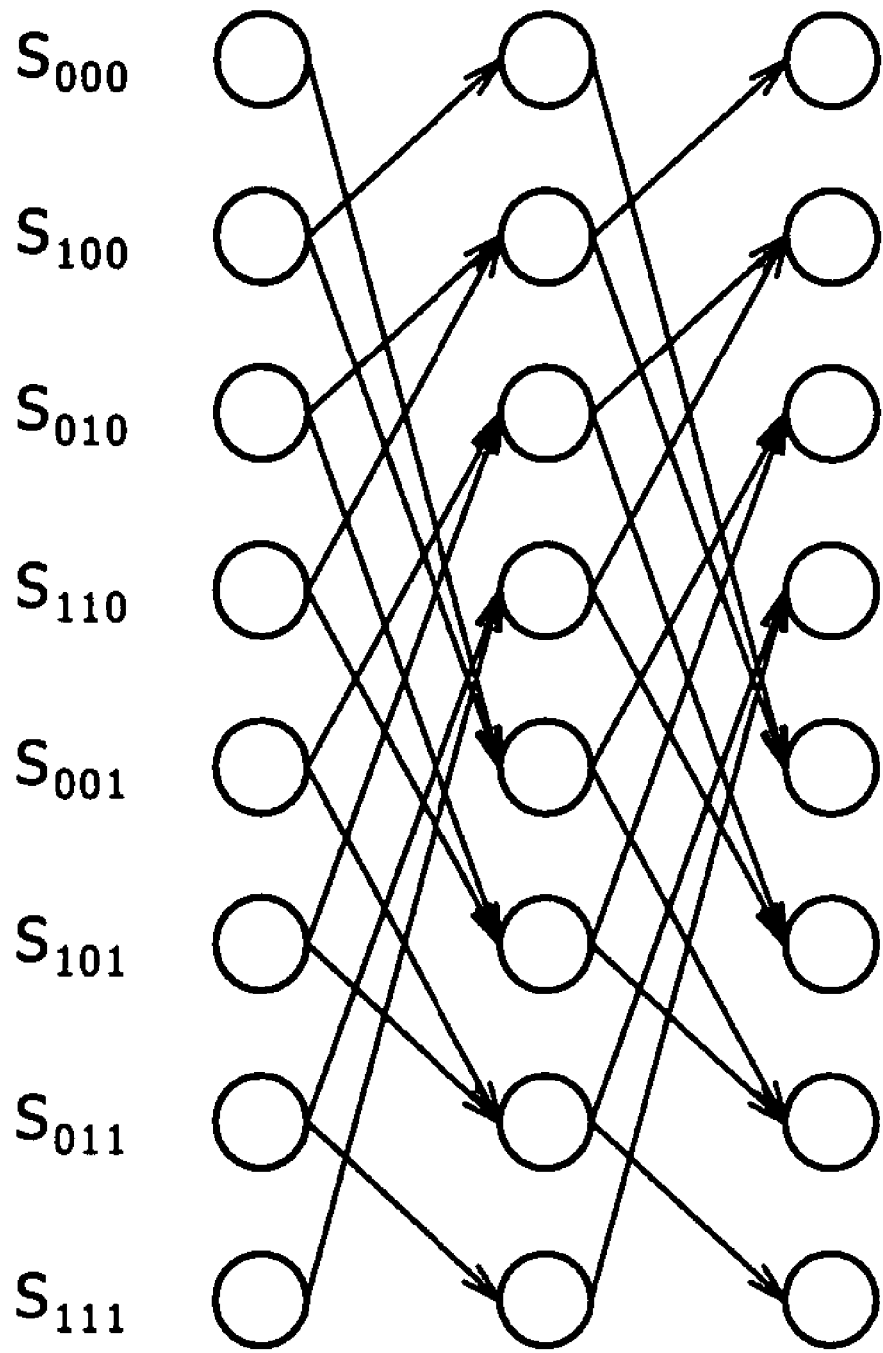
FIG. 12 is a still further trellis diagram.

FIG. 12 is a diagram showing a trellis obtained by combining a coding constraint and state transitions of a partial response for a case in which the length of a memory required for describing the coding constraint is greater than the length of a channel memory of the partial response.

The trellis diagram shown in FIG. 12 shows transitions among eight states, i.e., $S_{000}$, $S_{100}$, $S_{010}$, $S_{110}$, $S_{001}$, $S_{101}$, $S_{011}$, and $S_{111}$.

It is to be noted that transitions starting from state $S_{010}$ are the same as transitions starting from $S_{110}$. By the same token, transitions starting from state $S_{001}$ are the same as transitions starting from $S_{101}$. In the trellis diagram of FIG. 12, state transitions are shown individually. That is to say, the trellis diagram of FIG. 12 is obtained by splitting state $S_{10}$ of the trellis shown in FIG. 6 into states $S_{010}$ and $S_{110}$ and splitting state $S_{01}$ of the trellis shown in FIG. 6 into states $S_{001}$ and $S_{101}$.

To put it concretely, the trellis diagram of FIG. 12 shows a transition from state $S_{000}$ to state $S_{001}$, a transition from state $S_{100}$ to state $S_{000}$ and a transition from state $S_{100}$ to state $S_{001}$. In addition, the trellis diagram also shows a transition from state $S_{010}$ to state $S_{100}$ and a transition from state $S_{100}$ to state $S_{101}$ as well as a transition from state $S_{110}$ to state $S_{100}$ and a transition from state $S_{010}$ to state $S_{110}$. On top of that, the trellis diagram also shows a transition from state $S_{001}$ to state $S_{010}$ and a transition from state $S_{001}$ to state $S_{011}$ as well as a transition from state $S_{101}$ to state $S_{010}$ and a transition from state $S_{101}$ to state $S_{011}$. In addition, the trellis diagram of FIG. 12 also shows a transition from state $S_{011}$ to state $S_{110}$, a transition from state $S_{011}$ to state $S_{111}$ and a transition from state $S_{111}$ to state $S_{110}$.

Figure 6:
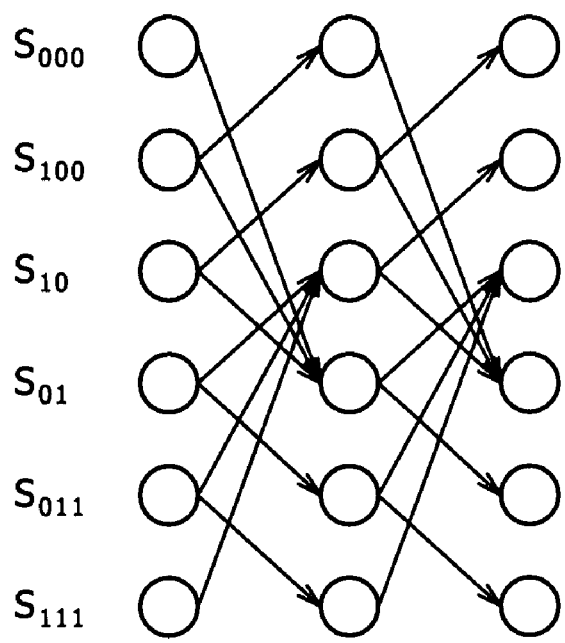
FIG. 6 is a further trellis diagram.

As described above, the trellis diagram of FIG. 12 is obtained by splitting state $S_{10}$ of the trellis shown in FIG. 6 into states $S_{010}$ and $S_{110}$ and splitting state $S_{01}$ of the trellis shown in FIG. 6 into states $S_{001}$ and $S_{101}$. Thus, the maximum value of the number of branches merging in a state is reduced to two.

Figure 13:
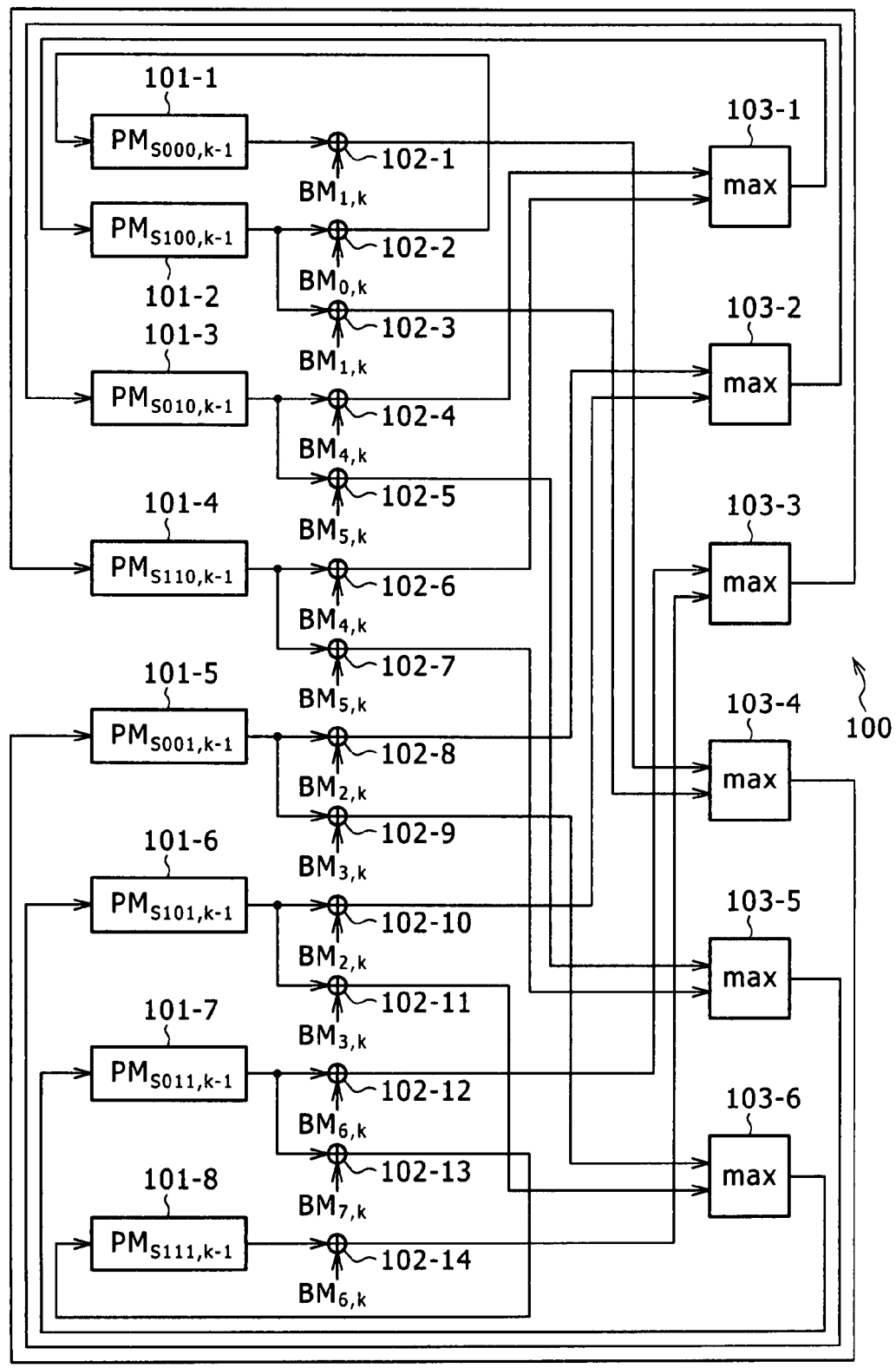
FIG. 13 is a diagram showing a typical configuration of an ACSU employed in a Viterbi decoder provided by the present invention.

FIG. 13 is a diagram showing a typical configuration of an ACSU 100 employed in a Viterbi decoder provided by the present invention as a decoder for decoding channel input bits for every time instant in accordance with the trellis shown in FIG. 12.

First of all, the following description explains equations for a process carried out by the ACSU 100 shown in FIG. 12 as a process for updating the path metric of each state S.

In a partial response with a channel memory length of two, there are a maximum of eight output expected values for channel-bit strings of 000, 001, 010, 011, 100, 101, 110 and 111. In the case of the configuration shown in FIG. 13, the BMU finds branch metrics $BM_{0,k}$, $BM_{1,k}$, $BM_{2,k}$, $BM_{3,k}$, $BM_{4,k}$, $BM_{5,k}$, $BM_{6,k}$ and $BM_{7,k}$ from the output expected values and a signal reproduced at a transition from the time (k−1) to the time k.

It is to be noted that, depending on coefficients of the transfer function of the partial response, the output expected value of a specific channel-bit string may match the output expected value of a channel-bit string other than the specific channel-bit string. Thus, it is not always necessary to find eight different branch metrics.

The path metric of every state S is updated by using eight different branch metrics $BM_{0,k}$ to $BM_{7,k}$ in accordance with path-metric updating equations expressed by Eqs. (8) as follows:

$$PM_{s000,k} = PM_{s100,k-1} + BM_{0,k}$$

$$PM_{s100,k} = \max(PM_{s010,k-1} + BM_{4,k}, PM_{s110,k-1} + BM_{4,k})$$

$$PM_{s010,k} = \max(PM_{s001,k-1}+BM_{2,k}, PM_{s101,k-1}+BM_{2,k})$$

$$PM_{s110,k} = \max(PM_{s011,k-1}+BM_{6,k}, PM_{s111,k-1}+BM_{6,k})$$

$$PM_{s001,k} = \max(PM_{s100,k-1}+BM_{1,k}, PM_{s000,k-1}+BM_{1,k})$$

$$PM_{s101,k} = \max(PM_{s010,k-1}+BM_{5,k}, PM_{s100,k-1}+BM_{5,k})$$

$$PM_{s011,k} = \max(PM_{s001,k-1}+BM_{3,k}, PM_{s101,k-1}+BM_{3,k})$$

$$PM_{s111,k} = PM_{s011,k-1}+BM_{7,k} \qquad (8)$$

The following description explains the configuration of the ACSU 100 for carrying out the updating process based on the path-metric updating equations expressed by Eqs. (8).

The ACSU 100 shown in FIG. 13 includes memories 101-1 to 101-8, adders 102-1 to 102-14 as well as max circuits 103-1 and 103-6.

The memories 101-1 to 101-8 are used for storing respectively path metrics $PM_{s000,k-1}$, $PM_{s100,k-1}$, $PM_{s010,k-1}$, $PM_{s110,k-1}$, $PM_{s001,k-1}$, $PM_{s101,k-1}$, $PM_{s011,k-1}$ and $PM_{s111,k-1}$ of states $S_{000}$, $S_{100}$, $S_{010}$, $S_{110}$, $S_{001}$, $S_{101}$, $S_{011}$ and $S_{111}$ respectively at a time k−1. The memory 101-1 supplies the path metric $PM_{s000,k-1}$ stored therein to the adder 102-1 whereas the memory 101-2 supplies the path metric $PM_{s100,k-1}$ stored therein to the adders 102-2 and 102-3.

The memory 101-3 supplies the path metric $PM_{s010,k-1}$ stored therein to the adders 102-4 and 102-5 whereas the memory 101-4 supplies the path metric $PM_{s110,k-1}$ stored therein to the adders 102-6 and 102-7. The memory 101-5 supplies the path metric $PM_{s001,k-1}$ stored therein to the adders 102-8 and 102-9 whereas the memory 101-6 supplies the path metric $PM_{s101,k-1}$ stored therein to the adders 102-10 and 102-11. The memory 101-7 supplies the path metric $PM_{s011,k-1}$ stored therein to the adders 102-12 and 102-13 whereas the memory 101-8 supplies the path metric $PM_{s111,k-1}$ stored therein to the adder 102-14.

The adder 102-1 adds the path metric $PM_{s000,k-1}$ received from the memory 101-1 to the branch metric $BM_{1,k}$ received from the BMU and outputs a sum obtained as the result of the addition to the max circuit 103-4. The adder 102-2 adds the path metric $PM_{s100,k-1}$ received from the memory 101-2 to the branch metric $BM_{0,k}$ received from the BMU in order to find the path metric $PM_{s000,k}$. That is to say, the adder 102-2 carries out a process based on the first equation from the top of Eqs. (8). The adder 102-2 then feeds back the path metric $PM_{s000,k}$ to the memory 101-1 to be stored therein as the path metric $PM_{s000,k-1}$.

The adder 102-3 adds the path metric $PM_{s100,k-1}$ received from the memory 101-2 to the branch metric $BM_{1,k}$ received from the BMU and outputs a sum obtained as the result of the addition to the max circuit 103-4. The adder 102-4 adds the path metric $PM_{s010,k-1}$ received from the memory 101-3 to the branch metric $BM_{4,k}$ received from the BMU and outputs a sum obtained as the result of the addition to the max circuit 103-1.

The adder 102-5 adds the path metric $PM_{s010,k-1}$ received from the memory 101-3 to the branch metric $BM_{5,k}$ received from the BMU and outputs a sum obtained as the result of the addition to the max circuit 103-5. The adder 102-6 adds the path metric $PM_{s110,k-1}$ received from the memory 101-4 to the branch metric $BM_{4,k}$ received from the BMU and outputs a sum obtained as the result of the addition to the max circuit 103-1. The adder 102-7 adds the path metric $PM_{s110,k-1}$ received from the memory 101-4 to the branch metric $BM_{5,k}$ received from the BMU and outputs a sum obtained as the result of the addition to the max circuit 103-5.

The adder 102-8 adds the path metric $PM_{s001,k-1}$ received from the memory 101-5 to the branch metric $BM_{2,k}$ received from the BMU and outputs a sum obtained as the result of the addition to the max circuit 103-2. The adder 102-9 adds the path metric $PM_{s001,k-1}$ received from the memory 101-5 to the branch metric $BM_{3,k}$ received from the BMU and outputs a sum obtained as the result of the addition to the max circuit 103-6.

The adder 102-10 adds the path metric $PM_{s101,k-1}$ received from the memory 101-6 to the branch metric $BM_{2,k}$ received from the BMU and outputs a sum obtained as the result of the addition to the max circuit 103-2. The adder 102-11 adds the path metric $PM_{s101,k-1}$ received from the memory 101-6 to the branch metric $BM_{3,k}$ received from the BMU and outputs a sum obtained as the result of the addition to the max circuit 103-6. The adder 102-12 adds the path metric $PM_{s011,k-1}$ received from the memory 101-7 to the branch metric $BM_{6,k}$ received from the BMU and outputs a sum obtained as the result of the addition to the max circuit 103-3.

The adder 102-13 adds the path metric $PM_{s011,k-1}$ received from the memory 101-7 to the branch metric $BM_{7,k}$ received from the BMU in order to find the path metric $PM_{s111,k}$. That is to say, the adder 102-13 carries out a process based on the eighth equation from the top of Eqs. (8). The adder 102-13 then feeds back the path metric $PM_{s111,k}$ to the memory 101-8 to be stored therein as the path metric $PM_{s111,k-1}$. The adder 102-14 adds the path metric $PM_{s111,k-1}$ received from the memory 101-8 to the branch metric $BM_{6,k}$ received from the BMU and outputs a sum obtained as the result of the addition to the max circuit 103-3.

The max circuit 103-1 compares the sum received from the adder 102-4 with the sum received from the adder 102-6 in order to select the larger one of the two sums as a maximum value to be used as the path metric $PM_{S100,k}$. That is to say, the max circuit 103-1 carries out a process based on the second equation from the top of Eqs. (8). The max circuit 103-1 then feeds back the path metric $PM_{s100,k}$ to the memory 101-2 to be stored therein as the path metric $PM_{s100,k-1}$.

The max circuit 103-2 compares the sum received from the adder 102-8 with the sum received from the adder 102-10 in order to select the larger one of the two sums as a maximum value to be used as the path metric $PM_{s010,k}$. That is to say, the max circuit 103-2 carries out a process based on the third equation from the top of Eqs. (8). The max circuit 103-2 then feeds back the path metric $PM_{s010,k}$ to the memory 101-3 to be stored therein as the path metric $PM_{s010,k-1}$.

The max circuit 103-3 compares the sum received from the adder 102-12 with the sum received from the adder 102-14 in order to select the larger one of the two sums as a maximum value to be used as the path metric $PM_{s110,k}$. That is to say, the max circuit 103-3 carries out a process based on the fourth equation from the top of Eqs. (8). The max circuit 103-3 then feeds back the path metric $PM_{s110,k}$ to the memory 101-4 to be stored therein as the path metric $PM_{s110,k-1}$.

The max circuit 103-4 compares the sum received from the adder 102-1 with the sum received from the adder 102-3 in order to select the larger one of the two sums as a maximum value to be used as the path metric $PM_{s001,k}$. That is to say, the max circuit 103-4 carries out a process based on the fifth equation from the top of Eqs. (8). The max circuit 103-4 then feeds back the path metric $PM_{s001,k}$ to the memory 101-5 to be stored therein as the path metric $PM_{s001,k-1}$.

The max circuit 103-5 compares the sum received from the adder 102-5 with the sum received from the adder 102-7 in order to select the larger one of the two sums as a maximum value to be used as the path metric $PM_{S101,k}$. That is to say, the max circuit 103-5 carries out a process based on the sixth equation from the top of Eqs. (8). The max circuit 103-5 then feeds back the path metric $PM_{s101,k}$ to the memory 101-6 to be stored therein as the path metric $PM_{s101,k-1}$.

The max circuit 103-6 compares the sum received from the adder 102-9 with the sum received from the adder 102-11 in order to select the larger one of the two sums as a maximum value to be used as the path metric $PM_{s111,k}$. That is to say, the max circuit 103-6 carries out a process based on the seventh equation from the top of Eqs. (8). The max circuit 103-6 then feeds back the path metric $PM_{s111,k}$ to the memory 101-8 to be stored therein as the path metric $PM_{s111,k-1}$.

As described above, the ACSU 100 carries out the decoding process in accordance with a trellis obtained by splitting state $S_{10}$ into states $S_{010}$ and $S_{110}$ and splitting state $S_{01}$ into states $S_{001}$ and $S_{101}$. Thus, the max circuits 103-1 to 103-6 each need to select a larger value from only two sums received from two adders to be used as a maximum value. As a result, the ACSU 100 is capable of carrying out the decoding process fast in comparison with the ACSU 50 shown in FIG. 7 as an ACSU required to select a largest value from three sums received from three adders.

Figure 14:
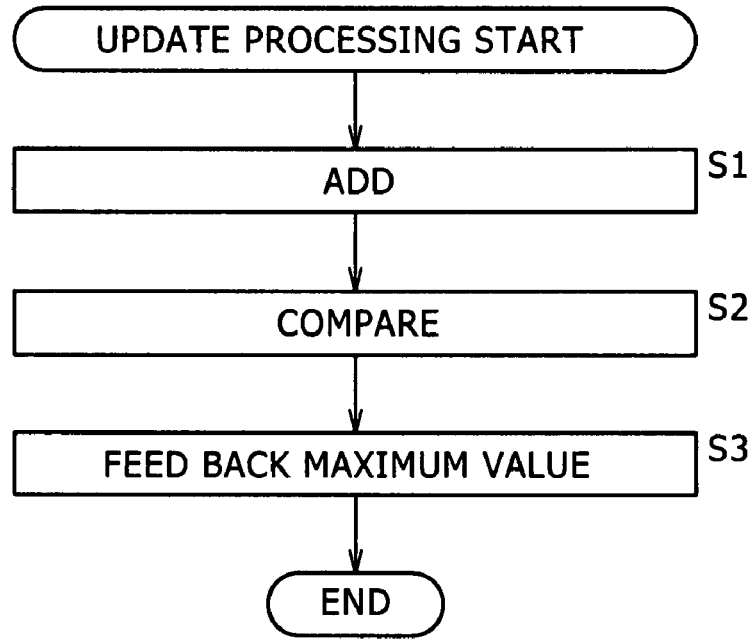
FIG. 14 shows a flowchart to be referred to in explanation of updating processing.

By referring to a flowchart shown in FIG. 14, the following description explains a process carried out by the ACSU 100 shown in FIG. 13 to update the path metric of each state S. This path-metric updating process is started when path metrics $PM_{s,k-1}$ and branch metrics BM are supplied to the adders 102-1 to 102-14.

As shown in FIG. 14, the flowchart begins with a step S1 at which the adder 102-1 adds the path metric $PM_{s000,k-1}$ received from the memory 101-1 to the branch metric $BM_{1,k}$ received from the BMU and outputs a sum obtained as the result of the addition to the max circuit 103-4. By the same token, the adders 102-3 to 102-12 and 102-14 each add the path metric $PM_{s,k-1}$ to a branch metric BM received from the BMU and output a sum obtained as the result of the addition to one of the max circuits 103-1 to 103-6. On the other hand, the adder 102-2 adds the path metric $PM_{s100,k-1}$ received from the memory 101-2 to the branch metric $BM_{0,k}$ received from the BMU in order to find the path metric $PM_{s000,k}$ and feeds back the path metric $PM_{s000,k}$ to the memory 101-1 to be stored therein as the path metric $PM_{s000,k-1}$ whereas the adder 102-13 adds the path metric $PM_{s011,k-1}$ received from the memory 101-7 to the branch metric $BM_{7,k}$ received from the BMU in order to find the path metric $PM_{s111,k}$, and feeds back the path metric $PM_{s111,k}$ to the memory 101-8 to be stored therein as the path metric $PM_{s111,k-1}$.

After the process carried out at the step S1 is completed, the flow of the processing goes on to a step S2 at which the max circuit 103-1 compares the sum received from the adder 102-4 with the sum received from the adder 102-6 in order to select the larger one of the two sums as a maximum value to be used as the path metric $PM_{s100,k}$. By the same token, the max circuit 103-2 to 103-6 each compare two sums received from adders in order to select the larger one of the two sums as a maximum value to be used as a path metric $PM_{s,k}$.

After the process carried out at the step S2 is completed, the flow of the processing goes on to a step S3 at which the max circuit 103-1 feeds back the path metric $PM_{s100,k}$ selected in the process carried out at the step S2 as the maximum value to the memory 101-2 to be stored therein as the path metric $PM_{s100,k-1}$. By the same token, the max circuits 103-2 to 103-6 each feed back the path metric $PM_{s,k}$ selected in the process carried out at the step S2 as the maximum value to one of the memories 101-3 to 101-7 to be stored therein as the path metric $PM_{s,k-1}$.

By referring to FIGS. 15 to 22, the following description explains a Viterbi decoder for decoding a string of channel input bits in accordance with a trellis obtained without splitting states $S_{10}$ and $S_{01}$.

Figure 15:
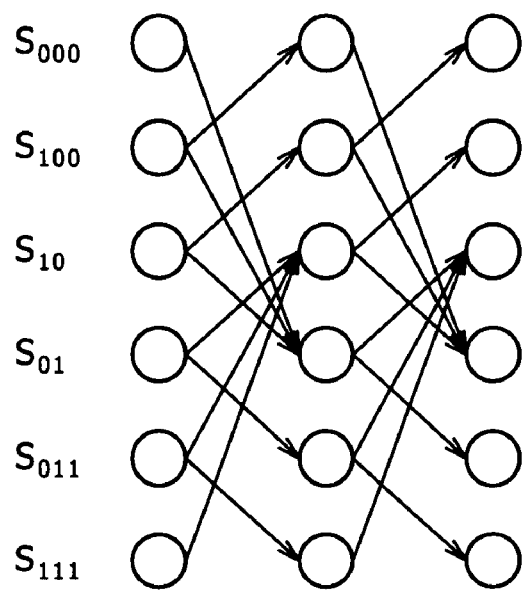
FIG. 15 is a still further trellis diagram.

FIG. 15 is a diagram showing a trellis obtained by combining a coding constraint for recording an RLL code with the maximum bit count k limited to two by adoption of the NRZI recording method and state transitions of a partial response for a case in which the length of a memory required for describing the coding constraint is greater than the length of a channel memory of the partial response.

The trellis shown in FIG. 15 is obtained by combining states $S_{010}$ and $S_{110}$ in the trellis shown in FIG. 12 into state $S_{10}$ and combining states $S_{001}$ and $S_{101}$ in the trellis shown in FIG. 12 into state $S_{01}$. That is to say, the trellis shown in FIG. 15 is identical with the trellis shown in FIG. 6.

Figure 16:
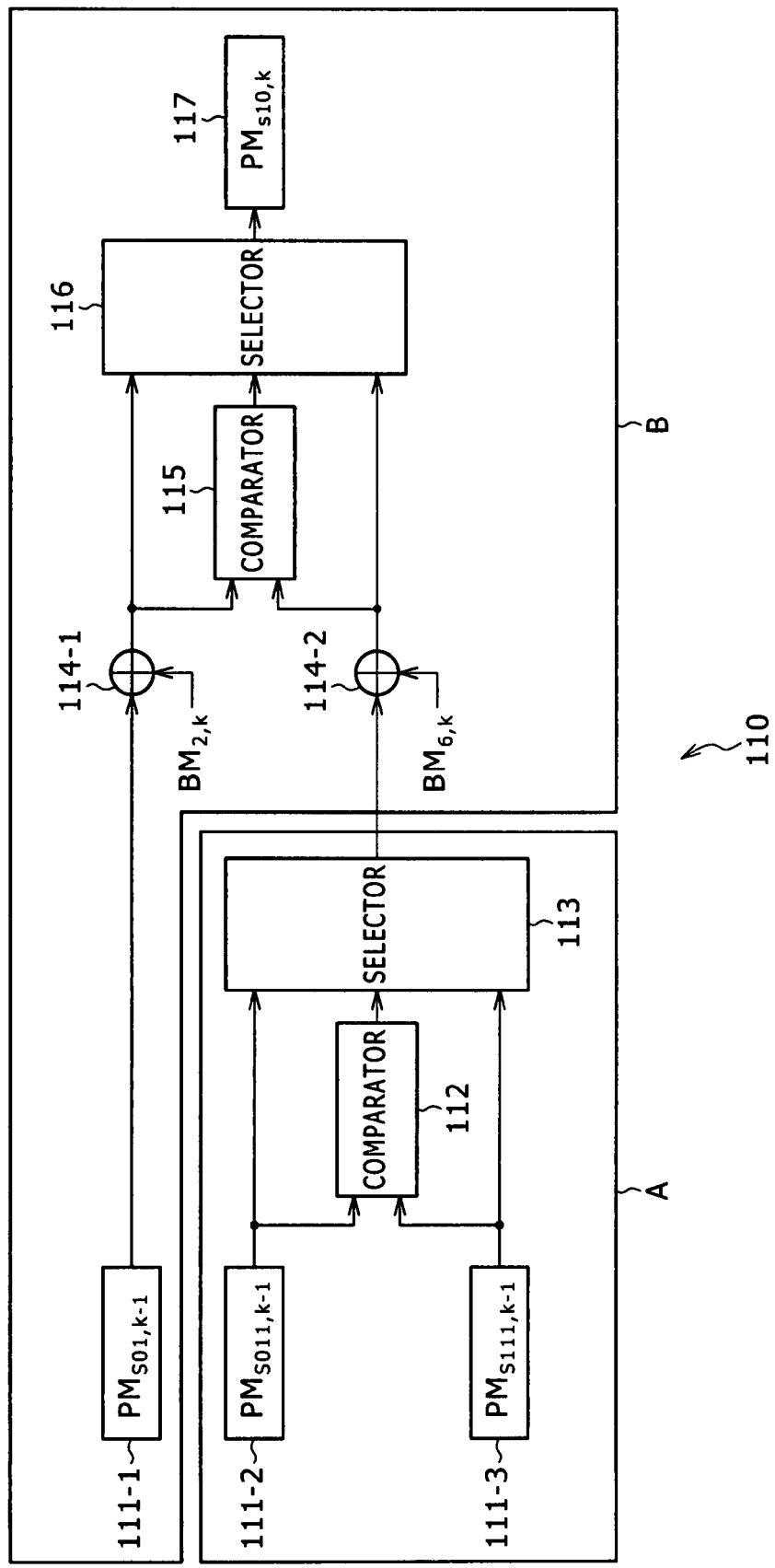
FIG. 16 is a diagram showing a typical configuration of an ACSU employed in a Viterbi decoder provided by the present invention.

FIG. 16 is a block diagram showing a typical configuration of a circuit 110 employed in the ACSU 12 of a Viterbi decoder for decoding a string of channel input bits for every time instant in accordance with the trellis shown in FIG. 15 as a circuit for updating the path metric $PM_{s10,k}$ of state $S_{10}$.

As shown in FIG. 16, the circuit 110 employs memories 111-1 to 111-3 and 117, comparators 112 and 115, selectors 113 and 116 as well as adders 114-1 to 114-2. The circuit 110 is a circuit for carrying out a process based on the third equation from the top of Eqs. (1) described earlier.

The memory 111-1 is used for storing a path metric $PM_{s01,k-1}$ to be supplied to the adder 114-1. The memory 111-2 is used for storing a path metric $PM_{s011,k-1}$ to be supplied to the comparator 112 and the selector 113. By the same token, the memory 111-3 is used for storing a path metric $PM_{s111,k-1}$ to be supplied to the comparator 112 and the selector 113.

The comparator 112 compares the path metric $PM_{s011,k-1}$ received from the memory 111-2 with the path metric $PM_{s111,k-1}$ received from the memory 111-3 in order to select the larger one of the path metrics $PM_{s011,k-1}$ and $PM_{s111,k-1}$ as a maximum value and supplies information on the selected larger path metric to the selector 113 as a result of the comparison.

On the basis of the comparison result received from the comparator 112, the selector 113 selects the larger one of the path metric $PM_{s011,k-1}$ received from the memory 111-2 and the path metric $PM_{s111,k-1}$ received from the memory 111-3 as a maximum path metric max $(PM_{s011,k-1}, PM_{s111,k-1})$, supplying max $(PM_{s011,k-1}, PM_{s111,k-1})$ to the adder 114-2.

The adder 114-1 adds the path metric $PM_{s01,k-1}$ received from the memory 111-1 to a branch metric $BM_{2,k}$ received from the BMU and supplies the sum $(PM_{s01,k-1}+BM_{2,k})$ obtained as the result of the addition to the comparator 115 and the selector 116. On the other hand, the adder 114-2 adds the maximum path metric max $(PM_{s011,k-1}, PM_{s111,k-1})$ received from the selector 113 to a branch metric $BM_{6,k}$ received from the BMU and supplies the sum (max $(PM_{s011,k-1}, PM_{s111,k-1})+BM_{6,k})$ obtained as the result of the addition to the comparator 115 and the selector 116.

The comparator 115 compares the sum received from the adder 114-1 with the sum received from the adder 114-2 in order to select the larger one of the two sums and supplies information on the selected larger sum to the selector 116 as a result of the comparison. On the basis of the comparison result received from the comparator 115, the selector 116 selects the larger one of the sum $(PM_{s01,k-1}+BM_{2,k})$ received from the adder 114-1 and the sum (max($PM_{s011,k-1}$, $PM_{s111,k-1}$)+$BM_{6,k}$) received from the adder 114-2 as a maximum sum max ((max($PM_{s011,k-1}$, $PM_{s111,k-1}$)+$BM_{6,k}$, $PM_{s01,k-1}+BM_{2,k}$)). The maximum sum max((max($PM_{s011}$, k−1, $PM_{s111,k-1}$)+$BM_{6,k}$), ($PM_{s01,k-1}$+$BM_{2,k}$)) is used as a path metric $PM_{s10,k}$, which is fed back to the memory 117 to be stored therein. The path metric $PM_{s10,k}$ is used as a path metric $PM_{s10,k-1}$ in the second equation from the top of Eqs. (1).

As described above, the circuit 110 shown in FIG. 16 finds max(max($PM_{s011,k-1}$, $PM_{s111,k-1}$)+$BM_{6,k}$, $PM_{s01,k-1}$+$BM_{2,k}$), the order of which is obtained by rearranging the order of the expression max($PM_{s01,k-1}$+$BM_{2,k}$, $PM_{s011,k-1}$, +$M_{6,k}$, $PM_{s111,k-1}$, +$M_{6,k}$) on the right side of the third equation from the top of Eqs. (1). To put it concretely, first of all, the circuit 110 finds the larger one of the path metrics $PM_{s011,k-1}$ and $PM_{s111,k-1}$, adding the larger path metric to the branch metric $BM_{6,k}$ to give a sum as the result of the addition. Then, the circuit 110 finds the larger one of the result of the addition and the sum of the path metric $PM_{s01,k-1}$ and the branch metric $BM_{2,k}$.

Figure 7:
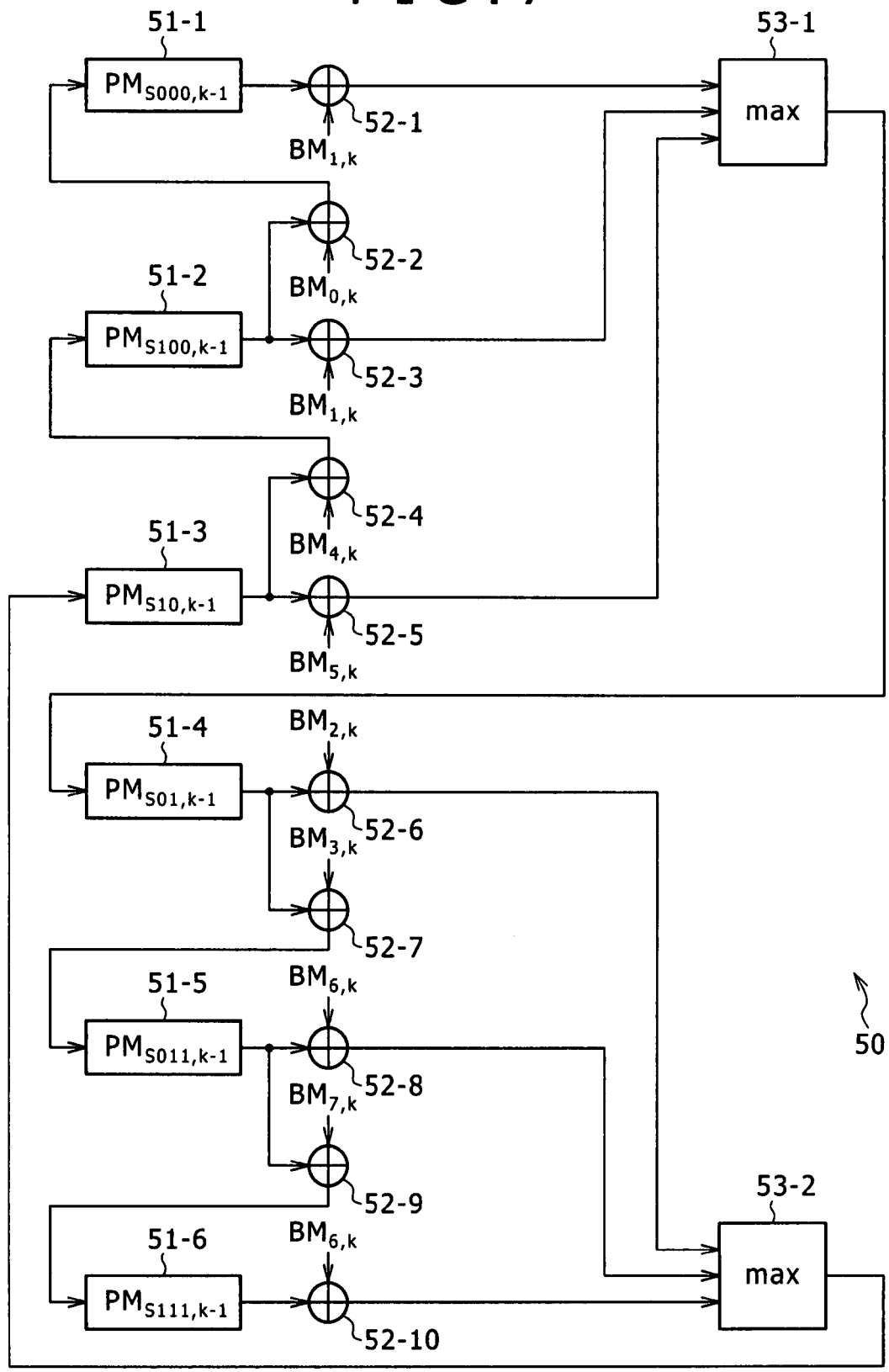
FIG. 7 is a block diagram showing a typical configuration of an ACSU employed in the conventional Viterbi decoder.

Thus, the circuit 110 shown in FIG. 16 can be created by eliminating an adder from a partial circuit included in the ACSU 50 shown in FIG. 7 as a partial circuit for updating the path metric of state $S_{10}$. As shown in FIG. 7, the partial circuit for updating the path metric of state $S_{10}$ has the memories 51-4 to 51-6, the adders 52-6, 52-8 and 52-10 as well as the max circuit 53-2. To put it in detail, since the max circuit 53-2 is a circuit for comparing three input values with each other in order to select the largest one among the three input values as a maximum value, the max circuit 53-2 is equivalent to a partial circuit included in the circuit 110 shown in FIG. 16 as a partial circuit consisting of the comparators 112 and 115 as well as the selectors 113 and 116. Thus, the circuit 110 shown in FIG. 16 can be created by eliminating an adder from the partial circuit included in the ACSU 50 shown in FIG. 7 as the partial circuit for updating the path metric of state $S_{10}$.

Figure 17:
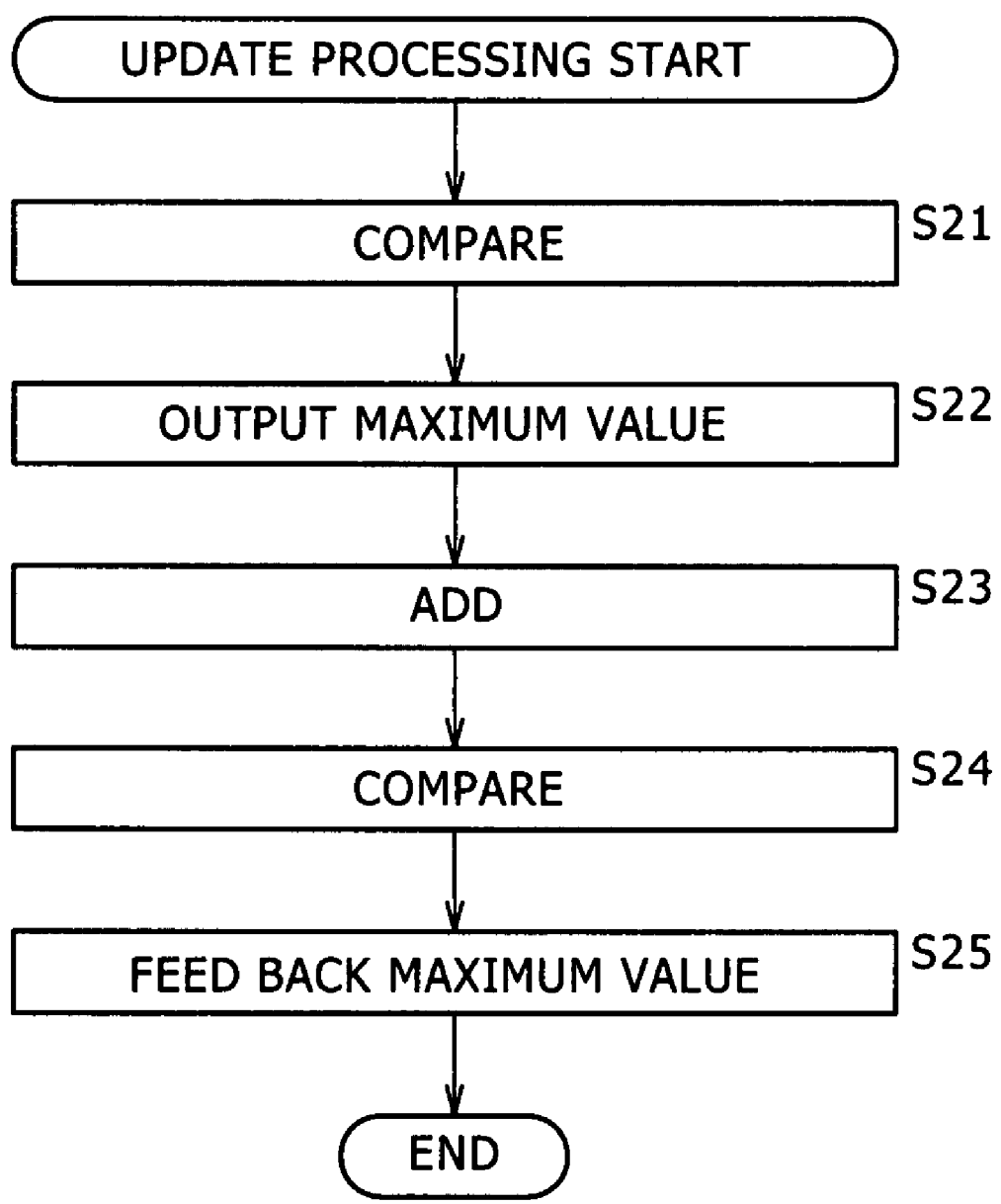
FIG. 17 shows a flowchart to be referred to in explanation of other updating processing.

By referring to a flowchart shown in FIG. 17, the following description explains processing carried out by the circuit 110 to update the path metric of state $S_{10}$. The processing carried out by the circuit 110 to update the path metric of state $S_{10}$ is started when the path metrics $PM_{s01,k-1}$, $PM_{s011,k-1}$ and $PM_{s111,k-1}$ are supplied to the adder 114-1 or the comparator 112.

As shown in the figure, the flowchart begins with a step S21 at which the comparator 112 compares the path metric $PM_{s011,k-1}$ received from the memory 111-2 with the path metric $PM_{s111,k-1}$ received from the memory 111-3 in order to select the larger one of the path metrics $PM_{s011,k-1}$ and $PM_{s111,k-1}$ and supplies information on the selected larger path metric to the selector 113 as a result of the comparison.

After the process carried out at the step S21 is completed, the flow of the processing goes on to a step S22 at which, on the basis of the comparison result received from the comparator 112, the selector 113 selects the larger one of the path metric $PM_{s011,k-1}$ received from the memory 111-2 and the path metric $PM_{s111,k-1}$ received from the memory 111-3 as a maximum path metric max ($PM_{s011,k-1}$, $PM_{s111,k-1}$), supplying the maximum path metric max ($PM_{s011,k-1}$, $PM_{s111,k-1}$) to the adder 114-2. Then, the flow of the processing goes on to a step S23.

At the step S23, the adder 114-2 adds the maximum path metric max ($PM_{s011,k-1}$, $PM_{s111,k-1}$) received from the selector 113 to a branch metric $BM_{6,k}$ received from the BMU and supplies the sum (max($PM_{s011,k-1}$, $PM_{s111,k-1}$)+$BM_{6,k}$) obtained as the result of the addition to the comparator 115 and the selector 116. On the other hand, the adder 114-1 adds the path metric $PM_{s01,k-1}$ received from the memory 111-1 to a branch metric $BM_{2,k}$ received from the BMU and supplies the sum ($PM_{s01,k-1}$+$BM_{2,k}$) obtained as the result of the addition to the comparator 115 and the selector 116.

After the process carried out at the step S23 is completed, the flow of the processing goes on to a step S24 at which the comparator 115 compares the sum received from the adder 114-1 with the sum received from the adder 114-2 in order to select the larger one of the two sums and supplies information on the selected larger sum to the selector 116 as a result of the comparison.

After the process carried out at the step S24 is completed, the flow of the processing goes on to a step S25 at which, on the basis of the comparison result received from the comparator 115, the selector 116 selects the larger one of the sum ($PM_{s01,k-1}$+$BM_{2,k}$) received from the adder 114-1 and the sum (max($PM_{s011,k-1}$, $PM_{s111,k-1}$)+$BM_{6,k}$) received from the adder 114-2 as a maximum sum max ((max($PM_{s011,k-1}$, $PM_{s111,k-1}$)+$BM_{6,k}$, $PM_{s01,k-1}$+$BM_{2,k}$)). The maximum sum max ((max($PM_{s011,k-1}$, $PM_{s111,k-1)+BM6,k}$, $PM_{s01,k-1}$+$BM_{2,k}$)) is used as a path metric $PM_{s10,k}$, which is fed back to the memory 117 to be stored therein. After the process carried out at the step S25 is completed, the processing represented by the flowchart shown in FIG. 17 is ended.

As described above, in a circuit enclosed in a rectangular block A shown in FIG. 16 as a portion of the circuit 110, the memories 111-2 and 111-3, the comparator 112 and the selector 113 compare first two values in order to find the larger one of the two values. Then, in a circuit enclosed in a rectangular block B shown in FIG. 16 as another portion of the circuit 110, the memory 111-1, the adders 114-1 and 114-2, the comparator 115 and the selector 116 carry out addition processes in order to give second two values and a comparison process on the second two values in order to find the larger one of the second two values.

Figure 18:
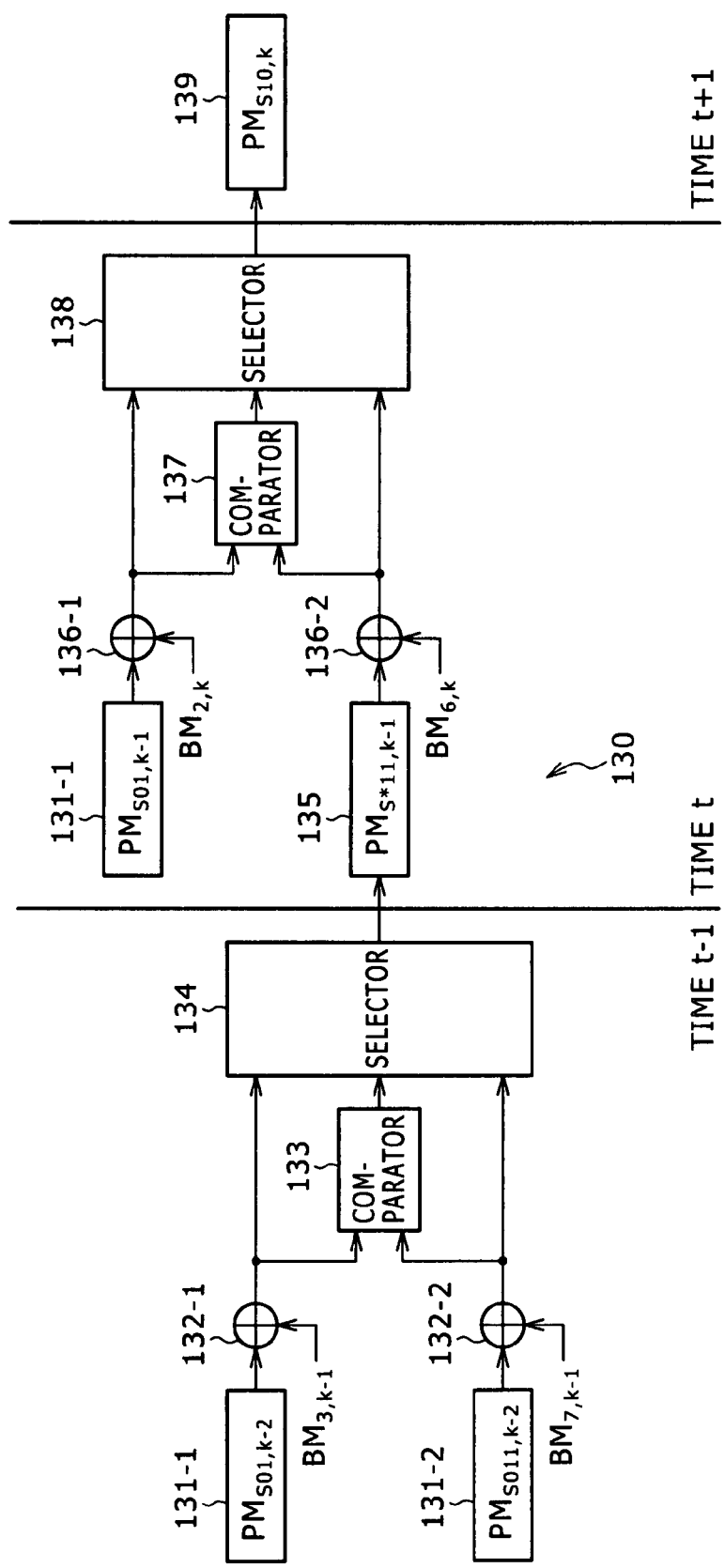
FIG. 18 is a diagram to be referred to in explanation of processing carried out by an ACSU employed in a Viterbi decoder provided by the present invention.

FIG. 18 is a block diagram showing a typical configuration of a circuit 130 employed in the ACSU 12 of a Viterbi decoder, which is provided by the present invention as a decoder for decoding a string of channel input bits for every time instant in accordance with the trellis shown in FIG. 15, as a circuit for updating the path metric $PM_{s10,k}$ of state $S_{10}$. Processing carried out by the circuit 130 to update the path metric $PM_{s10,k}$ of state $S_{10}$ is explained by referring to FIG. 18.

The circuit 130 shown in FIG. 18 operates as if the circuit enclosed in the rectangular block A shown in FIG. 16 as a circuit consisting of the memories 111-2 and 111-3, the comparator 112 and the selector 113 carries out a path-metric updating process at a time instant immediately preceding the time instant of a path-metric updating process carried out by the circuit enclosed in the rectangular block B shown in FIG. 16 as another circuit consisting of the memory 111-1, the adders 114-1 and 114-2, the comparator 115 and the selector 116.

To put it in detail, first of all, at a time (t−1), the circuit enclosed in the rectangular block A consisting of the memories 111-2 and 111-3, the comparator 112 and the selector 113 carries out a path-metric updating process. To put it concretely, at the time (t−1), in the circuit 130 shown in FIG. 18, an adder 132-1 receives a path metric $PM_{s01,k-2}$ from a memory 131-1 and a branch metric $BM_{3,k-2}$ from the BMU, adding the path metric $PM_{s01,k-2}$ received from the memory 131-1 to the branch metric $BM_{3,k-2}$ received from the BMU in order to find a path metric $PM_{s011,k-1}$. At the same time t−1, an adder 132-2 receives a path metric $PM_{s011,k-2}$ from a memory 131-2 and a branch metric $BM_{7,k-1}$ from the BMU, adding the path metric $PM_{s011,k-2}$ received from the memory 131-2 to the branch metric $BM_{7,k-1}$ received from the BMU in order to find a path metric $PM_{s111,k-1}$.

That is to say, the adder 132-1 finds the path metric $PM_{s011,k-1}$ in accordance with the fifth equation from the top of Eqs. (1) whereas the adder 132-2 finds the path metric $PM_{s111,k-1}$ in accordance with the sixth equation from the top of Eqs. (1).

Then, the adder 132-1 supplies the path metric $PM_{s011,k-1}$ to a comparator 133 and a selector 134 whereas the adder 132-2 supplies the path metric $PM_{s111,k-1}$ to the comparator 133 and the selector 134. In the same way as the comparator 112 employed in the circuit 110 shown in FIG. 16, the comparator 133 compares the path metric $PM_{s011,k-1}$ received from the adder 132-1 with the path metric $PM_{s111,k-1}$ received from the adder 132-2 in order to select the larger one of the path metrics $PM_{s011,k-1}$ and $PM_{s111,k-1}$ and supplies information on the selected larger path metric to the selector 134 as a result of the comparison.

In the same way as the selector 113 employed in the circuit 110 shown in FIG. 16, on the basis of the comparison result received from the comparator 133, the selector 134 selects the larger one of the path metric $PM_{s011,k-1}$ received from the memory 131-1 and the path metric $PM_{s111,k-1}$ received from the memory 131-2 as a maximum path metric max $(PM_{s011,k-1}, PM_{s111,k-1})$, supplying the maximum path metric max $(PM_{s011,k-1}, PM_{s111,k-1})$ to a memory 135 as a path metric $PM_{s*11,k-1}$. It is quite within the bounds of possibility that the path metric $PM_{s*11,k-1}$ is selected as a path metric $PM_{s10,k}$ of state $S_{10,k}$ at a time t immediately succeeding the time (t−1). The circuit 130 carries out the processing described above in one time instant.

As described above, at the time (t−1), the circuit 130 finds the path metrics $PM_{s011,k-1}$ and $PM_{s111,k-1}$ and carries out the processing of the circuit enclosed in the rectangular block A shown in FIG. 16. As described earlier, the processing of the circuit enclosed in the rectangular block A shown in FIG. 16 is first comparison and selection processes.

Then, at the time t, the circuit enclosed in the rectangular block B shown in FIG. 16 as another circuit consisting of the memory 111-1, the adders 114-1 and 114-2, the comparator 115 and the selector 116 carries out a path-metric updating process. To put it concretely, at the time t, in the circuit 130 shown in FIG. 18, an adder 136-1 receives a path metric $PM_{s01,k-1}$ from a memory 131-1 and a branch metric $BM_{2,k}$ from the BMU, adding the path metric $PM_{s01,k-1}$ received from the memory 131-1 to the branch metric $BM_{2,k}$ received from the BMU in order to find a sum $(PM_{s01,k-1}+BM_{2,k})$ as the result of the addition. The adder 136-1 supplies the sum $(PM_{s01,k-1}+BM_{2,k})$ to a comparator 137 and a selector 138.

At the same time t, an adder 136-2 receives a path metric $PM_{s*11,k-1}$ from the memory 135 and a branch metric $BM_{6,k}$ from the BMU, adding the path metric $PM_{s*11,k-1}$ received from the memory 135 to the branch metric $BM_{6,k}$ received from the BMU in order to find a sum $(PM_{s*11,k-1}+BM_{6,k})$ as the result of the addition. The adder 136-2 supplies the sum $(PM_{s*11,k-1}+BM_{6,k})$, which is a sum $(max(PM_{s011,k-1}, PM_{s111,k-1})+BM_{6,k})$ to the comparator 137 and the selector 138.

The comparator 137 compares the sum $(PM_{s01,k-1}+BM_{2,k})$ received from the adder 136-1 with the sum $(max(PM_{s011,k-1}, PM_{s111,k-1})+BM_{6,k})$ received from the adder 136-2 in order to select the larger one of the sum $(PM_{s01,k-1}+BM_{2,k})$ and the sum $(max(PM_{s011,k-1}, PM_{s111,k-1})+BM_{6,k})$ and supplies information on the selected larger sum to a selector 138 as a result of the comparison. The larger one of the sum $(PM_{s01,k-1}+BM_{2,k})$ and the sum $(max(PM_{s011,k-1}, PM_{s111,k-1})+BM_{6,k})$ is referred to as max $((max(PM_{s011,k-1}, PM_{s111,k-1})+BM_{6,k}), (PM_{s01,k-1}+BM_{2,k}))$. On the basis of the comparison result received from the comparator 137, the selector 138 selects the larger one of the sum $(PM_{s01,k-1}+BM_{2,k})$ received from the adder 136-1 and the sum (max $(PM_{s011,k-1}, PM_{s111,k-1})+BM_{6,k})$ received from the adder 136-2 as a maximum sum max $((max(PM_{s011,k-1}, PM_{s111,k-1})+BM_{6,k}, PM_{s01,k-1}+BM_{2,k}))$ feeding back the maximum sum max $((max(PM_{s011,k-1}, PM_{s111,k-1})+BM_{6,k}, PM_{s01,k-1}+BM_{2,k}))$ as a path metric $PM_{s10,k}$ to a memory 139 to be stored therein. The path metric $PM_{s10,k}$ is used as a path metric $PM_{s10,k-1}$ in the computation based on the second equation from the top of Eqs. (1). The circuit 130 carries out the processing described above in one time instant.

As described above, the circuit 130 shown in FIG. 18 carries out the first comparison and selection processes at a time preceding the present time by one time instant and stores the result of the first comparison and selection processes in the memory 135. Thus, the processing carried out in one time instant by the circuit 130 at a time t at which the path metrics $PM_{s01,k-1}$ and $PM_{s*11,k-1}$ computed at the time (k−1) are received is addition processes as well as second comparison and selection processes. Therefore, the time it takes to carry out the processing performed in one time instant can be made short in comparison with the processing carried out by the circuit 110 shown in FIG. 16. As a result, the processing can be carried out at a high speed.

The processing carried out by the circuit 130 shown in FIG. 18 as described above is processing to update the path metric $PM_{s10,k}$ of state $S_{10}$. It is to be noted, however, that processing to update the path metric $PM_{s01,k}$ of state $S_{01}$ in which three branches merge can be carried out in the same way as the processing carried out by the circuit 130 as explained above by referring to FIG. 18.

Figure 19:
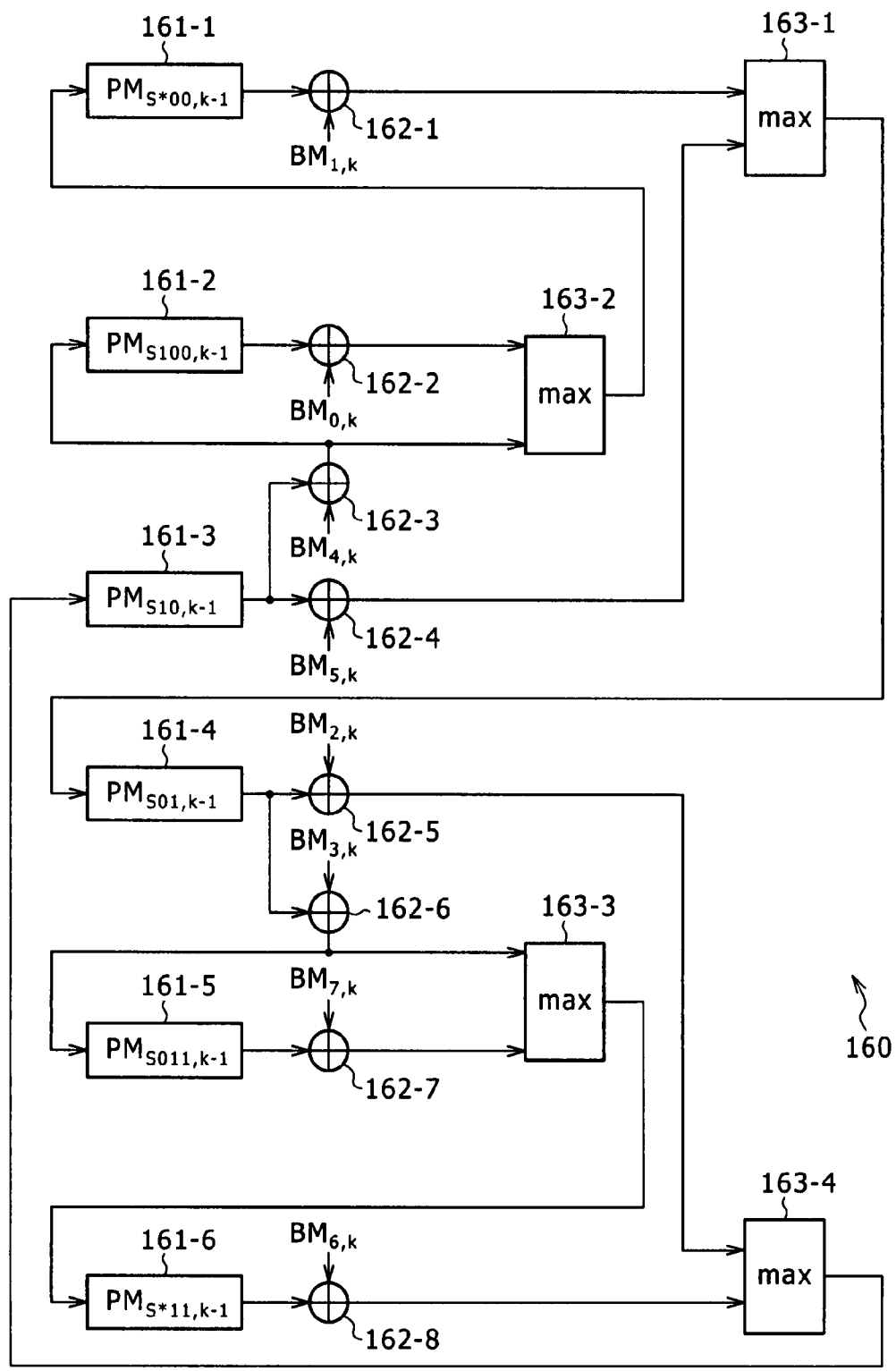
FIG. 19 is a diagram showing another typical configuration of the ACSU employed in a Viterbi decoder provided by the present invention.

FIG. 19 is a block diagram showing a typical configuration of an ACSU 160 for carrying out the processing explained earlier by referring to FIG. 18.

First of all, the following description explains equations used in processing carried out by the ACSU 160 shown in FIG. 19 to update the path metrics of states S. As explained above by referring to FIG. 18, in the ACSU 160 shown in FIG. 19, processing to update the path metrics $PM_{s10,k}$ and $PM_{s01,k}$ of respectively states $S_{10}$ and $S_{01}$ in which three branches merge is first comparison and selection processes at an immediately preceding time, and the results of the first comparison and selection processes are stored in memories. Thus, the path-metric equations can be expressed by Eqs. (9) as follows:

$$PM_{s*00,k}=\max(PM_{s100,k-1}+BM_{0,k}, PM_{s10,k-1}+BM_{4,k})$$

$$PM_{s100,k}=PM_{s10,k-1}+BM_{4,k}$$

$$PM_{s10,k}=\max(PM_{s01,k-1}+BM_{2,k}, PM_{s*11,k-1}+BM_{6,k})$$

$$PM_{s01,k}=\max(PM_{s10,k-1}+BM_{5,k}, PM_{s*00,k-1}+BM_{1,k})$$

$$PM_{s011,k}=PM_{s01,k-1}+BM_{3,k}$$

$$PM_{s*11,k}=\max(PM_{s011,k-1}+BM_{7,k}, PM_{s01,k-1}+BM_{3,k}) \quad (9)$$

It is to be noted that, in Eqs. (9), the path metric $PM_{s*00,k}$ is the larger one of the path metrics $PM_{s000,k}$ and $PM_{s100,k}$ at a time k. It is quite within the bounds of possibility that the path metric $PM_{s*00,k}$ is selected as a path metric $PM_{s01,k+1}$ of state $S_{01,k+1}$ at a time (t+1) immediately succeeding the time t.

In a process to update path metrics $PM_{s,k}$ in accordance with Eqs. (9), it is not necessary to select the largest one among three or more sums as a maximum value at a point of time. That is to say, in accordance with Eqs. (9), in the same way as a trellis in which the maximum value of the number of branches merging in the same state S is two, the larger one of only two sums is selected from at a point of time as a maximum value in order to update a path metric $PM_{s,k}$. Thus, the time it takes to carry out the path-metric updating process at a point of time can be shortened. As a result, the speed of the decoding process can be increased.

The following description explains the configuration of the ACSU 160 for carrying out the path-metric updating process in accordance with Eqs. (9).

As shown in FIG. 19, the ACSU 160 employs memories 161-1 to 161-6, adders 162-1 to 162-8 and maximum circuits 163-1 to 163-4.

It is to be noted that the memories 161-4, 161-5 and 161-6 employed in the ACSU 160 correspond to the memories 131-1, 131-2, 135 and 139 employed in the circuit 130 shown in FIG. 18. By the same token, the adders 162-6, 162-7, 162-5 and 162-8 employed in the ACSU 160 correspond to the adders 132-1, 132-2, 136-1 and 136-2 employed in the circuit 130 shown in FIG. 18. Likewise, the max circuit 163-3 employed in the ACSU 160 corresponds to the comparator 133 and the selector 134, which are employed in the circuit 130 shown in FIG. 18, whereas the max circuit 163-4 employed in the ACSU 160 corresponds to the comparator 137 and the selector 138, which are employed in the circuit 130 shown in FIG. 18.

The memory 161-1 is used for storing a path metric $PM_{s*00,k-1}$ output by the max circuit 163-2. The memory 161-1 supplies a path metric $PM_{s*00,k-1}$ already stored therein to the adder 162-1. The memory 161-2 is used for storing a path metric $PM_{s100,k-1}$ output by the adder 162-3. The memory 161-2 supplies a path metric $PM_{s100,k-1}$ already stored therein to the adder 162-2.

The memory 161-3 is used for storing a path metric $PM_{s10,k-1}$ output by the max circuit 163-4. The memory 161-3 supplies a path metric $PM_{s10,k-1}$ already stored therein to the adders 162-3 and 162-4. The memory 161-4 is used for storing a path metric $PM_{s01,k-1}$ output by the max circuit 163-1. The memory 161-4 supplies a path metric $PM_{s01,k-1}$ already stored therein to the adders 162-5 and 162-6.

The memory 161-5 is used for storing a path metric $PM_{s011,k-1}$ output by the adder 162-6. The memory 161-5 supplies a path metric $PM_{s011,k-1}$ already stored therein to the adder 162-7. The memory 161-6 is used for storing a path metric $PM_{s*11,k-1}$ output by the max circuit 163-3. The memory 161-6 supplies a path metric $PM_{s*11,k-1}$ already stored therein to the adder 162-8.

The adder 162-1 receives a path metric $PM_{s*00,k-1}$ from the memory 161-1 and a branch metric $BM_{1,k}$ from the BMU, adding the path metric $PM_{s*00,k-1}$ received from the memory 161-1 to the branch metric $BM_{1,k}$ received from the BMU in order to find a sum $(PM_{s*00,k-1}+BM_{1,k})$ as the result of the addition, and supplies the sum $(PM_{s*00,k-1}+BM_{1,k})$ to the max circuit 163-1. The adder 162-2 receives a path metric $PM_{s100,k-1}$ from the memory 161-2 and a branch metric $BM_{0,k}$ from the BMU, adding the path metric $PM_{s100,k-1}$ received from the memory 161-2 to the branch metric $BM_{0,k}$ received from the BMU in order to find a sum $(PM_{s100,k-1}+BM_{0,k})$ as the result of the addition, and supplies the sum $(PM_{s100,k-1}+BM_{0,k})$ to the max circuit 163-2.

In addition, the adder 162-3 receives a path metric $PM_{s10,k-1}$ from the memory 161-3 and a branch metric $BM_{4,k}$ from the BMU, adding the path metric $PM_{s10,k-1}$ received from the memory 161-3 to the branch metric $BM_{4,k}$ received from the BMU in order to find a path metric $PM_{s100,k}$ as the addition result, which is a sum $(PM_{s10,k-1}+BM_{4,k})$. That is to say, the adder 162-3 carries out a path-metric updating process based on the second equation from the top of Eqs. (9). Then, the adder 162-3 feeds back the path metric $PM_{s100,k}$ to the memory 161-2 as a path metric $PM_{s100,k-1}$ and supplies the path metric $PM_{s100,k}$ to the max circuit 163-2.

In addition, the adder 162-4 receives a path metric $PM_{s10,k-1}$ from the memory 161-3 and a branch metric $BM_{4,k}$ from the BMU, adding the path metric $PM_{s10,k-1}$ received from the memory 161-3 to the branch metric $BM_{5,k}$ received from the BMU in order to find a sum $(PM_{s10,k-1}+BM_{5,k})$ as the result of the addition. Then, the adder 162-4 supplies the sum $(PM_{s10,k-1}+BM_{5,k})$ to the max circuit 163-1. The adder 162-5 receives a path metric $PM_{s01,k-1}$ from the memory 161-4 and a branch metric $BM_{2,k}$ from the BMU, adding the path metric $PM_{s01,k-1}$ received from the memory 161-4 to the branch metric $BM_{2,k}$ received from the BMU in order to find a sum $(PM_{s01,k-1}+BM_{2,k})$ as the result of the addition. Then, the adder 162-5 supplies the sum $(PM_{s01,k-1}+BM_{2,k})$ to the max circuit 163-4.

In addition, the adder 162-6 receives a path metric $PM_{s01,k-1}$ from the memory 161-4 and a branch metric $BM_{3,k}$ from the BMU, adding the path metric $PM_{s01,k-1}$ received from the memory 161-4 to the branch metric $BM_{3,k}$ received from the BMU in order to find a path metric $PM_{s011,k}$ as the addition result, which is a sum $(PM_{s01,k-1}+BM_{3,k})$. That is to say, the adder 162-6 carries out a path-metric updating process based on the fifth equation from the top of Eqs. (9). Then, the adder 162-6 feeds back the path metric $PM_{s011,k}$ to the memory 161-5 as a path metric $PM_{s011,k-1}$ and supplies the path metric $PM_{s011,k}$ to the max circuit 163-3.

In addition, the adder 162-7 receives a path metric $PM_{s011,k-1}$ from the memory 161-5 and a branch metric $BM_{7,k}$ from the BMU, adding the path metric $PM_{s011,k-1}$ received from the memory 161-5 to the branch metric $BM_{7,k}$ received from the BMU in order to find a sum $(PM_{s011,k-1}+BM_{7,k})$ as the result of the addition. Then, the adder 162-7 supplies the sum $(PM_{s011,k-1}+BM_{7,k})$ to the max circuit 163-3. The adder 162-8 receives a path metric $PM_{s*11,k-1}$ from the memory 161-6 and a branch metric $BM_{6,k}$ from the BMU, adding the path metric $PM_{s*11,k-1}$ received from the memory 161-6 to the branch metric $BM_{6,k}$ received from the BMU in order to find a sum $(PM_{s*11,k-1}+BM_{6,k})$ as the result of the addition. Then, the adder 162-8 supplies the sum $(PM_{s*11,k-1}+BM_{6,k})$ to the max circuit 163-4.

The max circuit 163-1 compares the sum $(PM_{S*00,k-1}+BM_{1,k})$ received from the adder 162-1 with the sum $(PM_{S10,k-1}+BM_{5,k})$ received from the adder 162-4 in order to find the larger sum max $(PM_{s*00,k-1}+BM_{1,k}, PM_{S10,k-1}+BM_{5,k})$ of the two sums as a path metric $PM_{S01,k}$. That is to say, the max circuit 163-1 carries out a path-metric updating process based on the fourth equation from the top of Eqs. (9). Then, the max circuit 163-1 feeds back the path metric $PM_{S01,k}$ to the memory 161-4 as a path metric $PM_{S01,k-1}$.

In addition, the max circuit 163-2 compares the sum $(PM_{S100,k-1}+BM_{0,k})$ received from the adder 162-2 with the sum $(PM_{S10,k-1}+BM_{4,k})$ received from the adder 162-3 in order to find the larger sum max $(PM_{S100,k-1}+BM_{0,k}, PM_{S10,k-1}+BM_{4,k})$ of the two sums as a path metric $PM_{s*00,k}$. That is to say, the max circuit 163-2 carries out a path-metric updating process based on the first equation from the top of Eqs. (9). Then, the max circuit 163-2 feeds back the path metric $PM_{S*00,k}$ to the memory 161-1 as a path metric $PM_{S*00,k-1}$.

In addition, the max circuit 163-3 compares the sum $(PM_{S01,k-1}+BM_{3,k})$ received from the adder 162-6 with the sum $(PM_{S011,k-1}+BM_{7,k})$ received from the adder 162-7 in order to find the larger sum max $(PM_{S01,k-1}+BM_{3,k}, PM_{S011,k-1}+BM_{7,k})$ of the two sums as a path metric $PM_{S*11,k}$. That is to say, the max circuit 163-3 carries out a path-metric updating process based on the sixth equation from the top of Eqs. (9). Then, the max circuit 163-3 feeds back the path metric $PM_{S*11,k}$ to the memory 161-6 as a path metric $PM_{S*11,k-1}$.

In addition, the max circuit 163-4 compares the sum $(PM_{S01,k-1}+BM_{2,k})$ received from the adder 162-5 with the sum $(PM_{S*11,k-1}+BM_{6,k})$ received from the adder 162-8 in order to find the larger sum max $(PM_{S01,k-1}+BM_{2,k}, PM_{S*11,k-1}+BM_{6,k})$ of the two sums as a path metric $PM_{S10,k}$. That is to say, the max circuit 163-4 carries out a path-metric updating process based on the third equation from the top of Eqs. (9). Then, the max circuit 163-4 feeds back the path metric $PM_{S10,k}$ to the memory 161-3 as a path metric $PM_{S10,k-1}$.

It is to be noted that, in the circuit 160 shown in FIG. 19, the path metric $PM_{S100,k}$ is the same as the sum $(PM_{S10,k-1}+BM_{4,k})$, which serves as a candidate to be selected as the larger value in the path-metric updating process carried out on the basis of the first equation from the top of Eqs. (9) to find the path metric $PM_{S*00,k}$. Thus, the memory 161-3 and the adder 162-3 can be used as a circuit for finding the path metric $PM_{S100,k}$ and the sum $(PM_{S10,k-1}+M_{4,k})$.

By the same token, the path metric $PM_{S011,k}$ is the same as the sum $(PM_{S01,k-1}+BM_{3,k})$, which serves as a candidate to be selected as the larger value in the path-metric updating process carried out on the basis of the sixth equation from the top of Eqs. (9) to find the path metric $PM_{S*11,k}$. Thus, the memory 161-4 and the adder 162-6 can be used as a circuit for finding the path metric $PM_{S011,k}$ and the sum $(PM_{S01,k-1}+BM_{3,k})$.

The processing carried out by the circuit 160 shown in FIG. 19 to update path metrics is the same as the processing explained earlier by referring to the flowchart shown in FIG. 14. That is to say, the processing carried out by the circuit 160 shown in FIG. 19 to update path metrics includes addition processes each resulting in a sum, processes each carried out to compare two specific ones of the sums with each other and processes each performed to select the larger one of the two compared specific sums in one time instant.

Figure 20:
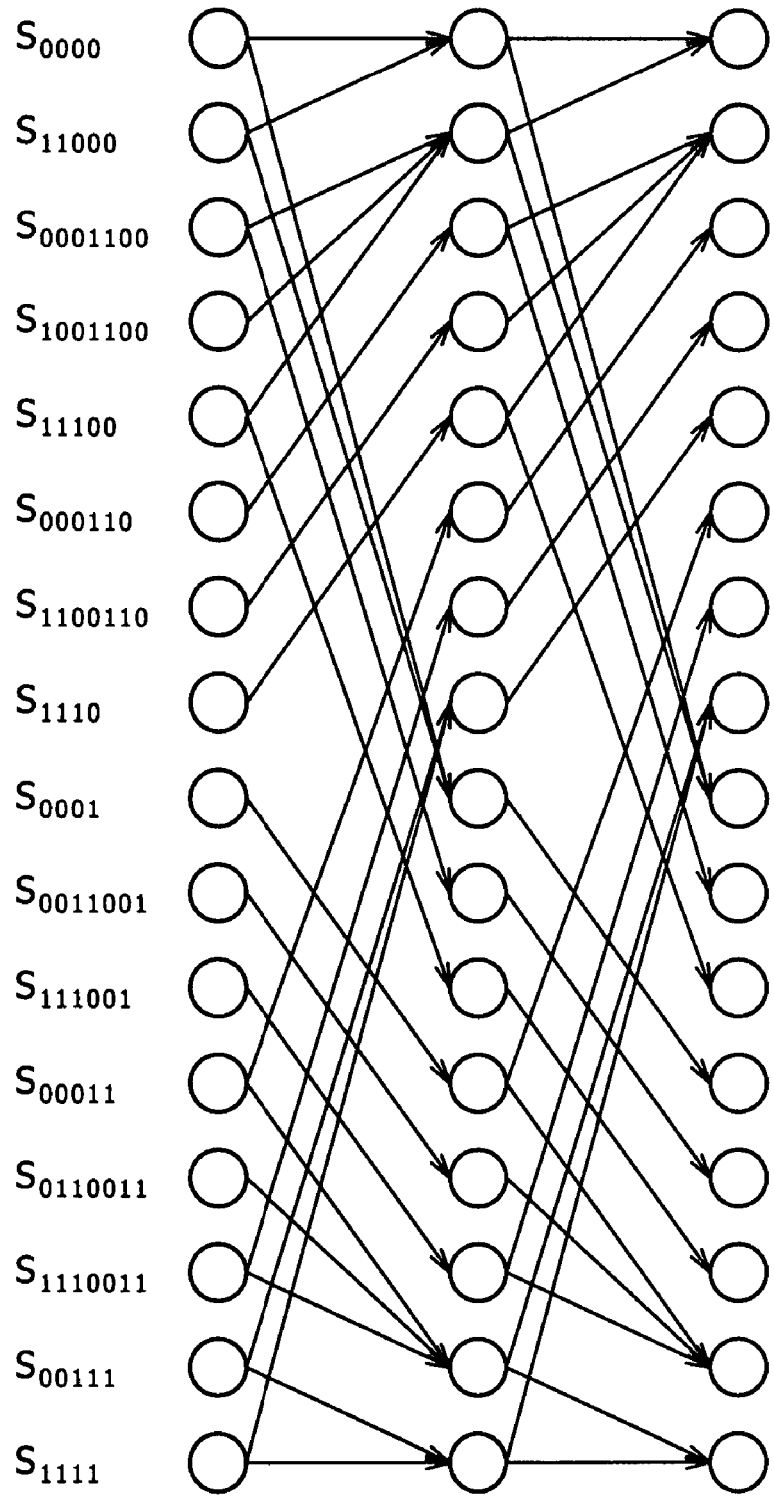
FIG. 20 is a still further trellis diagram.

FIG. 20 is a trellis diagram for RLL coding restrictions combined with state transitions of a partial response for a channel memory length of 4 as coding restrictions for a process to record an RLL code with the minimum bit count d limited to 1 and the consecutive minimum-interval polarity conversion count r limited to 2.

The trellis diagram of FIG. 20 is a trellis diagram for the minimum bit count d limited to 1. That is to say, the trellis shown in FIG. 20 is a trellis satisfying a restrictive condition requiring that the minimum bit count d shall be 1. The restrictive condition eliminates transitions for a channel bit input of 1 from states $S_{000110}$, $S_{1100110}$ and $S_{1110}$ as well as eliminates transitions for a channel bit input of 0 from states $S_{1110001}$, $S_{0011001}$ and $S_{0001}$. In addition, the trellis shown in FIG. 20 is a trellis satisfying another restrictive condition requiring that the consecutive minimum-interval polarity conversion count r shall be 2. This other restrictive condition eliminates a transition caused by a channel bit input of 1 from state $S_{1001100}$ as well as eliminates a transition caused by a channel bit input of 0 from state $S_{0110011}$.

The number of branches merging in each of states $S_{11000}$ and $S_{00111}$ in the trellis shown in FIG. 20 is the maximum value of 3.

The following description explains processing to update path metrics in the decoding process carried out in accordance with the trellis shown in FIG. 20.

In a partial response with a channel memory length of 4, there are a maximum of 32 output expected values for channel-bit strings of 00000 to 11111 respectively. The BMU finds branch metrics $BM_{0,k}$ to $BM_{31,k}$ from the 32 output expected values and a signal reproduced at a transition from the time (k−1) to the time k.

It is to be noted that, since the minimum bit count d is limited to 1 in the typical trellis shown in FIG. 20, there are a maximum of 16 different output expected values. In addition, depending on coefficients of the transfer function of the partial response, the output expected value of a specific channel-bit string may match the output expected value of a channel-bit string other than the specific channel-bit string. Thus, it is not always necessary to find the 16 different branch metrics.

The path metric of every state S is updated by making use of the branch metrics $BM_{0,k}$ to $BM_{31,k}$ in accordance with path-metric updating equations expressed by Eqs. (10) as follows:

$$PM_{S0000,k}=\max(PM_{S0000,k-1}+BM_{0,k}, PM_{S11000,k-1}+BM_{16,k})$$

$$PM_{S11000,k}=\max(PM_{S0001100,k-1}+BM_{24,k}, PM_{S1001100,k-1}+BM_{24,k}, PM_{S11100,k-1}+BM_{24,k})$$

$$PM_{S0001100,k}=PM_{S0001100,k-1}+BM_{12,k}$$

$$PM_{S1001100,k}=PM_{S1100110,k-1}+BM_{12,k}$$

$$PM_{S11100,k}=PM_{S1110,k-1}+BM_{28,k}$$

$$PM_{S000110,k}=PM_{S00011,k-1}+BM_{6,k}$$

$$PM_{S1100110,k}=PM_{S110011,k-1}+BM_{6,k}$$

$$PM_{S1110,k}=\max(PM_{S00111,k-1}+BM_{14,k}, PM_{S1111,k-1}+BM_{30,k})$$

$$PM_{S0001,k}=\max(PM_{S11000,k-1}+BM_{17,k}, PM_{S0000,k-1}+BM_{1,k})$$

$$PM_{S0011001,k}=PM_{S0001100,k-1}+BM_{25,k}$$

$$PM_{S111001,k}=PM_{S11100,k-1}+BM_{25,k}$$

$$PM_{S00011,k}=PM_{S00001,k-1}+BM_{3,k}$$

$$PM_{S0110011,k}=PM_{S0011001,k-1}+BM_{19,k}$$

$$PM_{S1110011,k}=PM_{S111001,k-1}+BM_{19,k}$$

$$PM_{S00111,k}=\max(PM_{S1110011,k-1}+BM_{7,k}, PM_{S0110011,k-1}+BM_{7,k}, PM_{S00011,k-1}+BM_{7,k})$$

$$PM_{S1111,k}=\max(PM_{S1111,k-1}+BM_{31,k}, PM_{S00111,k-1}+BM_{15,k}) \quad (10)$$

In accordance with the path-metric updating equations expressed by Eqs. (10), in a process to update the path metric $PM_{S11000}$ of state $S_{11000}$ having three branches merging therein and a process to update the path metric $PM_{S00111}$ of state $S_{00111}$, having three branches merging therein, it is necessary to select the largest one among three sums as a maximum value.

In the case of a Viterbi decoder for decoding a string of channel input bits in accordance with the trellis shown in FIG. 20, on the other hand, by applying the present invention, it is no longer necessary to select the largest one among three sums as a maximum value.

That is to say, the ACSU employed in the Viterbi decoder provided by the present invention selects the larger one from the two path metrics $PM_{S0001100,k-1}$ and $PM_{S1001100,k-1}$ as a maximum value as well as selects the larger one from the two path metrics $PM_{S1110011,k-1}$ and $PM_{S0110011,k-1}$ as a maximum value at the immediately preceding point of time and, then, stores the selected maximum values in memories as path metrics $PM_{S^*001100,k-1}$ and $PM_{S^*110011,k-1}$. In other words, the ACSU employed in the Viterbi decoder provided by the present invention updates path metrics in accordance with path-metric updating equations represented by Eqs. (11) as follows:

$$PM_{S0000,k} = \max(PM_{S0000,k-1}+BM_{0,k}, PM_{S1000,k-1}+BM_{16,k})$$

$$PM_{S11000,k} = \max(PM_{S^*001100,k-1}, PM_{S1100,k-1})+BM_{24,k}$$

$$PM_{S0001100,k} = PM_{S000110,k-1}+BM_{12,k}$$

$$PM_{S^*001100,k} = \max(PM_{S000110,k-1}, PM_{S1100110,k-1})+BM_{12,k}$$

$$PM_{S11100,k} = PMS_{1110,k-1}+BM_{28,k}$$

$$PM_{S000110,k} = PM_{S00011,k-1}+BM_{6,k}$$

$$PM_{S1100110,k} = PM_{S1110011,k-1}+BM_{6,k}$$

$$PM_{S1110,k} = \max(PM_{S00111,k-1}+BM_{14,k}, PM_{S1111,k-1}+BM_{30,k})$$

$$PM_{S0001,k} = \max(PM_{S1000,k-1}+BM_{17,k}, PM_{S0000,k-1}+BM_{1,k})$$

$$PM_{S0011001,k} = PM_{S0001100,k-1}+BM_{25,k}$$

$$PM_{S111001,k} = PM_{S11100,k-1}+BM_{25,k}$$

$$PM_{S00011,k} = PMS_{0001,k-1}+BM_{3,k}$$

$$PM_{S^*110011,k} = \max(PM_{S111001,k-1}, PM_{S0011001,k-1})+BM_{19,k}$$

$$PM_{S1110011,k} = PM_{S111001,k-1}+BM_{19,k}$$

$$PM_{S00111,k} = \max(PM_{S^*110011,k-1}, PM_{S00011,k-1})+BM_{7,k}$$

$$PM_{S1111,k} = \max(PM_{S1111,k-1}+BM_{31,k}, PM_{S00111,k-1}+BM_{15,k}) \quad (11)$$

In accordance with the path-metric updating equations represented by Eqs. (11), in a process to update a path metric $PM_{s,k}$, it is not necessary to select the largest one among three or more sums at a time instant as a maximum value. That is to say, in accordance with the path-metric updating equations represented by Eqs. (11), it is necessary to select the larger one only from two sums as a maximum value in a time instant in order to update a path metric $PM_{s,k}$ in the same way as a trellis for which the maximum number of branches merging in the same state S is 2. Thus, the time it takes to carry out the processing at a time instant is shortened. As a result, the speed of the decoding process can be increased.

It is to be noted that, in accordance with the path-metric updating equations represented by Eqs. (11), a process to select the larger one of the 2 path metrics $PM_{S0001100,k}$ and $PM_{S1001100,k}$ as a maximum value can be carried out as a process to select the larger one of any 2 of the path metrics $PM_{S0001100,k-1}$, $PM_{S1001100,k-1}$ and $PM_{S11100,k-1}$ as a maximum value whereas a process to select the larger one of the two path metrics $PM_{S1110011,k}$ and $PM_{S0110011,k}$ as a maximum value at the immediately preceding point of time can be carried out as a process to select the larger one of any 2 of the path metrics $PM_{S1110011,k-1}$, $PM_{S0110011,k-1}$ and $PM_{S00011,k-1}$ as a maximum value.

In addition, in accordance with the path-metric updating equations represented by Eqs. (11), addition and selection processes can be interchanged in the equations to update the path metrics $PM_{S11000,k}$, $PM_{S^*00100,k}$, $PM_{S^*110011,k}$ and $PM_{S00111,k}$. Thus, if the addition process is carried out before the selection process in the equations to update the path metrics $PM_{S^*001100,k}$ and $PM_{S^*110011,k}$, a circuit included in the ACSU as a circuit for finding the sum ($PM_{S000110,k-1}+BM_{12,k}$) to be selected in the equation to update the path metric $PM_{S^*001100,k}$ can also be used as a circuit for updating the path metric $PM_{S0001100,k}$. By the same token, a circuit included in the ACSU as a circuit for finding the sum ($PM_{S111001,k-1}+BM_{19,k}$) serving as a candidate to be selected in the equation to update the path metric $PM_{S^*110011,k}$ can also be used as a circuit for updating the path metric $PM_{S1110011,k}$.

Figure 21:
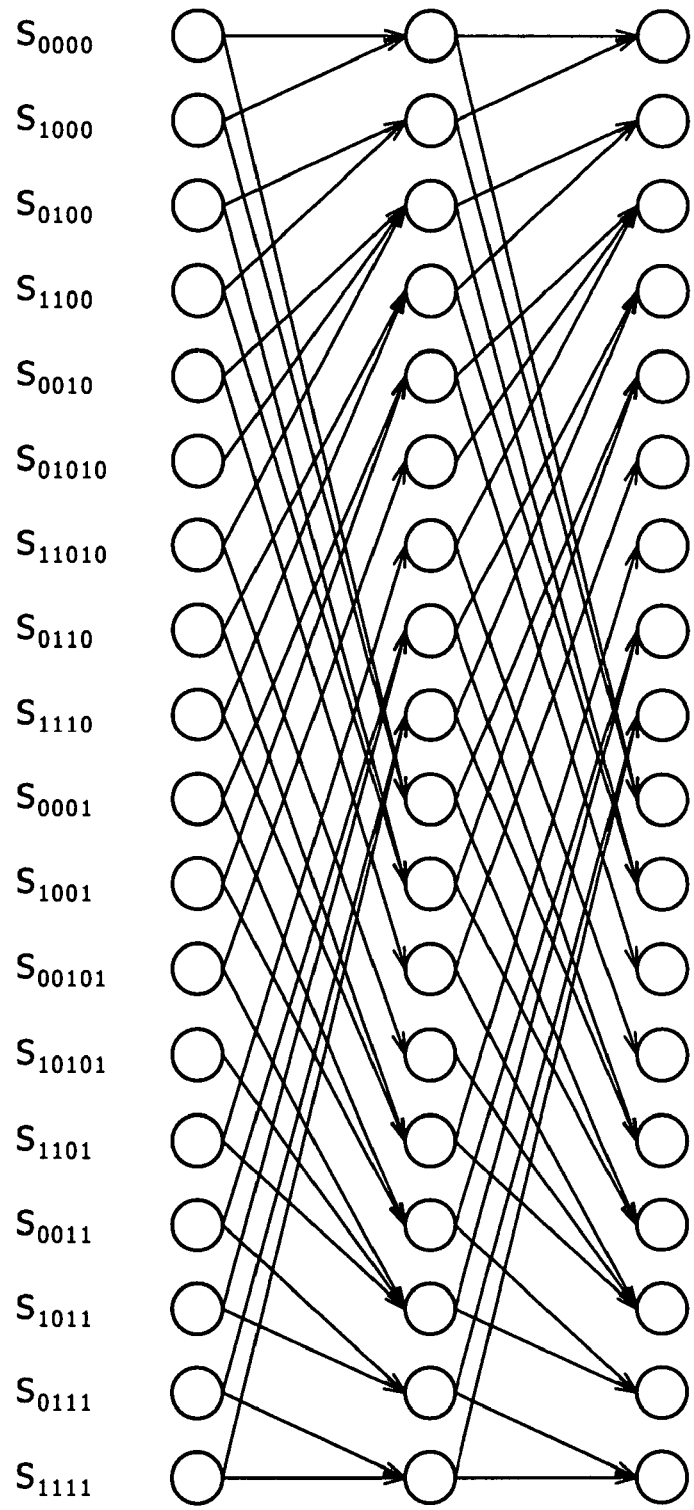
FIG. 21 is a still further trellis diagram.

FIG. 21 is a trellis diagram for MTR coding restrictions combined with state transitions of a partial response for a channel memory length of 4 as coding restrictions for a process to record an MTR code with the consecutive maximum-interval polarity conversion count r limited to 4.

In the trellis shown in FIG. 21, the restrictive condition set for the MTR code eliminates a transition caused by a channel bit input of 1 from state $S_{01010}$ and a transition caused by a channel bit input of 0 from state $S_{10101}$. In addition, the number of branches merging in each of states $S_{0100}$ and $S_{1011}$ in the trellis shown in FIG. 21 is the maximum value of 3.

The following description explains processing to update path metrics in the decoding process carried out in accordance with the trellis shown in FIG. 21. Equations for updating the path metrics of states S are expressed by Eqs. (12) as follows:

$$PM_{S0000,k} = \max(PM_{S0000,k-1}+BM_{0,k}, PM_{S1000,k-1}+BM_{16,k})$$

$$PM_{S1000,k} = \max(PM_{S01000,k-1}+BM_{8,k}, PM_{S1100,k-1}+BM_{24,k})$$

$$PM_{S0100,k} = \max(PM_{S0010,k-1}+BM_{4,k}, PM_{S01010,k-1}+BM_{20,k}, PM_{S11010,k-1}+BM_{20,k})$$

$$PM_{S1100,k} = \max(PM_{S0110,k-1}+BM_{12,k}, PM_{S1110,k-1}+BM_{28,k})$$

$$PM_{S0010,k} = \max(PM_{S0001,k-1}+BM_{2,k}, PM_{S1001,k-1}+BM_{18,k})$$

$$PM_{S01010,k} = PM_{S00101,k-1}+BM_{10,k}$$

$$PM_{S11010,k} = PM_{S1101,k-1}+BM_{26,k}$$

$$PM_{S0110,k} = \max(PM_{S00011,k-1}+BM_{6,k}, PM_{S1011,k-1}+BM_{22,k})$$

$$PM_{S1110,k} = \max(PM_{S0111,k-1}+BM_{14,k}, PM_{S1111,k-1}+BM_{30,k})$$

$$PM_{S0001,k} = \max(PM_{S1000,k-1}+BM_{17,k}, PM_{S0000,k-1}+BM_{1,k})$$

$$PM_{S1001,k} = \max(PM_{S1100,k-1}+BM_{25,k}, PM_{S0100,k-1}+BM_{9,k})$$

$$PM_{S00101,k} = PM_{S0010,k-1}+BM_{5,k}$$

$$PM_{S10101,k} = PM_{S11010,k-1}+BM_{21,k}$$

$$PM_{S1101,k} = \max(PM_{S1110,k-1}+BM_{29,k}, PM_{S0110,k-1}+BM_{13,k})$$

$$PM_{S0011,k} = \max(PM_{S1001,k-1}+BM_{19,k}, PM_{S0001,k-1}+BM_{3,k})$$

$$PM_{S1011,k} = \max(PM_{S1101,k-1}+BM_{27,k}, PM_{S10101,k-1}+BM_{11,k}, PM_{S00101,k-1}+BM_{11,k})$$

$$PM_{S0111,k}=\max(PM_{S1011,k-1}+BM_{23,k}, PM_{S0011,k-1}+BM_{7,k})$$

$$PM_{S1111,k}=\max(PM_{S1111,k-1}+BM_{31,k}, PM_{S0111,k-1}+BM_{15,k}) \quad (12)$$

In accordance with the path-metric updating equations expressed by Eqs. (12), in a process to update the path metric $PM_{S0100}$ of state $S_{0100}$ with three branches merging therein and a process to update the path metric $PM_{S1011}$ of state $S_{1011}$ with three branches merging therein, it is necessary to select the largest one among three sums as a maximum value.

In the case of a Viterbi decoder for decoding a string of channel input bits in accordance with the trellis shown in FIG. 21, on the other hand, by applying the present invention, it is no longer necessary to select the largest one among three sums as a maximum value.

That is to say, the ACSU employed in the Viterbi decoder provided by the present invention selects the larger one of the two path metrics $PM_{S01010,k-1}$ and $PM_{S11010,k-1}$ as a maximum value as well as selects the larger one of the two path metrics $PM_{S10101,k-1}$ and $PM_{S00101,k-1}$ as a maximum value at the immediately preceding point of time and, then, stores the two selected maximum values in memories as path metrics $PM_{S*1010,k-1}$ and $PM_{S*0101,k-1}$ respectively. In other words, the ACSU employed in the Viterbi decoder provided by the present invention updates path metrics in accordance with path-metric updating equations represented by Eqs. (13) as follows:

$$PM_{S0000,k}=\max(PM_{S0000,k-1}+BM_{0,k}, PM_{S1000,k-1}+BM_{16,k})$$

$$PM_{S1000,k}=\max(PM_{S0100,k-1}+BM_{8,k}, PM_{S1100,k-1}+BM_{24,k})$$

$$PM_{S0100,k}=\max(PM_{S0010,k-1}+BM_{4,k}, PM_{S*1010,k-1}+BM_{20,k})$$

$$PM_{S1100,k}=\max(PM_{S0110,k-1}+BM_{12,k}, PM_{S1110,k-1}+BM_{28,k})$$

$$PM_{S0010,k}=\max(PM_{S0001,k-1}+BM_{2,k}, PM_{S1001,k-1}+BM_{18,k})$$

$$PM_{S*1010,k}=\max(PM_{S00101,k-1}+BM_{10,k}, PM_{S1101,k-1}+BM_{26,k})$$

$$PM_{S11010,k}=PM_{S1101,k-1}+BM_{26,k}$$

$$PM_{S0110,k}=\max(PM_{S0011,k-1}+BM_{6,k}, PM_{S1011,k-1}+BM_{22,k})$$

$$PM_{S1110,k}=\max(PM_{S0111,k-1}+BM_{14,k}, PM_{S1111,k-1}+BM_{30,k})$$

$$PM_{S0001,k}=\max(PM_{S1000,k-1}+BM_{17,k}, PM_{S0000,k-1}+BM_{1,k})$$

$$PM_{S1001,k}=\max(PM_{S1100,k-1}+BM_{25,k}, PM_{S0100,k-1}+BM_{9,k})$$

$$PM_{S00101,k}=PM_{S0010,k-1}+BM_{5,k}$$

$$PM_{S*0101,k}=\max(PM_{S11010,k-1}+BM_{21,k}, PM_{S0010,k-1}+BM_{5,k})$$

$$PM_{S1101,k}=\max(PM_{S1110,k-1}+BM_{29,k}, PM_{S0110,k-1}+BM_{13,k})$$

$$PM_{S0011,k}=\max(PM_{S1001,k-1}+BM_{19,k}, PM_{S0001,k-1}+BM_{3,k})$$

$$PM_{S1011,k}=\max(PM_{S1101,k-1}+BM_{27,k}, PM_{S*0101,k-1}+BM_{11,k})$$

$$PM_{S0111,k}=\max(PM_{S1011,k-1}+BM_{23,k}, PM_{S0011,k-1}+BM_{7,k})$$

$$PM_{S1111,k}=\max(PM_{S1111,k-1}+BM_{31,k}, PM_{S0111,k-1}+BM_{15,k}) \quad (13)$$

In accordance with the path-metric updating equations represented by Eqs. (13), in a process to update a path metric $PM_{s,k}$, it is not necessary to select a largest one among three or more sums as a maximum value in a time instant. That is to say, in accordance with the path-metric updating equations represented by Eqs. (13), it is necessary to select a lager one of only two sums as a maximum value in a time instant in order to update a path metric $PM_{s,k}$ in the same way as a trellis for which the maximum number of branches merging in the same state S is 2. Thus, the time it takes to carry out the processing at a time instant is shortened. As a result, the speed of the decoding process can be increased.

It is to be noted that, in accordance with the path-metric updating equations represented by Eqs. (13), a process to compute the path metric $PM_{S11010,k}$ is the same as the process to compute the sum $(PM_{S1101,k-1}+BM_{26,k})$ which is a candidate to be selected as a maximum value in the equation to update the path metric $PM_{S*1010,k}$. Thus, in the ACSU, the circuit for finding the path metric $PM_{S11010,k}$ can be used as a circuit for finding the sum $(PM_{S1101,k-1}+BM_{26,k})$.

By the same token, in accordance with the path-metric updating equations represented by Eqs. (13), a process to compute the path metric $PM_{S00101,k}$ is the same as the process to compute the sum $(PM_{S0010,k-1}+BM_{5,k})$ which is a candidate to be selected as a maximum value in the equation to update the path metric $PM_{S*0101,k}$. Thus, in the ACSU, the circuit for finding the path metric $PM_{S00101,k}$ can also be used as a circuit for finding the sum $(PM_{S0010,k-1}+BM_{5,k})$.

Figure 22:
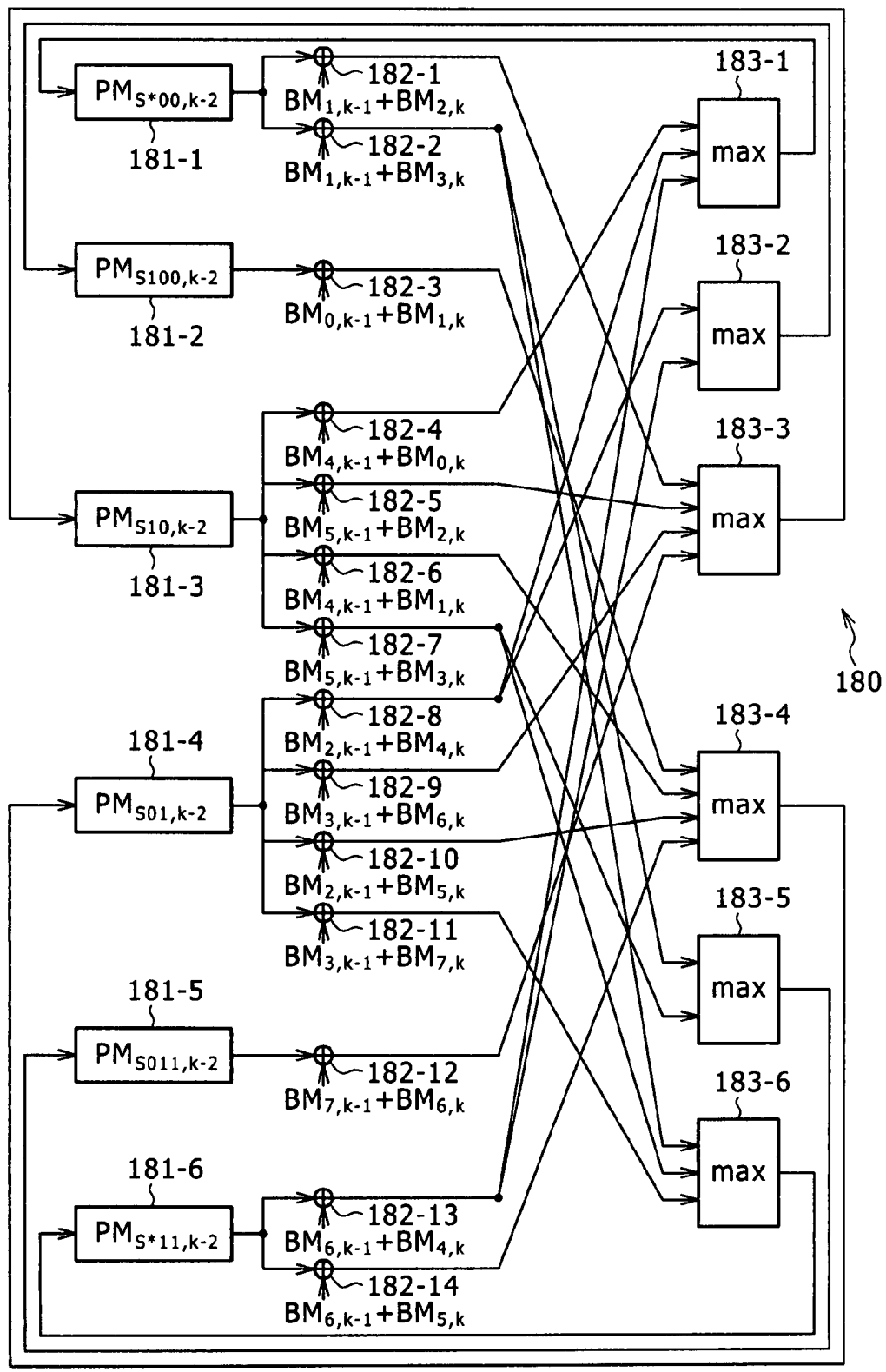
FIG. 22 is a diagram showing a further typical configuration of the ACSU employed in a Viterbi decoder provided by the present invention.

FIG. 22 is a block diagram showing a typical configuration of an ACSU 180 employed in a Viterbi decoder provided by the present invention as a decoder for decoding a string of channel input bits for every two time instants in accordance with the trellis shown in FIG. 15.

First of all, the following description explains equations used in processing carried out by the ACSU 180 shown in FIG. 22 as processing to update path metrics of states S. The equations used in processing carried out by the ACSU 180 shown in FIG. 22 as processing to update path metrics of states S for every two time instants are expressed by Eqs. (14) as follows:

$$PM_{S*00,k}=\max(PM_{S10,k-2}+BM_{4,k-1}+BM_{0,k}, PM_{S01,k-2}+BM_{2,k-1}+BM_{4,k}, PM_{S*11,k-2}, BM_{6,k-1}+BM_{4,k})$$

$$PM_{S100,k}=\max(PMS_{01,k-2}+BM_{2,k-1}+BM_{4,k}, PM_{S*11,k-2}+BM_{6,k-1}+BM_{4,k})$$

$$PM_{S10,k}=\max(PM_{S10,k-2}+BM_{5,k-1}+BM_{2,k}, PM_{S*00,k-2}+BM_{1,k-1}+BM_{2,k}, PM_{S011,k-2}+BM_{7,k-1}+BM_{6,k}, PM_{S01,k-2}+BM_{3,k-1}+BM_{6,k})$$

$$PM_{S01,k}=\max(PM_{S01,k-2}+BM_{2,k-1}+BM_{5,k}, PM_{S*11,k-2}+BM_{6,k-1}+BM_{5,k}, PM_{S100,k-2}+BM_{0,k-1}+BM_{1,k}, PM_{S10,k-2}+BM_{4,k-1}+BM_{1,k})$$

$$PM_{S011,k}=\max(PMS_{10,k-2}+BM_{5,k-1}+BM_{3,k}, PM_{S*00,k-2}+BM_{1,k-1}+BM_{3,k})$$

$$PM_{S*11,k}=\max(PM_{S01,k-2}+BM_{3,k-1}+BM_{7,k}, PM_{S10,k-2}+BM_{5,k-1}+BM_{3,k}, PM_{S*00,k-2}, BM_{1,k-1}+BM_{3,k}) \quad (14)$$

Figure 8:
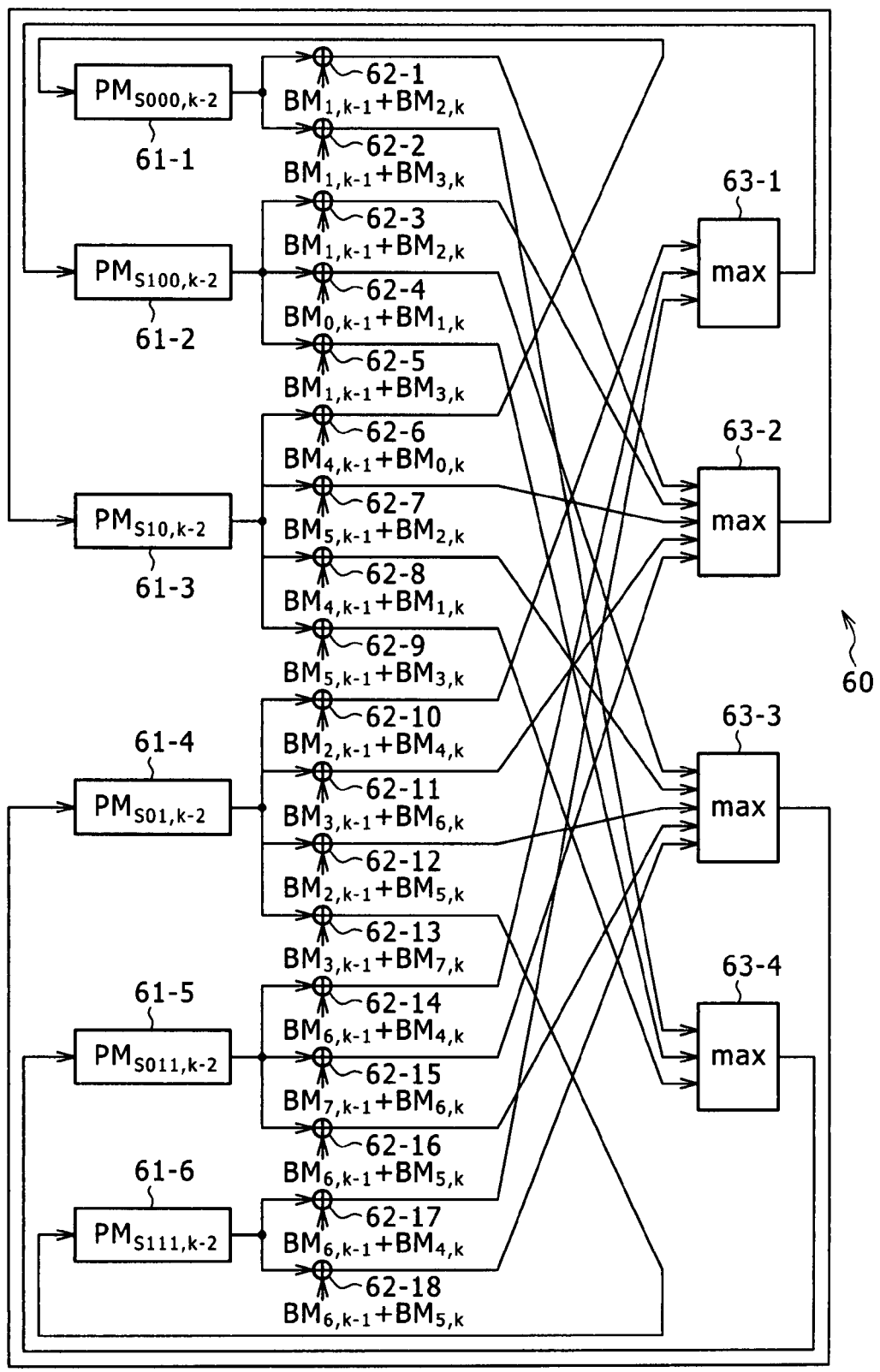
FIG. 8 is a block diagram showing another typical configuration of the ACSU employed in the conventional Viterbi decoder.
Figure 9:
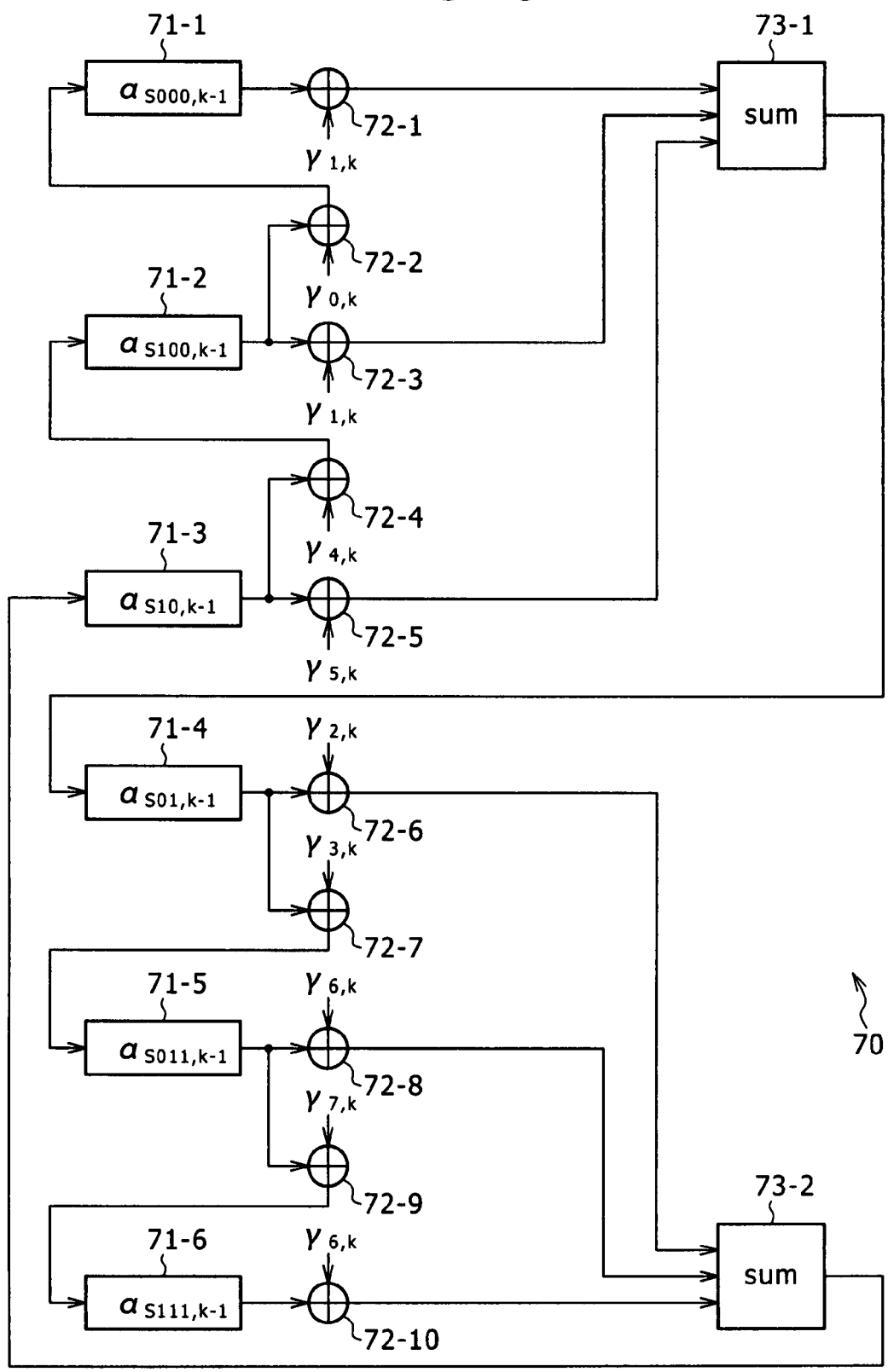
FIG. 9 is a diagram showing a typical configuration of a circuit employed in the conventional decoder, which is used for carrying out a decoding process for every time instant by adoption of the BCJR algorithm, as a circuit for updating the probability of each state S.
Figure 10:
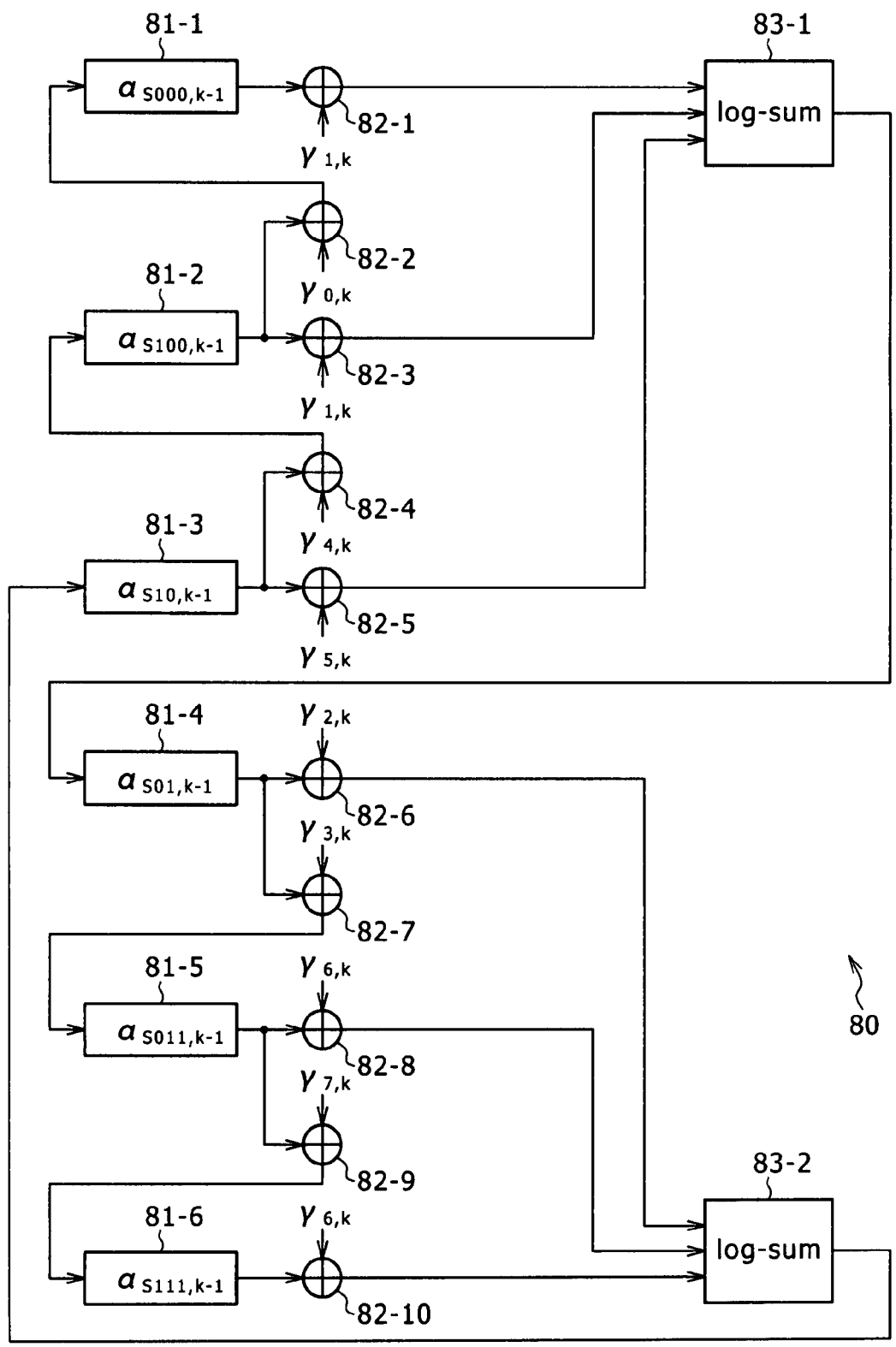
FIG. 10 is a diagram showing a typical configuration of a circuit employed in the conventional decoder, which is used for carrying out a decoding process for every time instant by adoption of the Log-MAP algorithm, as a circuit for updating the degree of likelihood of each state S.
Figure 11:
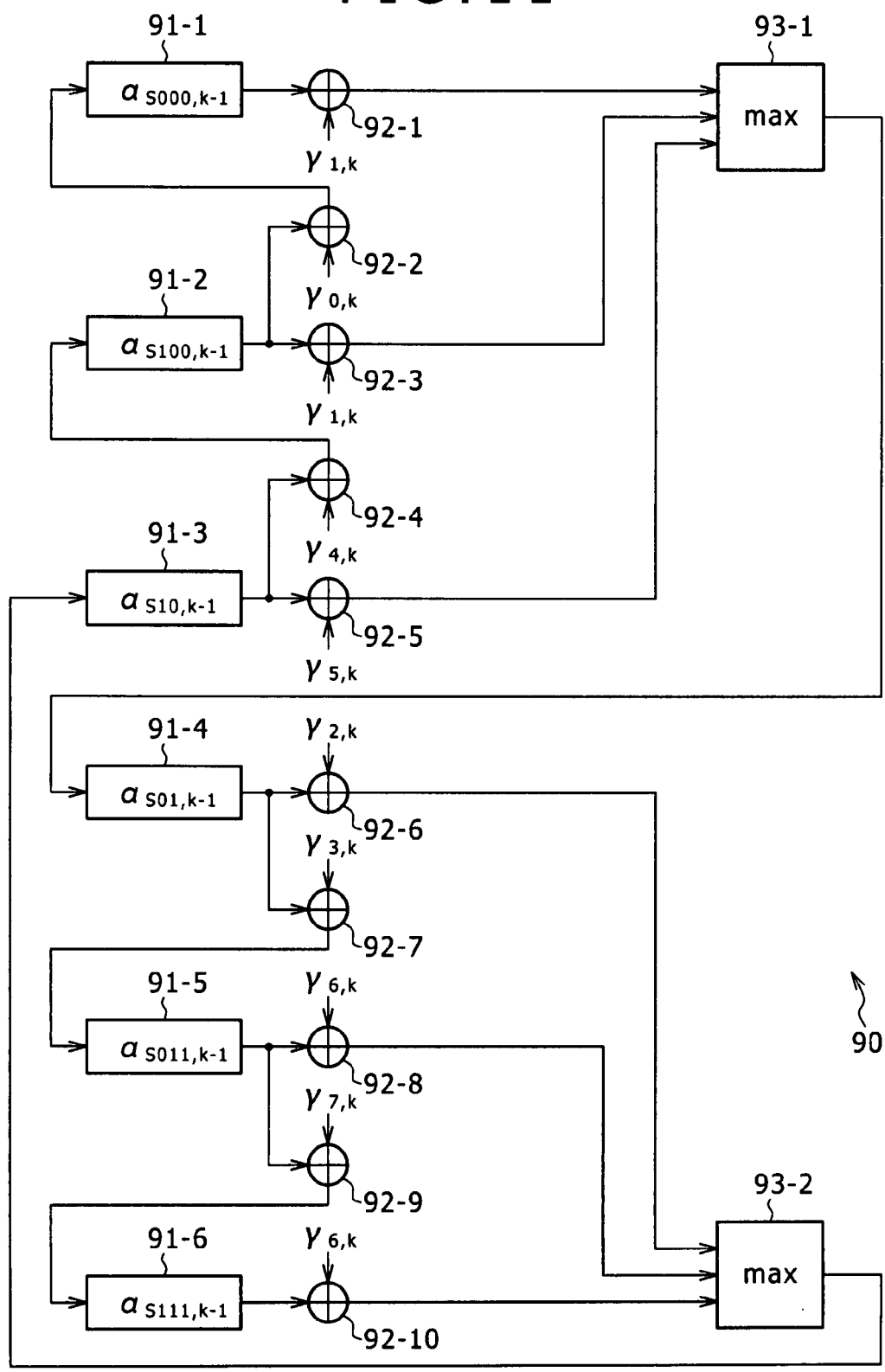
FIG. 11 is a diagram showing a typical configuration of a circuit employed in the conventional decoder, which is used for carrying out a decoding process for every time instant by adoption of the Max-Log-MAP algorithm, as a circuit for updating the degree of likelihood of each state S.

In accordance with the path-metric updating equations expressed by Eqs. (14), in a process to update a path metric $PM_{s,k}$, it is not necessary to select a largest one among five or more sums as a maximum value in two consecutive time instants. That is to say, in accordance with the path-metric updating equations expressed by Eqs. (14), it is necessary to select a largest one among only four sums as a maximum value in two consecutive time instants in order to update a path metric $PM_{S,k}$ in the same way as a trellis for which the maximum number of branches merging in the same state S is 2. Thus, the time it takes to carry out the processing in a time instant can be made short in comparison with the ACSU 60 shown in FIG. 8 as an ACSU required to select the largest one among five sums as a maximum value. As a result, the speed of the decoding process can be increased.

The following description explains the configuration of the ACSU 180 for updating path metrics in accordance with the path-metric updating equations expressed by Eqs. (14).

The ACSU 180 shown in FIG. 22 employs memories 181-1 to 181-6, adders 182-1 to 182-14 and max circuits 183-1 to 183-6.

In the same way as the ACSU 160 shown in FIG. 19, in the ACSU 180 shown in FIG. 22, the adders 182-1 to 182-14 each add a path metric $PM_{S,k}$ to a branch metric BM whereas the max circuits 183-1 to 183-6 each select a largest one among inputs supplied thereto as a maximum value and feed back the selected maximum value to one of the memories 181-1 to 181-6.

The adders 182-4, 182-8 and 182-13 as well as the max circuit 183-1 carry out a path-metric updating processes based on the first equation from the top of Eqs. (14) in order to produce a path metric $PM_{S*00,k}$ as the result of the process, and store the result of the process as a path metric $PM_{S*00,k-2}$ in the memory 181-1. By the same token, the adders 182-8 and 182-13 as well as the max circuit 183-2 carry out a path-metric updating process based on the second equation from the top of Eqs. (14) in order to produce a path metric $PM_{S100,k}$ as the result of the process, and store the result of the process as a path metric $PMS_{100,k-2}$ in the memory 181-2.

In the same way, the adders 182-1, 182-5, 182-9 and 182-12 as well as the max circuit 183-3 carry out path-metric updating processes based on the third equation from the top of Eqs. (14) in order to produce a path metric $PM_{S10,k}$ as the result of the processes, and store the result of the process as a path metric $PM_{S10,k-2}$ in the memory 181-3. Similarly, the adders 182-3, 182-6, 182-10 and 182-14 as well as the max circuit 183-4 carry out path-metric updating processes based on the fourth equation from the top of Eqs. (14) in order to produce a path metric $PM_{S01,k}$ as the result of the processes, and store the result of the process as a path metric $PM_{S01,k-2}$ in the memory 181-4.

Likewise, the adders 182-2 and 182-7 as well as the max circuit 183-5 carry out a path-metric updating process based on the fifth equation from the top of Eqs. (14) in order to produce a path metric $PM_{S011,k}$ as the result of the process, and store the result of the process as a path metric $PM_{S011,k-2}$ in the memory 181-5. By the same token, the adders 182-2, 182-7 and 182-11 as well as the max circuit 183-6 carry out path-metric updating processes based on the sixth equation from the top of Eqs. (14) in order to produce a path metric $PM_{S*11,k}$ as the result of the processes, and store the result of the process as a path metric $PM_{S*11,k-2}$ in the memory 181-6.

Figure 23:
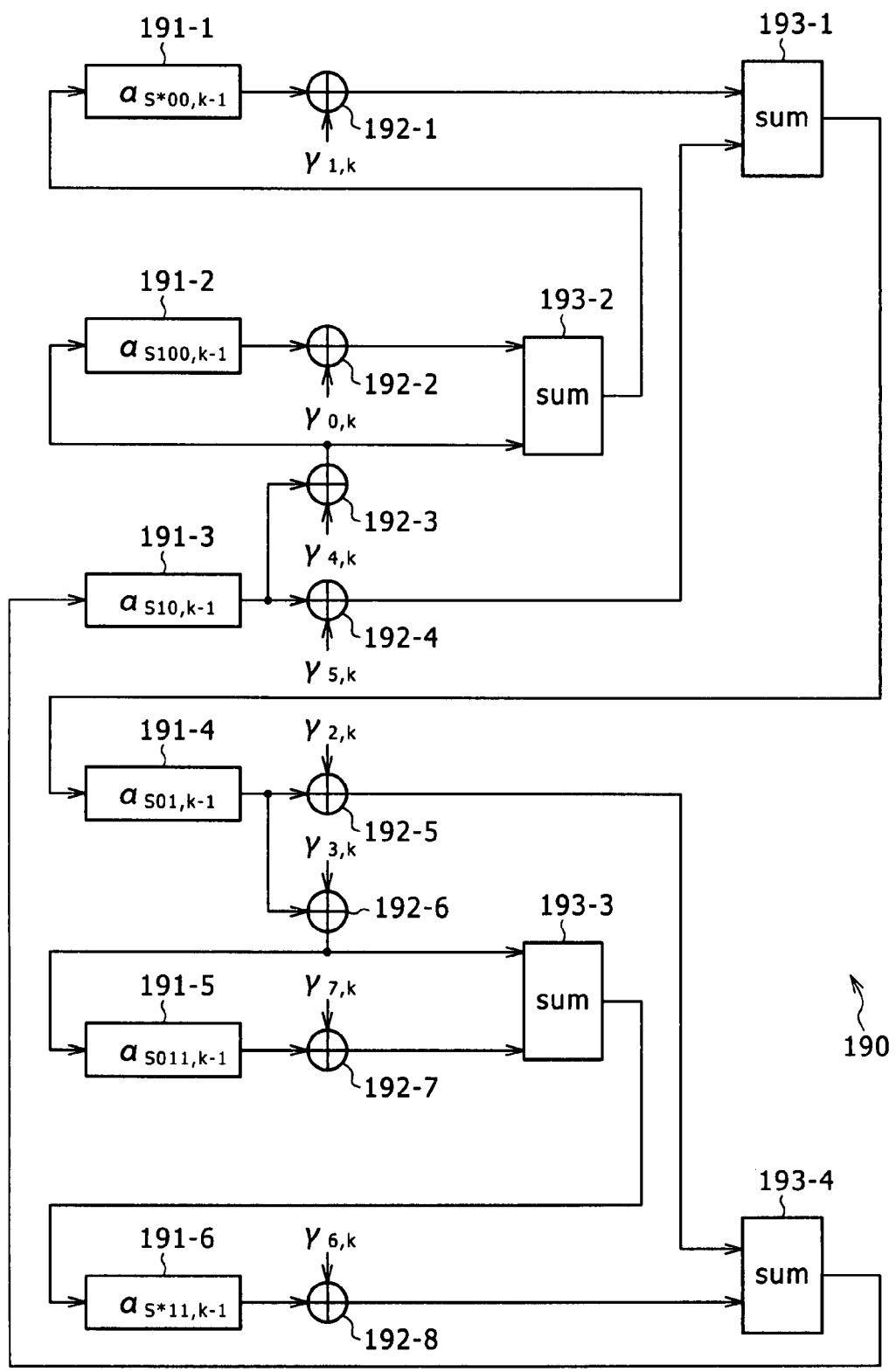
FIG. 23 is a block diagram showing a typical configuration of a circuit employed in a decoder for decoding a string of channel input bits for every time instant by adoption of a BCJR algorithm.

FIG. 23 is a block diagram showing a typical configuration of a circuit 190 employed in a decoder, which is used for decoding a string of channel input bits for every time instant by adoption of the BCJR algorithm, as a circuit for updating the probability of every state S on the basis of the trellis shown in FIG. 15.

As shown in FIG. 23, the circuit 190 employs memories 191-1 to 191-6, adders 192-1 to 192-8 and sum units 193-1 to 193-4.

As described earlier, the processing to update a probability $\alpha_{S,k}$ by adoption of the BCJR algorithm is carried out in a way similar to the processing to update a path metric $PM_{s,k}$ by adoption of the Viterbi algorithm except that quantities/processes of the processing to update a path metric $PM_{s,k}$ is replaced with quantities/processes of the processing to update a probability $\alpha_{s,k}$ as follows:

the path metric $PM_{s,k}$ is replaced with the probability $\alpha_{S,k}$;

the branch metric BM is replaced with the transition probability γ;

the process to select a maximum value is replaced with an addition process; and the process to add the path metric $PM_{s,k}$ to the branch metric BM is replaced with a process to multiply the probability $\alpha_{S,k}$ by the transition probability γ.

Thus, the memories 161-1 to 161-6 employed in the circuit 160 shown in FIG. 19 correspond to respectively the memories 191-1 to 191-6 employed in the circuit 190 shown in FIG. 23, the adders 162-1 to 162-8 employed in the circuit 160 shown in FIG. 19 correspond to respectively the adders 192-1 to 192-8 employed in the circuit 190 shown in FIG. 23 whereas the max circuits 163-1 to 163-4 employed in the circuit 160 shown in FIG. 19 correspond to respectively the sum units 193-1 to 193-4 employed in the circuit 190 shown in FIG. 23.

As a result, much like the circuit 160 shown in FIG. 19, it is not necessary to find a sum of three or more products in a process to update a probability $\alpha_{S,k}$ in a time instant. That is to say, in a way similar to the case of a trellis for which the maximum number of branches merging in the same state S is 2, it is necessary to find a sum of only two products in a time instant in order to update a probability $\alpha_{S,k}$. Thus, the time it takes to carry out the processing at a time instant can be made short. As a result, the speed of the decoding process can be increased.

Figure 24:
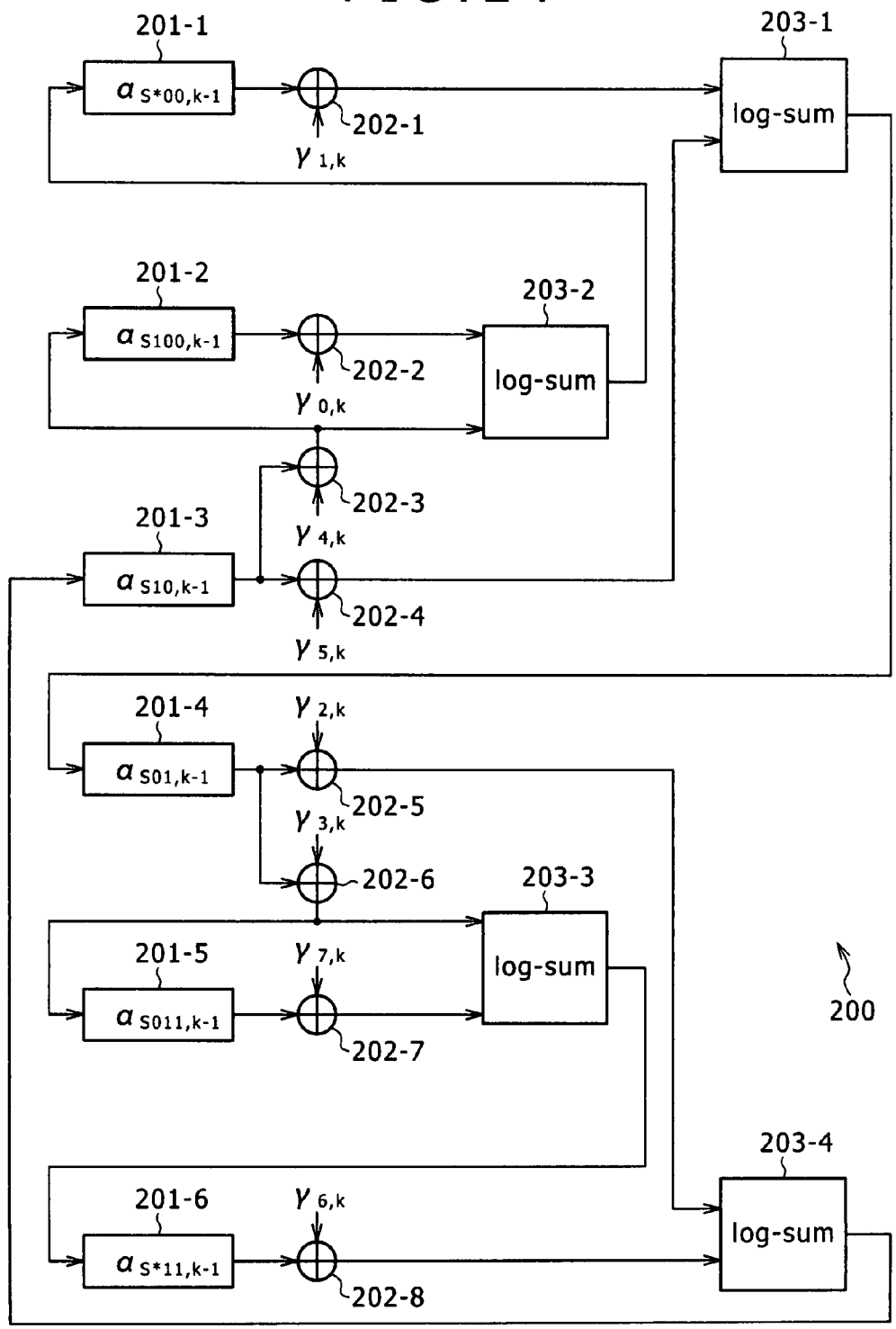
FIG. 24 is a block diagram showing a typical configuration of a circuit employed in a decoder for decoding a string of channel input bits for every time instant by adoption of a Log-MAP algorithm.

FIG. 24 is a block diagram showing a typical configuration of a circuit 200 employed in a decoder, which is provided by the present invention as a decoder for decoding a string of channel input bits for every time instant by adoption of the Log-MAP algorithm, as a circuit for updating the likelihood of each state S in accordance with the trellis shown in FIG. 15.

As shown in FIG. 24, the circuit 200 employs memories 201-1 to 201-6, adders 202-1 to 202-8 and log-sum units 203-1 to 203-4.

As described earlier, the processing to update a likelihood $\alpha_{s,k}$ by adoption of the Log-MAP algorithm is carried out in a way similar to the processing to update a path metric $PM_{s,k}$ by adoption of the Viterbi algorithm except that quantities/processes of the processing to update a path metric $PM_{s,k}$ is replaced with quantities/processes of the processing to update a likelihood $\alpha_{S,k}$ as follows:

the path metric $PM_{s,k}$ is replaced with the likelihood $\alpha_{s,k}$;

the branch metric BM is replaced with the likelihood γ;

the process to select a maximum value is replaced with a Log-Sum computation process; and the process to add the path metric $PM_{S,k}$ to the branch metric BM is replaced with a process to add the likelihood $\alpha_{s,k}$ to the likelihood γ.

Thus, the memories 161-1 to 161-6 employed in the circuit 160 shown in FIG. 19 correspond to respectively the memories 201-1 to 201-6 employed in the ACSU 200 shown in FIG. 24, the adders 162-1 to 162-8 employed in the circuit 160 shown in FIG. 19 correspond to respectively the adders 202-1 to 202-8 employed in the ACSU 200 shown in FIG. 24 whereas the max circuits 163-1 to 163-4 employed in the circuit 160 shown in FIG. 19 correspond to respectively the log-sum units 203-1 to 203-4 employed in the ACSU 200 shown in FIG. 24.

As a result, much like the circuit 160 shown in FIG. 19, it is not necessary to carry out a log-sum computation on three or more sums in a process to update a likelihood $\alpha_{s,k}$ in a time instant. That is to say, in a way similar to the case of a trellis for which the maximum number of branches merging in the same state S is 2, it is necessary to carry out a log-sum computation on only two sums in a time instant in order to update a likelihood $\alpha_{s,k}$. Thus, the time it takes to carry out the processing at a time instant can be made short. As a result, the speed of the decoding process can be increased.

Figure 25:
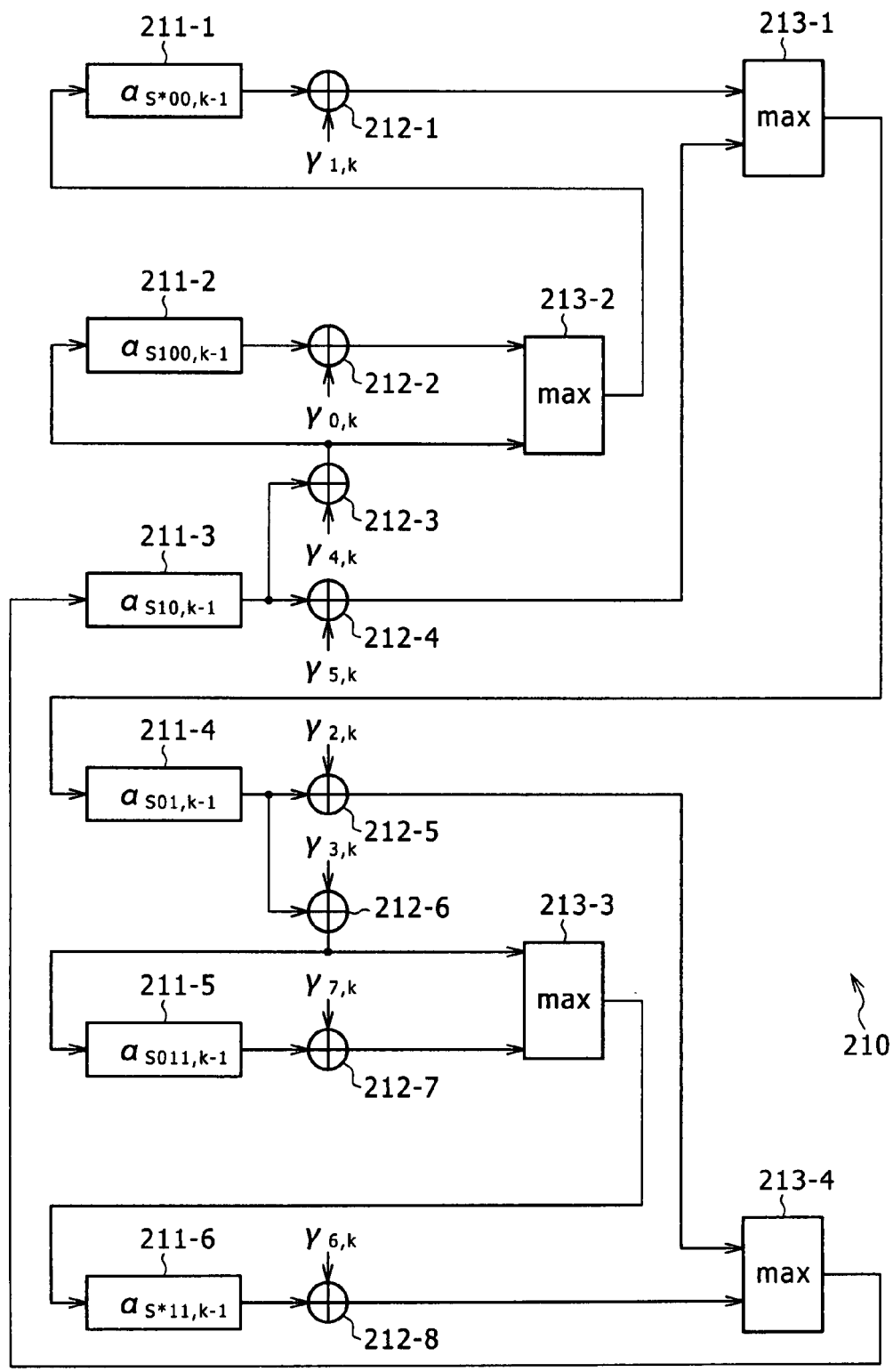
FIG. 25 is a block diagram showing a typical configuration of a circuit employed in a decoder for decoding a string of channel input bits for every time instant by adoption of a Max-Log-MAP algorithm.

FIG. 25 is a block diagram showing a typical configuration of a circuit 210 employed in a decoder, which is provided by the present invention as a decoder for decoding a string of channel input bits for every time instant by adoption of the Max-Log-MAP algorithm, as a circuit for updating the likelihood of each state S in accordance with the trellis shown in FIG. 15.

As shown in FIG. 25, the circuit 210 employs memories 211-1 to 211-6, adders 212-1 to 212-8 and max circuits 213-1 to 213-4.

As described earlier, the processing to update a likelihood $\alpha_{S,k}$ by adoption of the Max-Log-MAP algorithm is carried out in a way similar to the processing to update a path metric $PM_{S,k}$ by adoption of the Viterbi algorithm except that quantities/processes of the processing to update a path metric $PM_{S,k}$ is replaced with quantities/processes of the processing to update a likelihood $\alpha_{S,k}$ as follows:

the path metric $PM_{S,k}$ is replaced with the likelihood $\alpha_{S,k}$;
the branch metric BM is replaced with the likelihood $\gamma$; and
the process to add the path metric $PM_{S,k}$ to the branch metric BM is replaced with a process to add the likelihood $\alpha_{S,k}$ to the likelihood $\gamma$.

Thus, the memories 161-1 to 161-6 employed in the circuit 160 shown in FIG. 19 correspond to respectively the memories 211-1 to 211-6 employed in the ACSU 210 shown in FIG. 25, the adders 162-1 to 162-8 employed in the circuit 160 shown in FIG. 19 correspond to respectively the adders 212-1 to 212-8 employed in the ACSU 210 shown in FIG. 25 whereas the max circuits 163-1 to 163-4 employed in the circuit 160 shown in FIG. 19 correspond to respectively the max circuits 213-1 to 213-4 employed in the ACSU 210 shown in FIG. 25.

As a result, much like the circuit 160 shown in FIG. 19, it is not necessary to sum up three or more sums in a process to update a likelihood $\alpha_{s,k}$ in a time instant. That is to say, in a way similar to the case of a trellis for which the maximum number of branches merging in the same state S is 2, it is necessary to sum up only two sums in a time instant in order to update a likelihood $\alpha_{s,k}$. Thus, the time it takes to carry out the processing at a time instant can be made short. As a result, the speed of the decoding process can be increased.

It is also worth noting that, in this specification, steps of any program stored in a program recording medium can of course be executed in a pre-prescribed order along the time axis in order to carry out processing. However, the steps of such a program do not have to be necessarily executed in this way. For example, the processing may also include processes to be carried out concurrently or individually.

In addition, embodiments of the present invention are by no means limited to the embodiment described above. That is to say, a variety of changes not deviating from a range of essentials of the present invention can be made to the described embodiment.

The invention claimed is:

1. A decoding apparatus for decoding channel input bits from a partial-response channel output in accordance with a trellis obtained by combining a coding constraint and state transitions of a partial response for a case in which the length of a memory required for describing said coding constraint is greater than the length of a channel memory of said partial response, said decoding apparatus comprising:
    a first calculation unit configured to carry out a first calculation on first branch information, which is defined as information on first branches included in three or more branches merging in a state determined in advance, and first path information defined as information on first paths for said first branches;
    a second calculation unit configured to carry out a second calculation on a first calculation value obtained as a result of said first calculation; and
    a third calculation unit configured to carry out said second calculation on second path information defined as information on second paths for second branches included in said three or more branches merging in said state determined in advance as branches having the same branch information,
    in which said third calculation unit is configured to carry out said second calculation prior to a predetermined time of processing carried out by said first and second calculation units.

2. A decoding apparatus for decoding channel input bits from a partial-response channel output in accordance with a trellis obtained by combining a coding constraint and state transitions of a partial response for a case in which the length of a memory required for describing said coding constraint is greater than the length of a channel memory of said partial response, said decoding apparatus comprising:
    a first calculation unit configured to carry out a first calculation on first branch information, which is defined as information on first branches included in three or more branches merging in a state determined in advance, and first path information defined as information on first paths for said first branches;
    a second calculation unit configured to carry out a second calculation on a first calculation value obtained as a result of said first calculation; and
    a third calculation unit configured to carry out said second calculation on second path information defined as information on second paths for second branches included in said three or more branches merging in said state determined in advance as branches having the same branch information, wherein:
    said first branch information includes second branch information, which is defined as information on said second branches, and third branch information defined as information on third branches included in said branches merging in said state determined in advance as branches other than said second branches;
    said first path information includes a third calculation value obtained as a result of said second calculation carried out by said third calculation unit and third path information defined as information on third paths for said third branches;
    said first calculation unit carries out said first calculation on said first branch information and said third calculation value as well as said third branch information and said third path information; and
    said third calculation unit carries out said second calculation prior to a predetermined time of processing carried out by said first and second calculation units.

3. A decoding apparatus for decoding channel input bits from a partial-response channel output in accordance with a trellis obtained by combining a coding constraint and state transitions of a partial response for a case in which the length of a memory required for describing said coding constraint is greater than the length of a channel memory of said partial response, said decoding apparatus comprising:
- a first calculation unit configured to carry out a first calculation on first branch information, which is defined as information on first branches included in three or more branches merging in a state determined in advance, and first path information defined as information on first paths for said first branches; and
- a second calculation unit configured to carry out a second calculation on a first calculation value obtained as a result of said first calculation,
- wherein said first branches are defined as branches merging in each of states obtained as a result of splitting a predetermined state in which three or more branches merge so that the number of aforementioned first branches merging in each of said states obtained as a result of splitting said predetermined state is smaller than the number of branches merging in said predetermined state.

4. The decoding apparatus according to claim 1, said decoding apparatus configured to decode channel input bits by adoption of a Viterbi algorithm, a BCJR (Bahl, Cocke, Jelineck and Raviv) algorithm, a Log-MAP (Maximum A Posteriori Probability) algorithm or a Max-Log-MAP algorithm.

5. The decoding apparatus according to claim 1, said decoding apparatus configured to decode channel input bits for every time instant, wherein said first calculation unit carries out said first calculation at a time instant immediately preceding calculations carried out by said second calculation unit.

6. The decoding apparatus according to claim 1, said decoding apparatus configured to decode channel input bits for every plurality of time instants, wherein said first calculation unit carries out said first, calculation at a time instant preceding calculations carried out by said second calculation unit by a plurality of time instants.

7. A decoding method to be adopted in a decoding apparatus for decoding channel input bits from a partial-response channel output in accordance with a trellis obtained by combining a coding constraint and state transitions of a partial response for a case in which the length of a memory required for describing said coding constraint is greater than the length of a channel memory of said partial response, said decoding method comprising:
- carrying out a first calculation by use of a first calculation unit on first branch information, which is defined as information on first branches included in three or more branches merging in a state determined in advance, and first path information defined as information on first paths for said first branches;
- carrying out a second calculation by use of a second calculation unit on a first calculation value obtained as a result of said first calculation; and
- carrying out said second calculation by use of a third calculation unit on second path information defined as information on second paths for second branches included in said three or more branches merging in said state determined in advance as branches having the same branch information,
- in which said third calculation unit is configured to carry out said second calculation prior to a predetermined time of processing carried out by said first and second calculation units.

\* \* \* \* \*